(12) United States Patent
Hamady

(10) Patent No.: US 6,401,556 B1
(45) Date of Patent: Jun. 11, 2002

(54) PRECESSIONAL DEVICE AND METHOD THEREOF

(76) Inventor: Peter Winston Hamady, 202 Riverside Dr., #7A, New York, NY (US) 10025

( * ) Notice: Subject to any disclaimer, the term of this patent is extended or adjusted under 35 U.S.C. 154(b) by 0 days.

(21) Appl. No.: 09/338,062

(22) Filed: Jun. 23, 1999

(51) Int. Cl.⁷ .......................... G01C 19/02; A63B 23/14
(52) U.S. Cl. .......................................... 74/5.34; 482/44
(58) Field of Search ................................. 74/5.34, 5.37; 482/44, 45, 110; 446/233, 235, 246

(56) References Cited

U.S. PATENT DOCUMENTS

| | | | |
|---|---|---|---|
| 646,217 A | 3/1900 | Kingsley-Field | |
| 850,938 A | 4/1907 | Kellogg et al. | |
| 942,952 A | 12/1909 | Wrather | |
| 1,058,786 A | 4/1913 | Newkirk et al. | |
| 1,175,372 A | * 3/1916 | Newcomb | 446/246 |
| 2,747,326 A | 5/1956 | Doyle | |
| 2,762,123 A | 9/1956 | Schultz et al. | |
| 2,999,390 A | 9/1961 | Bosch et al. | |
| 3,071,977 A | 1/1963 | Bosch et al. | |
| 3,141,669 A | 7/1964 | Chul | |
| 3,164,382 A | 1/1965 | Johnson | |
| 3,276,777 A | 10/1966 | Pruitt | |
| 3,320,819 A | 5/1967 | Riordan | |
| 3,439,548 A | * 4/1969 | Horvath | 74/5.34 |
| 3,451,275 A | * 6/1969 | Atkin | 74/5.34 |
| 3,482,835 A | 12/1969 | Dean | 272/84 |
| 3,617,056 A | 11/1971 | Herbold | |
| 3,648,525 A | 3/1972 | Reed | |
| 3,719,074 A | 3/1973 | Lynch | 73/505 |
| 3,726,146 A | 4/1973 | Mishler | |
| 3,737,162 A | 6/1973 | Wood | |
| 3,742,770 A | 7/1973 | Flannelly | |
| 3,756,592 A | 9/1973 | Johnson | |
| 3,784,363 A | 1/1974 | Flannelly | |
| 3,805,625 A | 4/1974 | Schlitt | |
| 3,841,627 A | 10/1974 | Vetter | |
| 3,843,117 A | 10/1974 | Johnson | |
| 3,858,328 A | 1/1975 | La Rose | |
| 3,901,503 A | 8/1975 | Klose | |
| 4,077,626 A | 3/1978 | Newman | |
| 4,150,580 A | * 4/1979 | Silkebakken et al. | 74/5 R |
| 4,169,391 A | 10/1979 | Schonberger | |
| 4,302,006 A | 11/1981 | Johnson | |
| 4,343,203 A | 8/1982 | Jacobson et al. | |
| 4,361,055 A | 11/1982 | Kinson | |
| 4,387,513 A | * 6/1983 | Cowdin | 74/5.34 X |
| 4,448,086 A | 5/1984 | Kennel | |

(List continued on next page.)

FOREIGN PATENT DOCUMENTS

| | | | |
|---|---|---|---|
| DE | 374175 | 10/1920 | |
| DE | 1 548 544 | 10/1966 | |
| DE | 2825490 A1 | 12/1979 | ............. F03G/7/00 |
| DE | 3523160 A1 | 1/1987 | ............. B64G/1/28 |
| FR | 2 293 608 | 12/1974 | ............. F03G/3/08 |
| GB | 29906 | 12/1912 | |
| GB | 13238 | 4/1913 | |
| GB | 646217 | 11/1990 | |
| JP | 60-561182 | 1/1985 | ............. F03G/7/00 |
| RU | 2002475 C1 | 12/1991 | |
| RU | 2000829 C1 | 10/1993 | |
| SU | 1769901 A1 | 8/1990 | |

OTHER PUBLICATIONS

English translation of French Patent 2 293 608 dated Dec. 3, 1974.

Primary Examiner—Charles A Marmor
Assistant Examiner—Roger Pang
(74) Attorney, Agent, or Firm—Pennie & Edmonds LLP

(57) ABSTRACT

A precessional device featuring a pair of axles each containing at least one flywheel forming a pair of rotors. The pair of axles are each mounted on circular track assemblies in which they rotate and generate a precessional torque that provides variable resistance along a first axis and a balancing of the precessional torque along a second axis.

53 Claims, 70 Drawing Sheets

U.S. PATENT DOCUMENTS

| | | |
|---|---|---|
| 4,461,176 A | 7/1984 | Nearman et al. |
| 4,472,978 A * | 9/1984 | Levine et al. .................. 74/5.34 |
| 4,528,864 A | 7/1985 | Craig |
| 4,655,096 A | 4/1987 | Westhaver et al. |
| 4,658,659 A | 4/1987 | Gruber |
| 4,684,124 A | 8/1987 | Escher |
| 4,712,439 A | 12/1987 | North |
| 4,799,667 A | 1/1989 | Suchy |
| 4,824,099 A | 4/1989 | Rusu et al. |
| 4,825,716 A | 5/1989 | Roberts et al. ............... 74/5.34 |
| 4,951,514 A | 8/1990 | Gubin |
| 5,024,112 A * | 6/1991 | Kidd ........................ 74/5.37 |
| 5,046,721 A | 9/1991 | Altare |
| 5,058,571 A | 10/1991 | Hall |
| 5,090,260 A | 2/1992 | Delroy |
| 5,092,581 A | 3/1992 | Koz |
| 5,150,625 A * | 9/1992 | Mishler ...................... 74/5 R |
| 5,184,521 A | 2/1993 | Tyler |
| 5,256,942 A | 10/1993 | Wood |
| 5,259,571 A | 11/1993 | Blazquez |
| 5,297,052 A | 3/1994 | McIntyre et al. |
| 5,335,561 A | 8/1994 | Harvey |
| 5,342,244 A | 8/1994 | Nelson |
| D350,796 S | 9/1994 | Pravitz |
| D351,437 S | 10/1994 | Pravitz |
| 5,360,363 A | 11/1994 | Levin |
| D365,612 S | 12/1995 | Pravitz ...................... D21/198 |
| 5,517,205 A | 5/1996 | van Heyningen et al. |
| 5,594,169 A | 1/1997 | Field et al. |
| D381,719 S | 7/1997 | Pravitz ........................ D21/98 |
| 5,766,112 A * | 6/1998 | Chuan ......................... 482/44 |
| 5,800,311 A * | 9/1998 | Chuang ....................... 482/44 |
| 5,871,249 A * | 2/1999 | Williams .................. 74/5.34 X |
| 6,053,846 A * | 4/2000 | Lin ............................. 482/44 |

\* cited by examiner

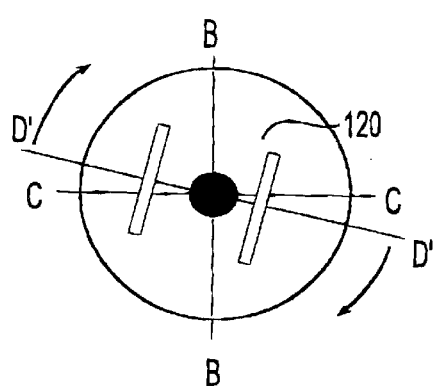
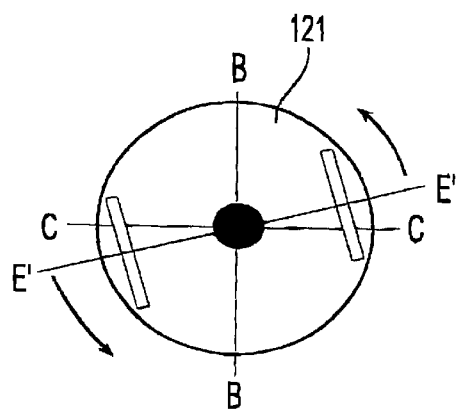
*Fig. 35A*          *Fig. 35B*
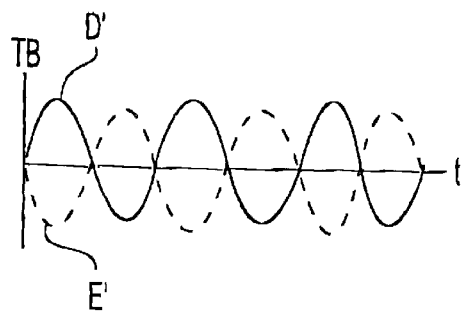
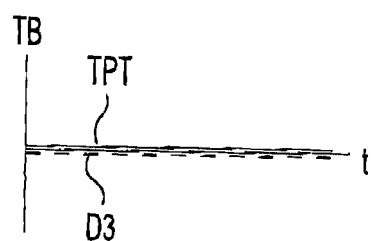
*Fig. 35C*          *Fig. 35D*
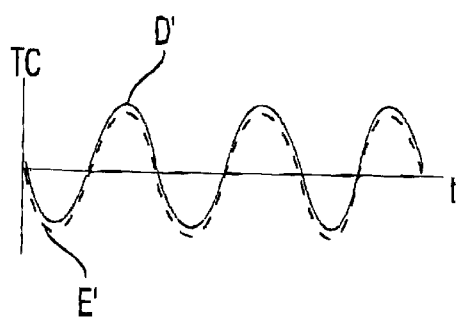
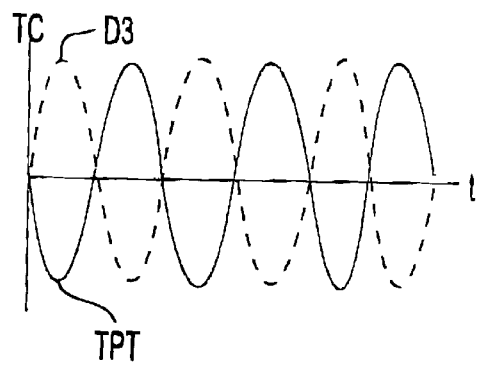
*Fig. 35E*          *Fig. 35F*

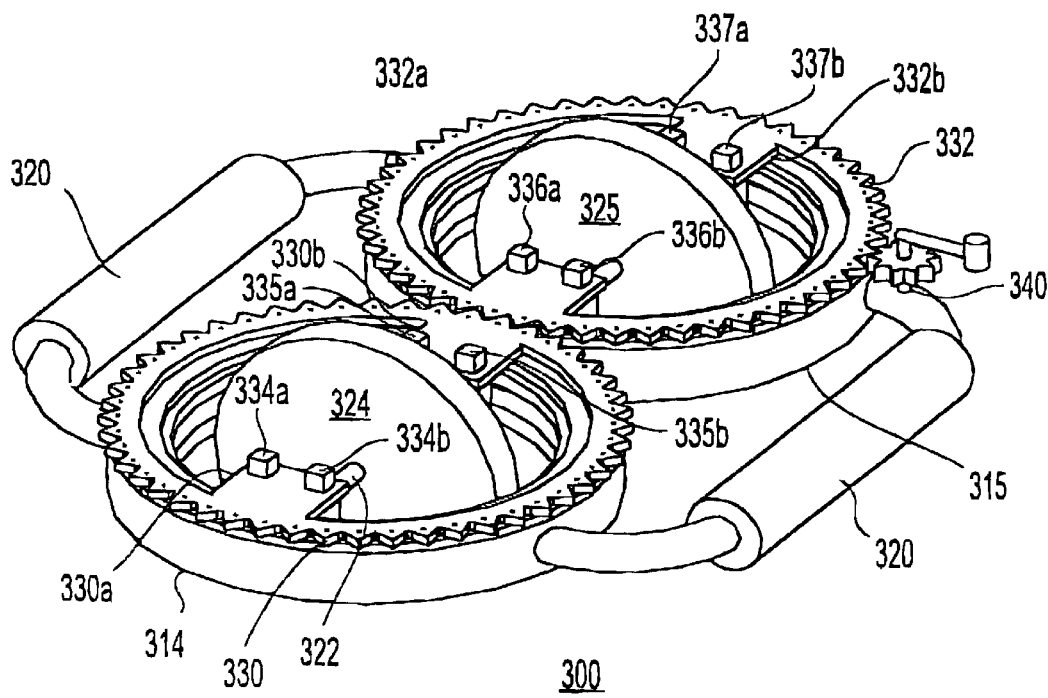
*Fig. 37A*
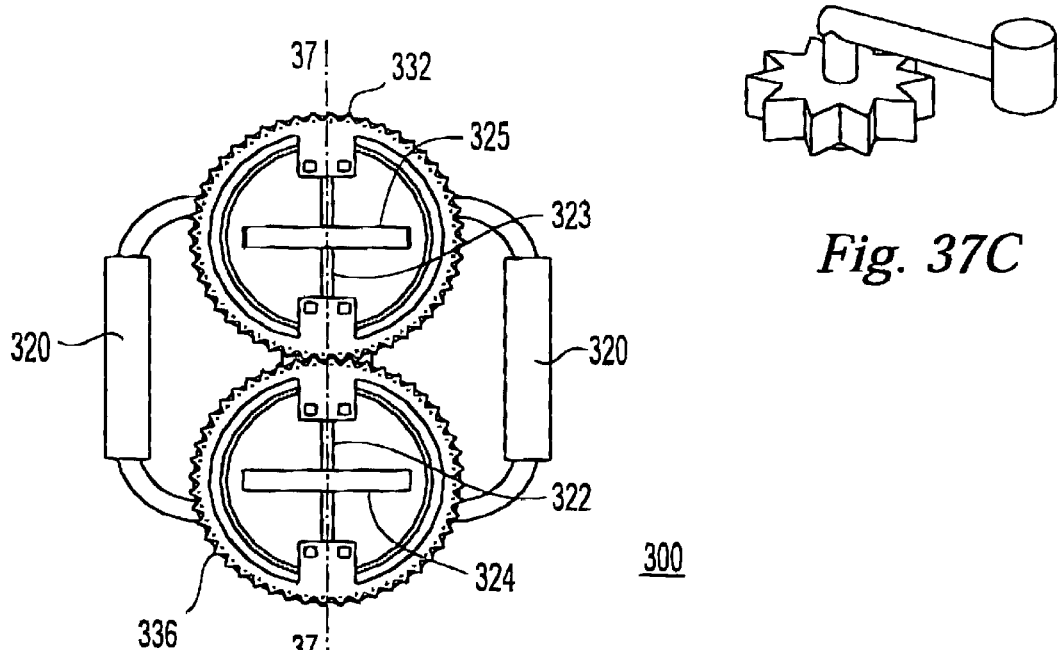
*Fig. 37C*
*Fig. 37B*

PRECESSIONAL DEVICE AND METHOD THEREOF

BACKGROUND OF THE INVENTION

1. Field of the Invention

This invention relates to precessional devices, and particularly, to a device and method which utilize precessional forces in a controlled manner.

2. Background of the Invention

Precessional devices operate on the principle that a spinning mass, such as the rotor of a gyroscope, will resist any deflection of its rotational axis. If the rotational axis is deflected, Newton's Law of conservation of angular momentum dictates that the gyroscope will exert a precessional force at a right angle to the deflecting force. Precessional devices have performed a variety of functions in such diverse fields as navigational equipment and toys.

SUMMARY OF THE INVENTION

The present invention is briefly described as an apparatus and method of using precessional forces in a controlled manner.

In one aspect, the apparatus includes a first rotor spinning on a first spin axis and rotating around a rotational axis; and a second rotor spinning on a second spin axis and rotating around the rotational axis.

In another aspect, the apparatus includes a first rotor spinning on a first spin axis; a second rotor spinning on a second spin axis; the first rotor rotating inside a first track assembly; and the second rotor rotating inside a second track assembly.

In another aspect, the apparatus includes a first rotor spinning on a first spin axis; a second rotor spinning on a second spin axis; the first rotor rotating inside a first track assembly; the second rotor rotating inside a second track assembly; and wherein the first and second spin axes are located on substantially the same plane.

In another aspect, the apparatus includes a first rotor spinning on a first spin axis; the first rotor including first and second flywheels; and the first rotor rotating inside a support structure.

In another aspect, the apparatus includes a first rotor spinning on a first spin axis and rotating inside a first track assembly; and a second rotor spinning on the first spin axis.

In another aspect, the apparatus includes a first rotor spinning on a first spin axis; a second rotor spinning on a second spin axis; and a transmission operatively connected to said first and second rotors.

In another aspect, the apparatus includes a means for inputting a deflecting torque; and a means for substantially adding precessional torques about a first axis and substantially canceling precessional torques about a second axis.

In another aspect, the apparatus includes a first means for producing precessional torques along a first axis and a second axis; a second means for producing precessional torques along the first axis and the second axis; wherein the precessional torques substantially add along the first axis and substantially cancel along the second axis.

In another aspect, the apparatus includes a first means for producing precessional torques along a first axis and a second axis; a second means for producing precessional torques along the first axis and a second axis; and wherein the precessional torques create a variable resistance along said first axis.

In another aspect, the apparatus includes a first means for producing a plurality of precessional forces acting on a first track assembly; a second means for producing a plurality of precessional forces acting on a second track assembly; wherein said first and second track assemblies are connected to form a support structure; a plurality of handles mounted to the support structure; and wherein the precessional forces created by said first and second means create a variable resistance at the plurality of handles.

In another aspect, a method includes inputting a deflecting torque through a plurality of handles; and pulling and pushing against a variable resistance along one dimension.

In another aspect, the method includes rotating a first rotor around a rotational axis; and rotating a second rotor around said rotational axis in an opposite direction.

In another aspect, the method includes rotating a first rotor around a track assembly; rotating a second rotor around a second track assembly attached to the first track assembly; and creating a variable resistance along one dimension.

In another aspect, the method includes rotating a first spin axle containing a plurality of flywheels around a first track assembly; rotating a second spin axle containing a plurality of flywheels around a second track assembly in an opposite direction; and outputting a variable resistance along a first axis and substantially canceling forces acting along a second axis.

In another aspect, the method includes turning a hand crank to input a first deflecting torque to a first rotor rotating in a first direction and a second deflecting torque to a second rotor rotating in a second direction within a support structure; and grasping handles attached to said support structure and inputting a third deflecting torque against a variable resistance provided by the first and second rotors.

BRIEF DESCRIPTION OF THE DRAWINGS

FIG. 35A shows a top cutaway plan view of the first rotor as it transitions between the first and second location and rotating in a clockwise direction;

FIG. 35B shows a top cutaway plan view of the second rotor as it transitions between the first and second location and rotating in a counter-clockwise direction;

FIG. 35C shows a diagram of the torque about the B axis generated by the first and second rotors compared on the same graph over time;

FIG. 35D shows a diagram of the net torque about the B axis generated by the rotors and the operator on the same graph over time;

FIG. 35E shows a diagram of the torque about axis C generated by the first and second rotors compared on the same graph over time;

FIG. 35F shows a diagram of the net torque about axis C generated by the rotors and the operator on the same graph over time;

FIG. 37A shows a perspective view of a fourth embodiment of the precessional device with the housing broken away to show internal structure;

FIG. 37B shows a top plan view of the fourth embodiment of the precessional device;

FIG. 37C shows a handcrank to be used with the fourth embodiment;

DESCRIPTION OF THE PREFERRED EMBODIMENTS OF THE INVENTION

Figure 1:
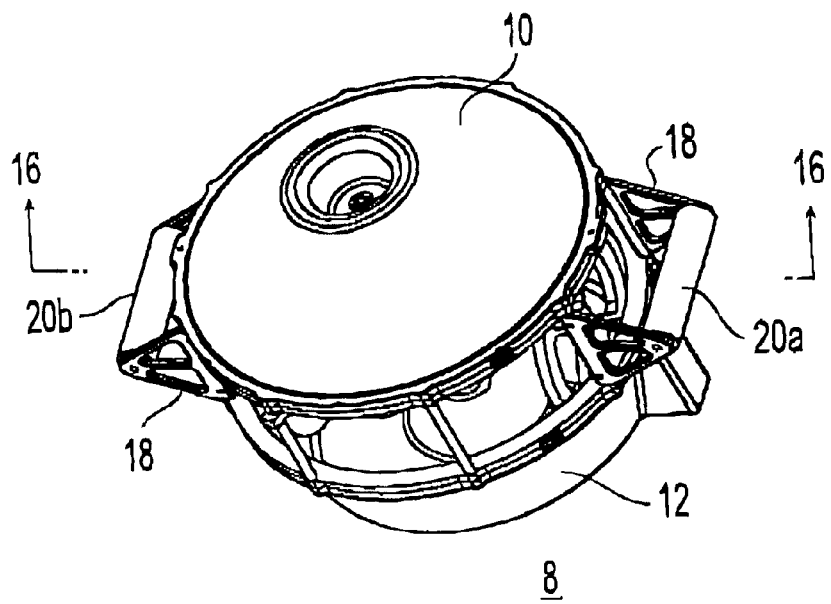
FIG. 1 is a perspective view of a precessional device in accordance with a first embodiment.
Figure 2:
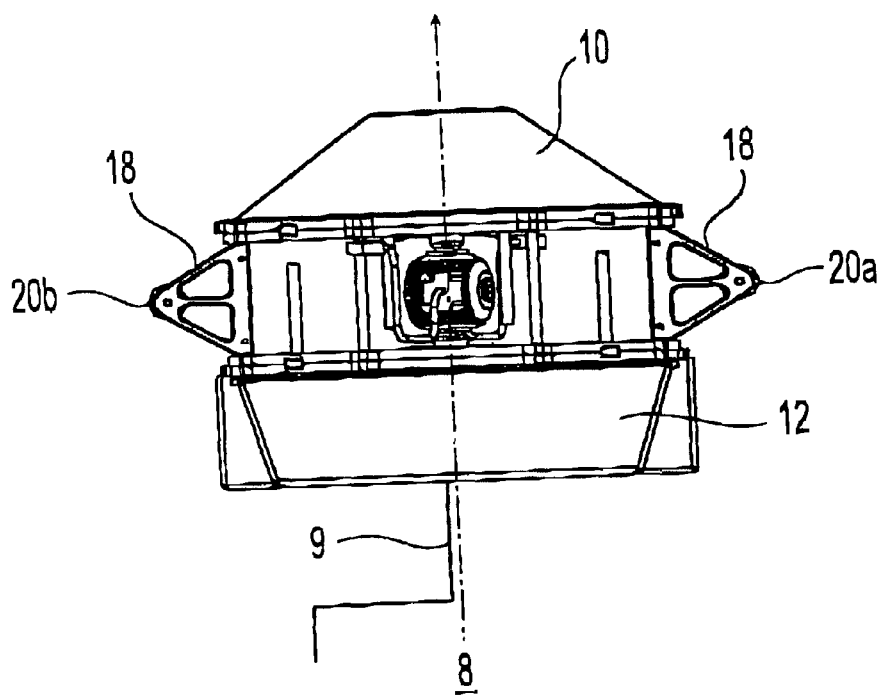
FIG. 2 is a front elevational view of the device in FIG. 1.

The precessional device 8 shown in FIG. 1 and FIG. 2 is a first embodiment which includes a first housing 10 and a second housing 12, both of which provide structural support to the device and act as protective shields for the internal mechanisms. The housings 10 and 12 may be made of a thermoplastic to provide lightness and strength and may be made transparent to allow the internal mechanisms to be visible to the operator. FIG. 2 also shows a removable handcrank 9 which is used to start the precessional device.

Figure 3:
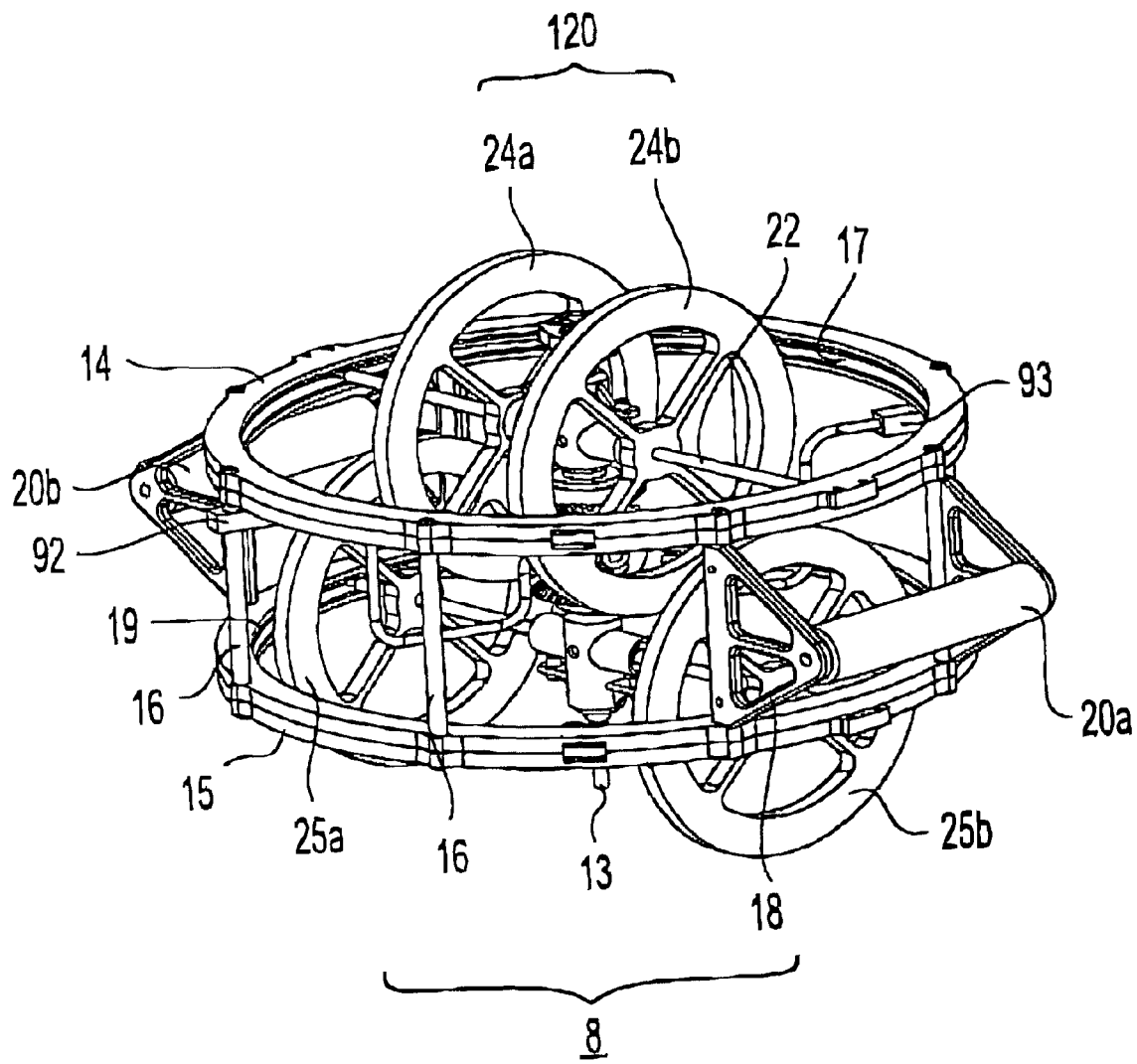
FIG. 3 is a perspective view of the device in FIG. 1 with parts broken away to show internal structure.
Figure 4A:
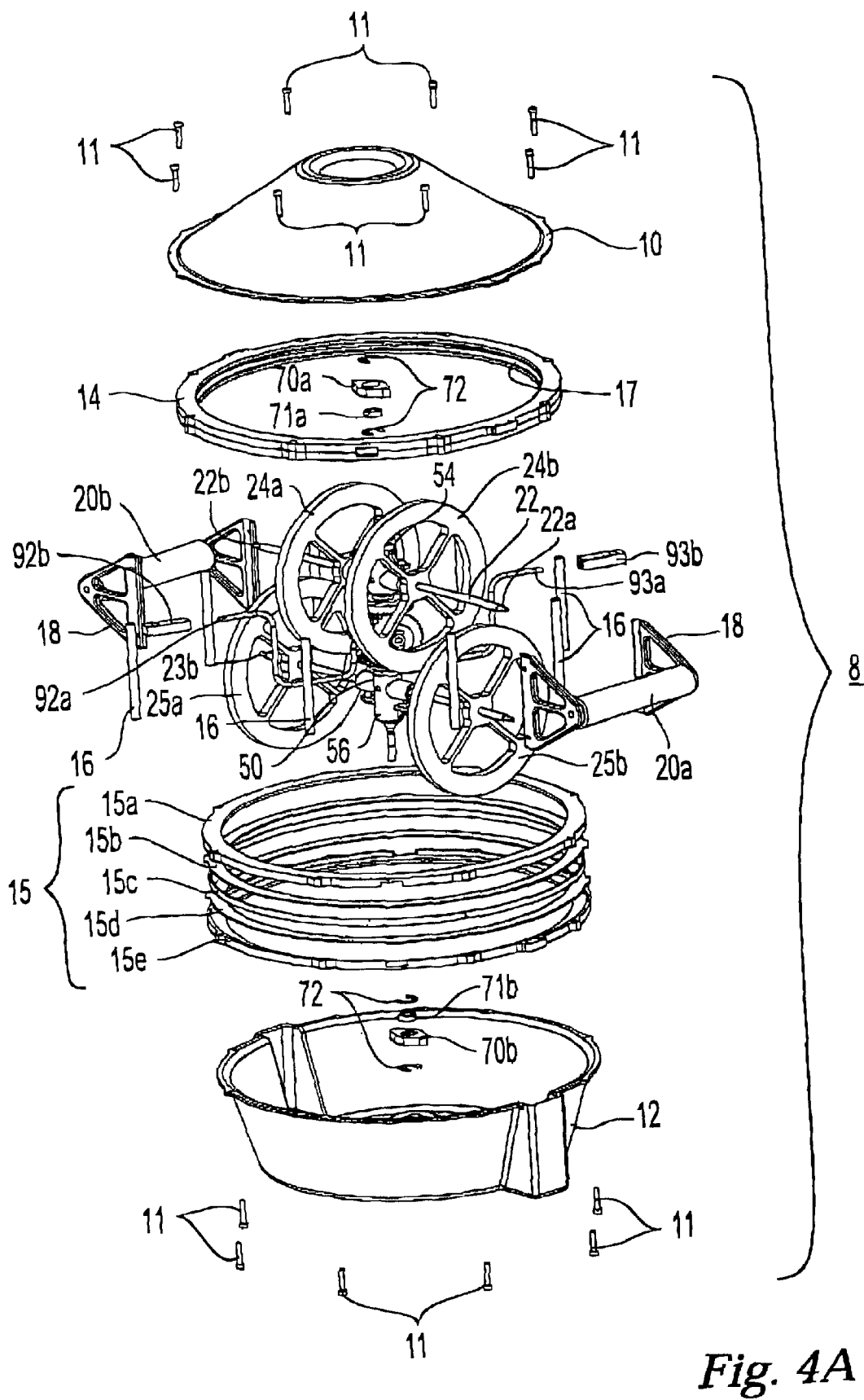
FIG. 4A is an exploded perspective view of details of the body of the device in FIG. 1.
Figure 5A:
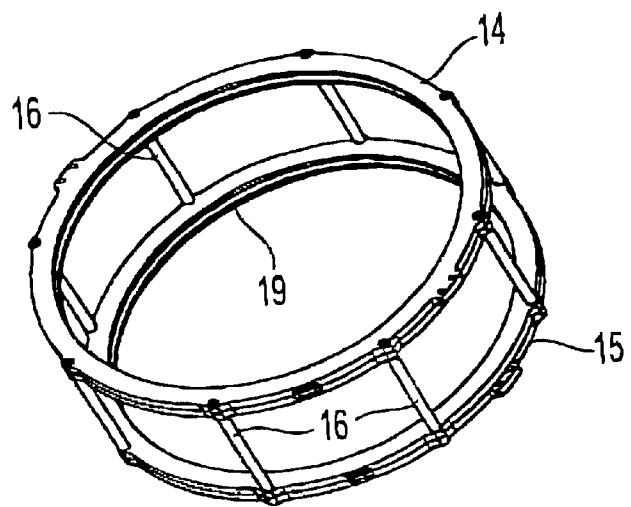
FIG. 5A is a top perspective view of the track assemblies of the device of FIG. 1.
Figure 5B:
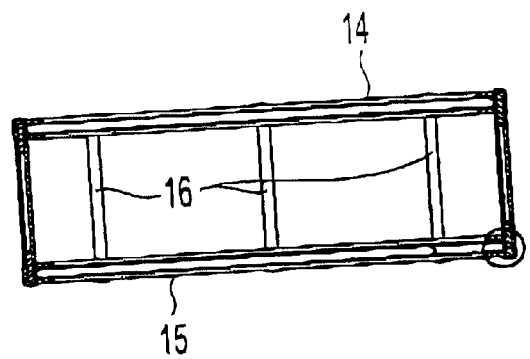
FIG. 5B is a side elevational view of the track assemblies of the device of FIG. 1.
Figure 5C:
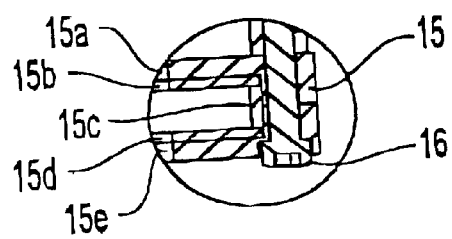
FIG. 5C is a fragmentary cross-sectional side view showing the details of one of the tracks of the device of FIG. 1.

FIG. 3 illustrates the precessional device 8 with housings 10 and 12 removed, each housing attaching directly to one of two, identical, stacked track assemblies 14 and 15. The handcrank 9 is inserted into crank pin 13 and is then turned by the operator to start first and second rotors 120, 121 turning in opposite directions. When the first and second rotors 120, 121 are at their operating speed the handcrank 9 may be removed by the operator. FIG. 4A shows an exploded isometric view of the precessional device 8. Housings 10 and 12 are attached to track assemblies 14 and 15 through a plurality of bolts 11. The two track assemblies 14 and 15 are rigidly locked together, a few inches apart, by a plurality of track supports 16 as shown in FIGS. 5A and 5B. The track assemblies 14, 15 with supports 16 and handle brackets 18 form a support structure for axles 22 and 23. Track assembly 15 includes elements 15a–15e which enclose race or channel 19 (shown in FIG. 3). A first laminate 15b is attached to a first track half 15a and a second laminate 15d is attached to a second track half 15e. Reference numeral 15c represents a spacer which divides the first laminate 15b and the second laminate 15d. FIG. 5C illustrates track assembly 15 in detail. Axle tips 23a and 23b of spin axle 23 travel in a circular path between the first and second laminates 15b and 15d. The first track half 15a, the second track half 15e, and the spacer 15c may be made of aluminum. The first and second laminates 15b, 15d may be replaced by using rubber O-rings or other similar materials. The choice of materials used inside the first and second track halves 15a, 15e is preferably selected to reduce the possibility that the speed of the spinning axles may cause the material to be burned out or cause the axle tips 23a and 23b to skip within the track assembly 15. Axle tips 22a and 22b travel inside a race or channel 17 in track assembly 14 which is composed similarly to track assembly 15.

Figure 6:
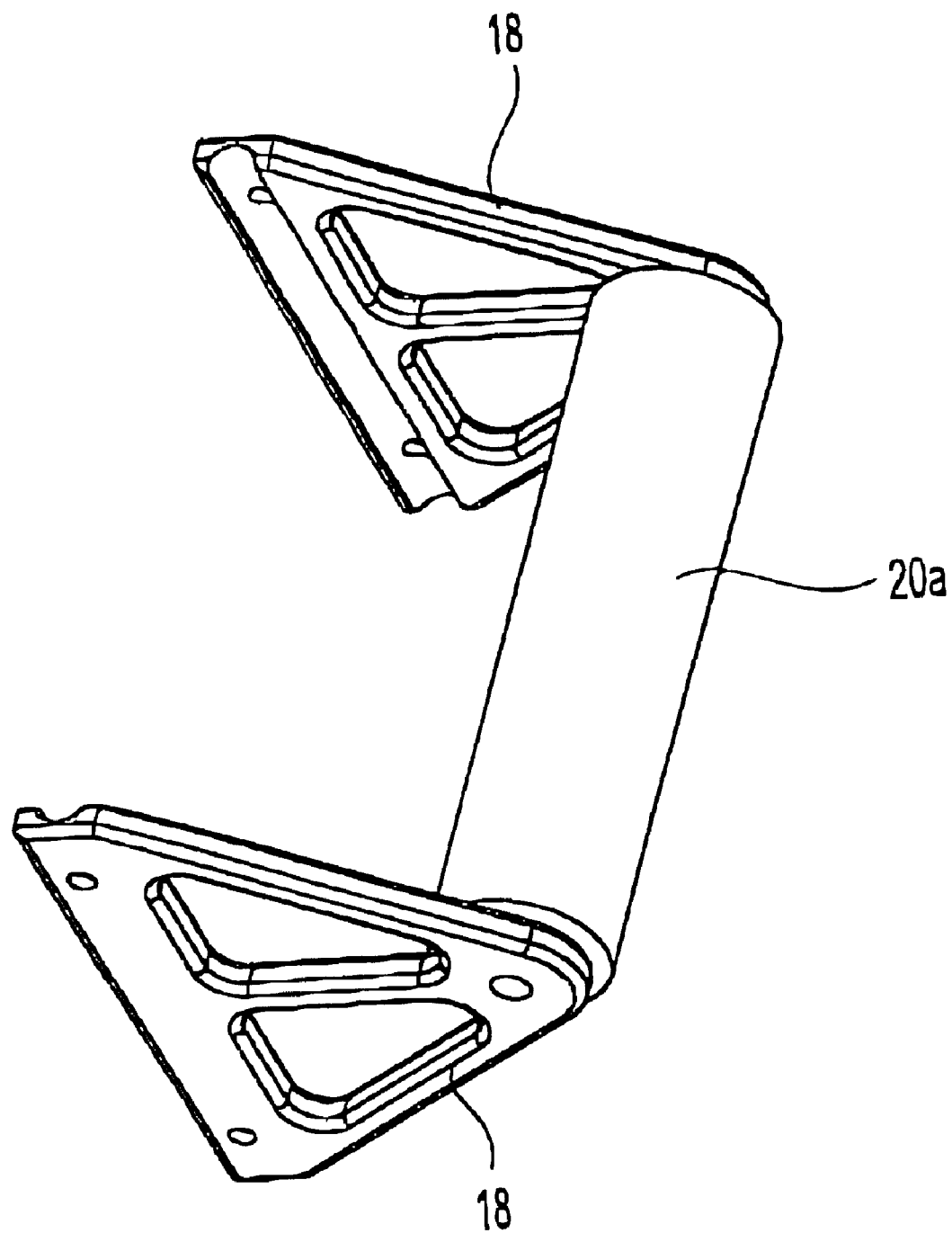
FIG. 6 is a perspective view of one of the handles of the device of FIG. 1.

FIG. 4A illustrates that handle brackets 18 are mounted to track supports 16 and support two handles 20a–20b diametrically aligned relative to the planes of the track assemblies 14, 15. As discussed above, the handle brackets 18 also assist in the support of the two track assemblies 14, 15. The handles 20a–20b are mounted to the brackets 18 as shown in FIG. 6 so that they can freely rotate about their lengthwise handle axes.

Figure 4B:
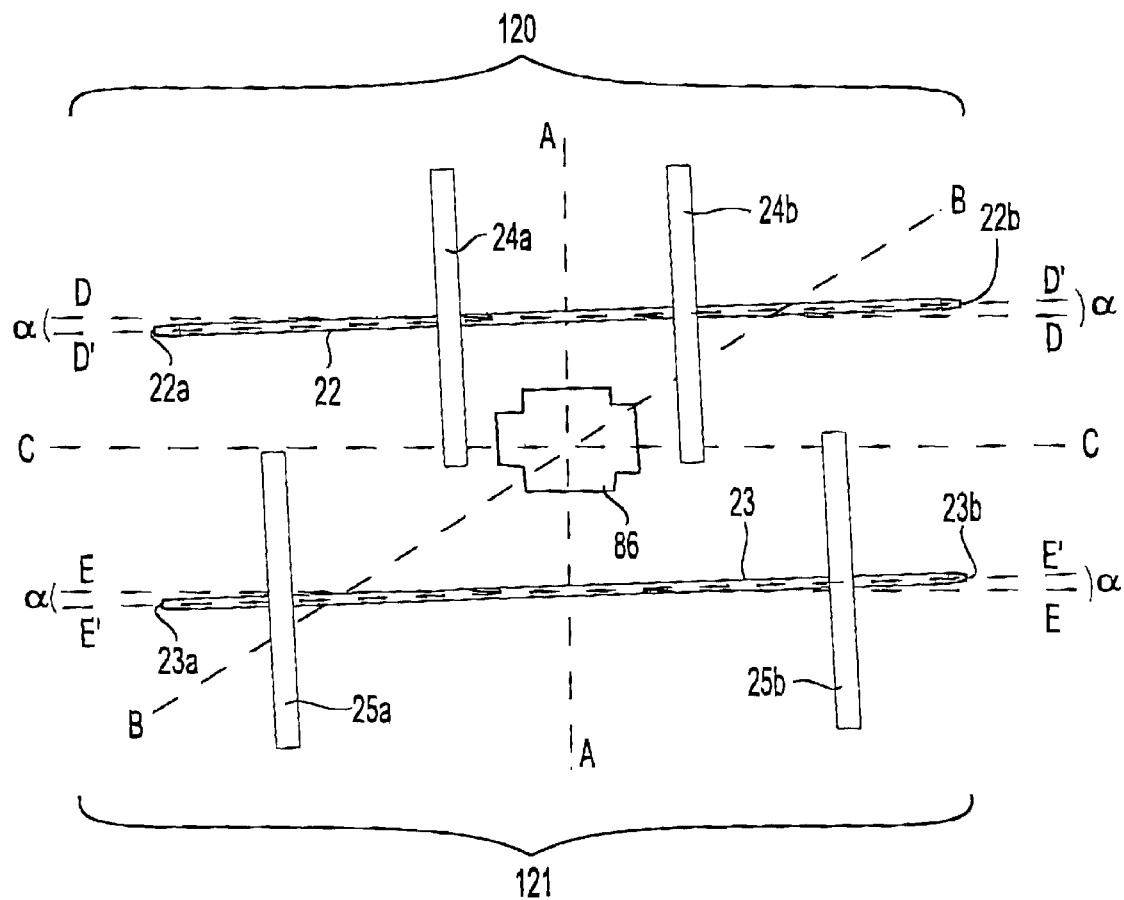
FIG. 4B is a side view of the device in FIG. 1 showing the A—A, B—B, C—C, D—D, D'—D', E—E and E'—E' axes.
Figure 7A:
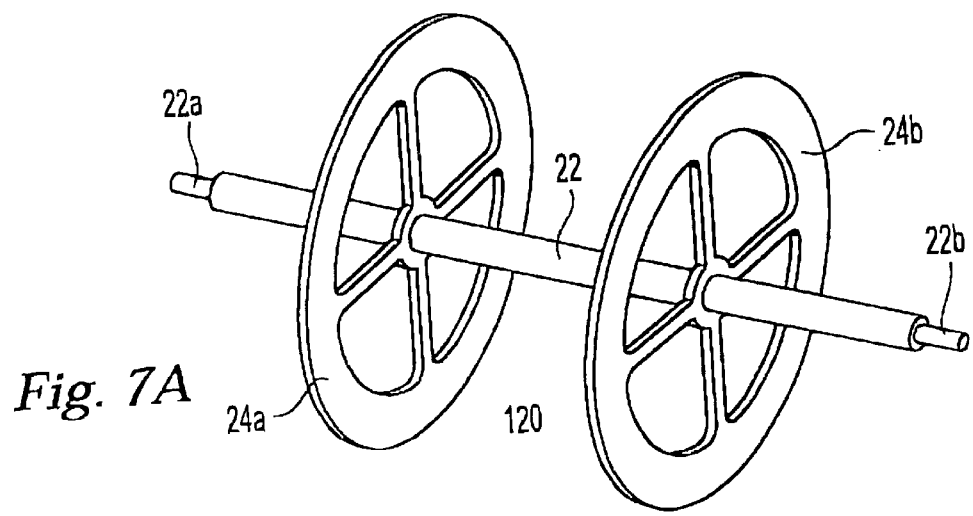
FIG. 7A is a perspective view of the first rotor component of the device of FIG. 1.
Figure 7B:
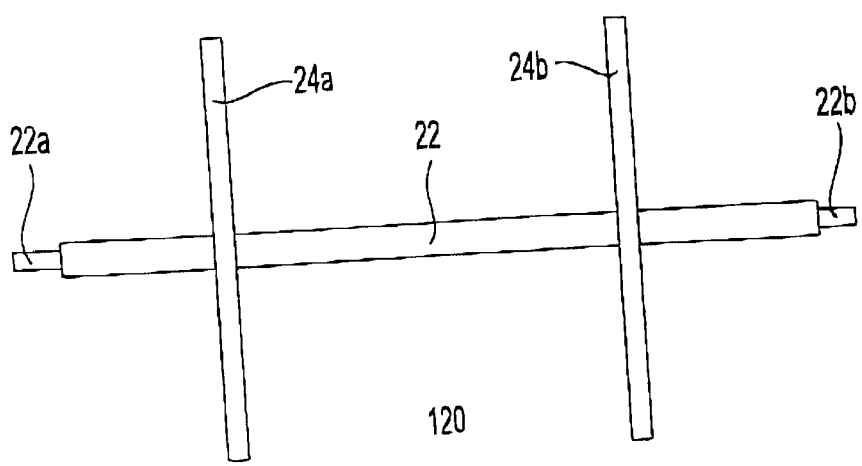
FIG. 7B is a front elevational view of the first rotor component of the device of FIG. 1.
Figure 7C:
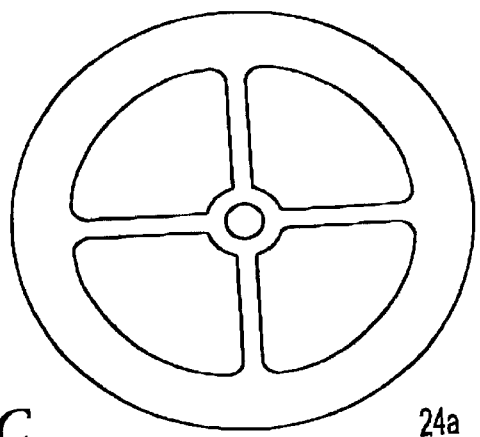
FIG. 7C is a side elevational view of a flywheel of the first rotor component of FIGS. 7A–7B.

As further shown in FIGS. 3 and 4A, track assembly 14 provides a first race or channel 17 into which the tips or distal ends 22a and 22b of the axle 22 are supported when axle 22 is inserted diametrically across track assembly 14. The axle 22 will travel in a rotational pattern around rotational axis A—A (as shown in FIG. 4B) within the race 17. Axle 22 is a first spin axle which supports a first pair of flywheels 24a and 24b. FIGS. 7A and 7B show the flywheels 24a and 24b mounted on the first axle 22 to form the first rotor 120. FIG. 7C shows a detailed view of flywheel 24a. Flywheels 24a and 24b are substantially identical in size and mass and are mounted and balanced on the first axle 22. FIGS. 3 and 4A illustrate that track assembly 15 provides the second race or channel 19 into which the tips 23a and 23b of second axle 23 may be supported when axle 23 is inserted diametrically across track assembly 15. The axle 23 will travel in a rotational pattern within the race 19 around rotational axis A—A in a direction opposite to that of axle 22. The reason for this will be discussed in detail below. Axle 23 is a second spin axle which supports a second set of flywheels 25a and 25b to form a second rotor 121. Flywheels 25a and 25b are substantially identical to flywheels 24a and 24b and are mounted and balanced in the same manner as flywheels 24a and 24b. Flywheels 25a and 25b may be positioned farther apart on axle 23 than corresponding flywheels 24a and 24b on axle 22. The wider spacing allows the overall height of the precessional device 8 to be made more compact since the first and second rotors 120 and 121 may rotate without colliding. Each of the flywheels 24a–24b and 25a–25b, given their fixed mass, are designed to maximize rotational inertia about their respective axles 22 and 23. The flywheels 24a–24b and 25a–25b may be designed to use a dense material, such as metal, especially along the outer circumference to help maximize rotational inertia. The rotational inertia of each of the first and second axles 22 and 23, including respective flywheels, is substantially identical. FIG. 4A further illustrates that axles 22 and 23 are supported by first yoke mount assembly 54 and second yoke mount assembly 56 respectively.

FIG. 4B illustrates that both first and second axles 22 and 23 rotate around rotational axis A—A. Axis B—B (first orthogonal axis) and axis C—C (second orthogonal axis) are both orthogonal to the rotational axis A—A and orthogonal to each other. Axis C—C runs substantially through the center of each of the handles 20a and 20b (not shown in FIG. 4B). Axes D'—D' and E'—E' are the spin axes for rotors 120 and 121 respectively. Axes D—D and E—E are substantially parallel to each other and to axis C—C. Spin axis D'—D' is canted with respect to axis D—D by a narrow angle a which is sufficient to keep axle tips 22a and 22b in contact with the laminates inside track assembly 14 (e.g., α may be approximately 0.5 degrees). Spin axis E'—E' is also canted by angle a with respect to axis E—E to keep axle tips 23a and 23b in contact with the laminates 15b and 15d inside track assembly 15. Axles 22 and 23 are positioned substantially along spin axes D'—D' and E'—E' respectively. Angles D'—D' and E'—E' are canted with respect to axes D—D and E—E to control the direction of rotation of the axles 22 and 23 about D'—D' and E'—E' respectively. As will be discussed in further detail below, axle tips 22a–22b and 23a–23b will be in contact with the races 17 and 19 so that when the rotors 120 and 121 turn, frictional contact with the races 17 and 19 will begin to spin the axles 22 and 23. Axles 22 and 23 will begin to produce precessional forces that will allow operation of the device 8.

Figure 8:
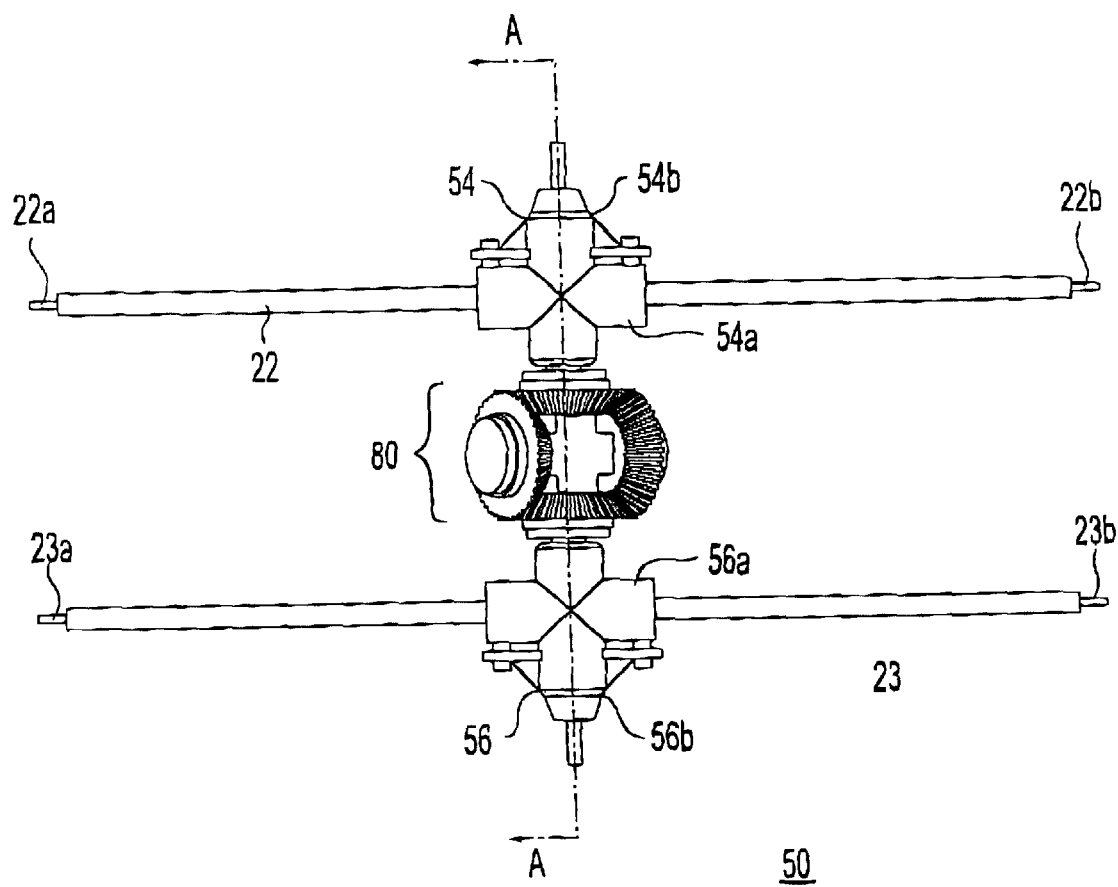
FIG. 8 is a perspective detailed view of the central column of the device of FIG. 1.
Figure 9:
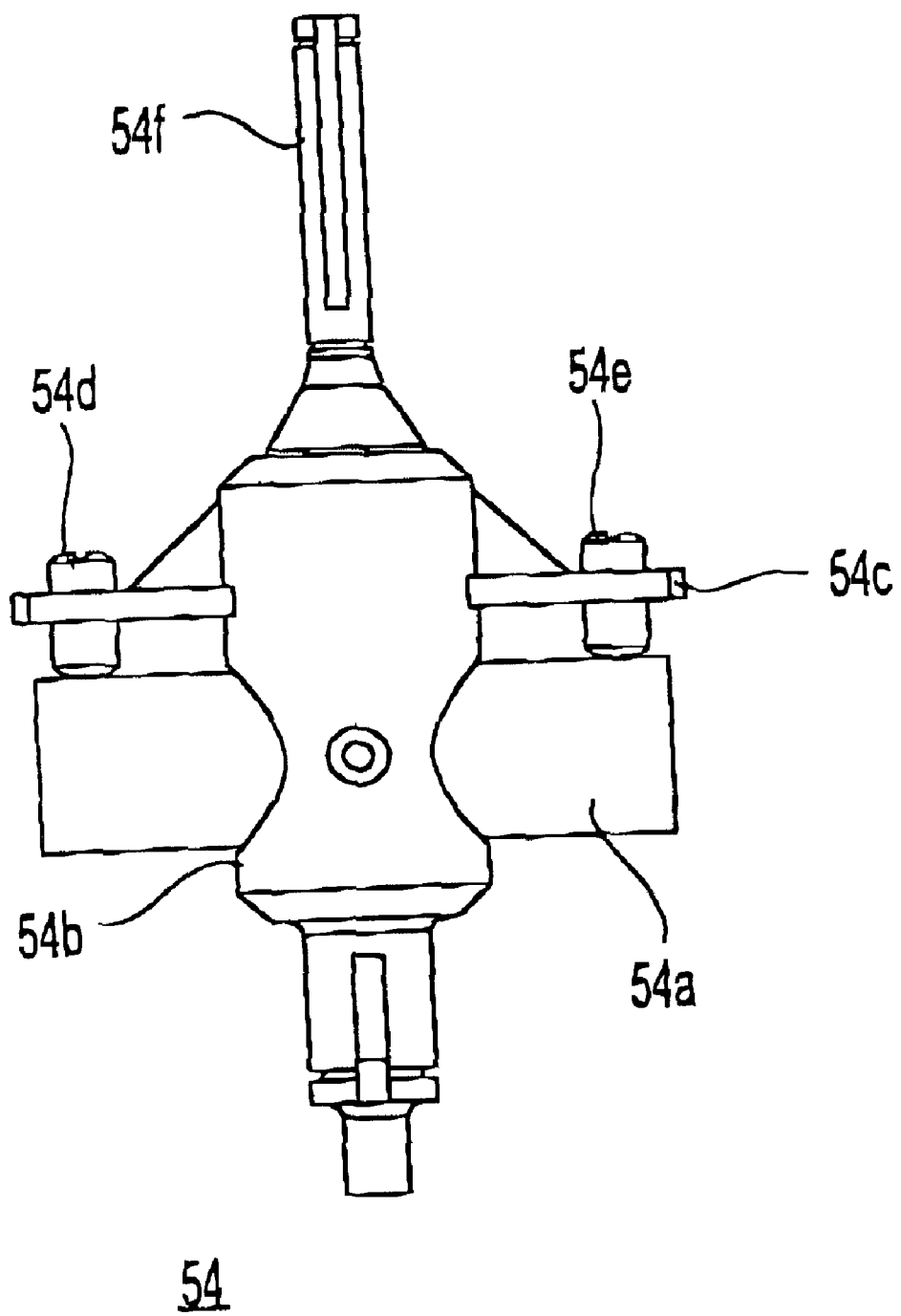
FIG. 9 is a front plan view of a yoke mount assembly of the device of FIG. 1.
Figure 10A:
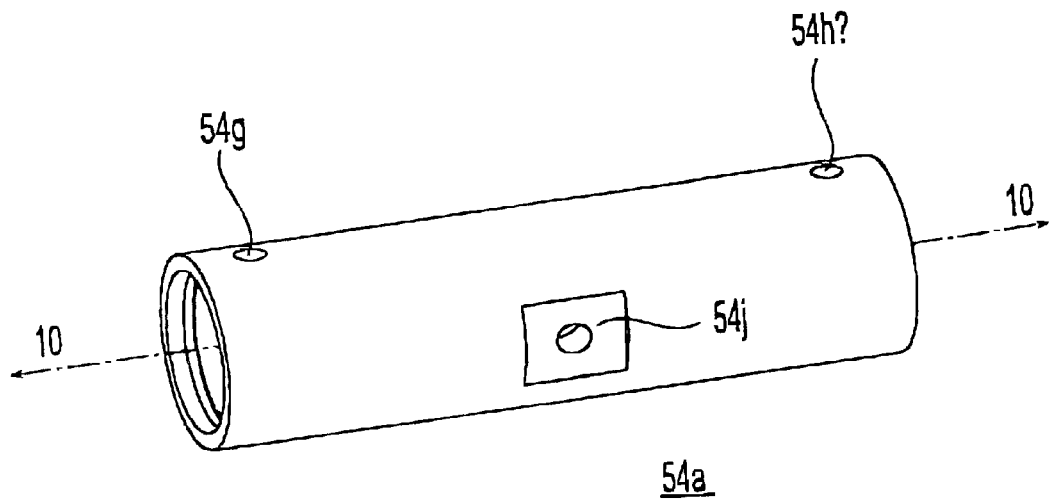
FIG. 10A is a perspective view of a yoke component of the device of FIG. 1.
Figure 10B:
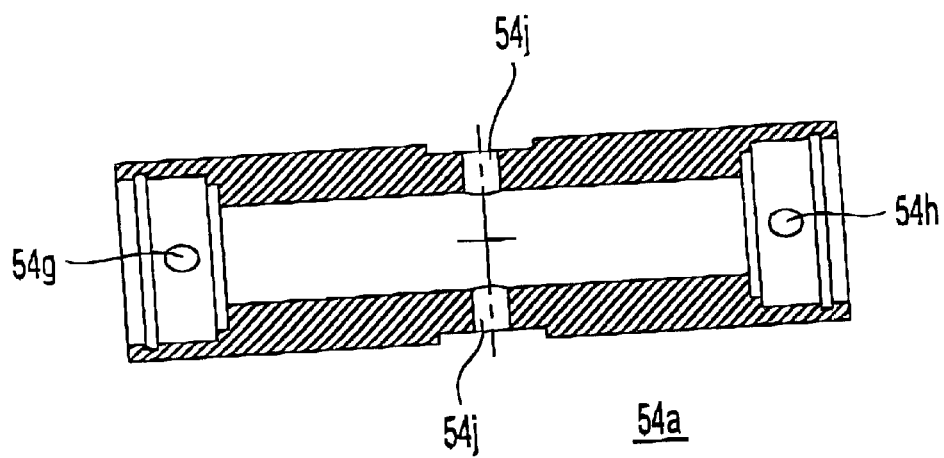
FIG. 10B is a cross-sectional plan view of the yoke of the device of FIG. 1 taken on line 10—10 of FIG. 10A.
Figure 16:
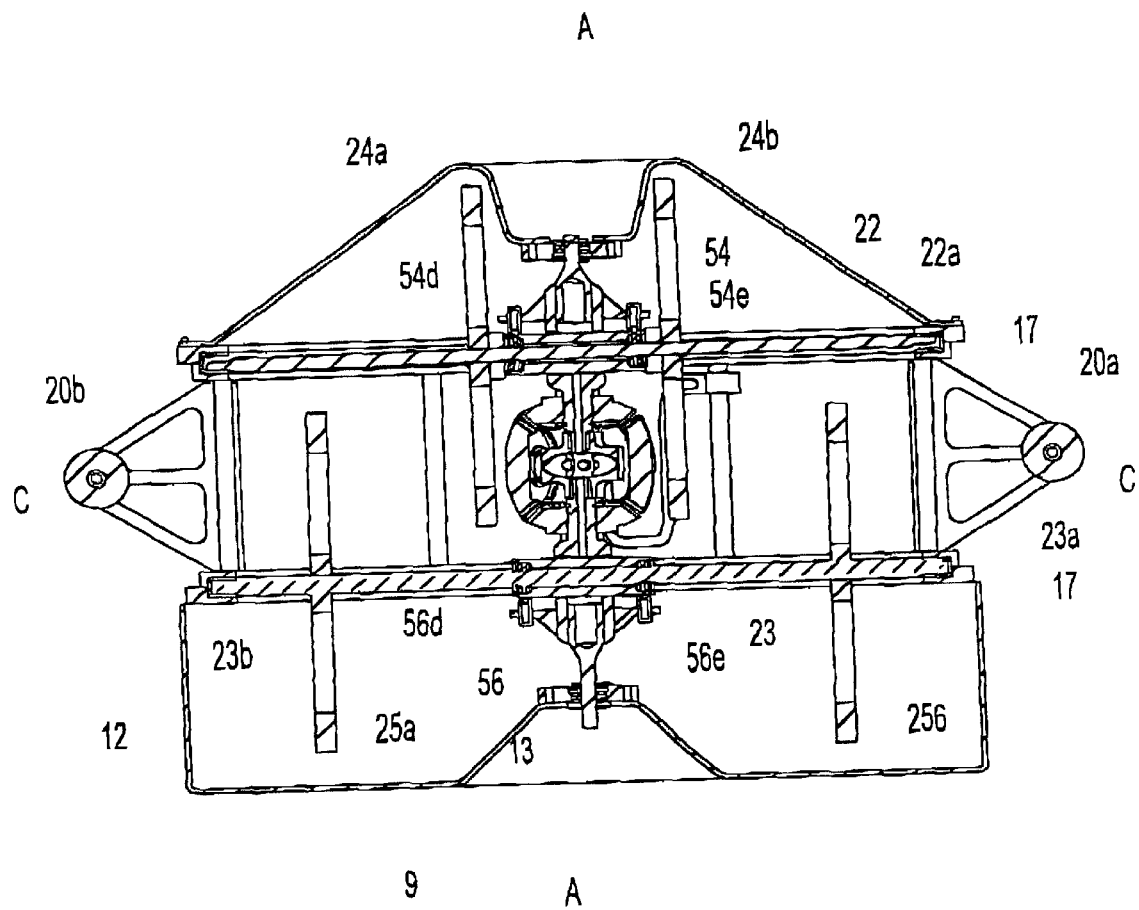
FIG. 16 is a sectional view of the device taken along line 16—16 of FIG. 1.

FIG. 8 illustrates the central column 50 which is substantially aligned with the rotational axis A—A around which rotors 120 and 121 turn. Central column 50 includes a first yoke mount assembly 54, a second yoke mount assembly 56, and a transmission 80. The first yoke mount assembly 54 includes the first yoke 54a and a first yoke mount 54b. The second yoke mount assembly 56 includes the second yoke 56a and a second yoke mount 56b. Yokes 54a and 56a are, respectively, supported in first yoke mount 54b and second yoke mount 56b. FIGS. 9 and 10A–10B show first yoke assembly 54 and yoke 54a in detail. Screw 54i, mounted in screw hole 54j, holds the first yoke 54a in position. By adjusting screws 54d and 54e in yoke holes 54g and 54h, the ends of yoke 54a may be preloaded or canted off axis D—D and aligned with D'—D' as previously discussed with respect to FIG. 4B. This, in turn, adjusts the position of the axle tips 22a–22b within race 17 in track assembly 14. Second yoke 56a and axle tips 23a–23b are adjusted in a similar manner using screws 56d and 56e (as shown in FIG. 16). The first yoke mount upper portion 54f is supported by the bearing 71a located in the bearing mount 70a that is attached securely to the housing 10 (as shown in FIG. 4A). The second yoke mount 56b is similarly attached to the bearing 71b located in the bearing mount 70b that is also attached securely to the housing 12. Both mounts incorporate a plurality of e-clips 72 to maintain stability.

Figure 11:
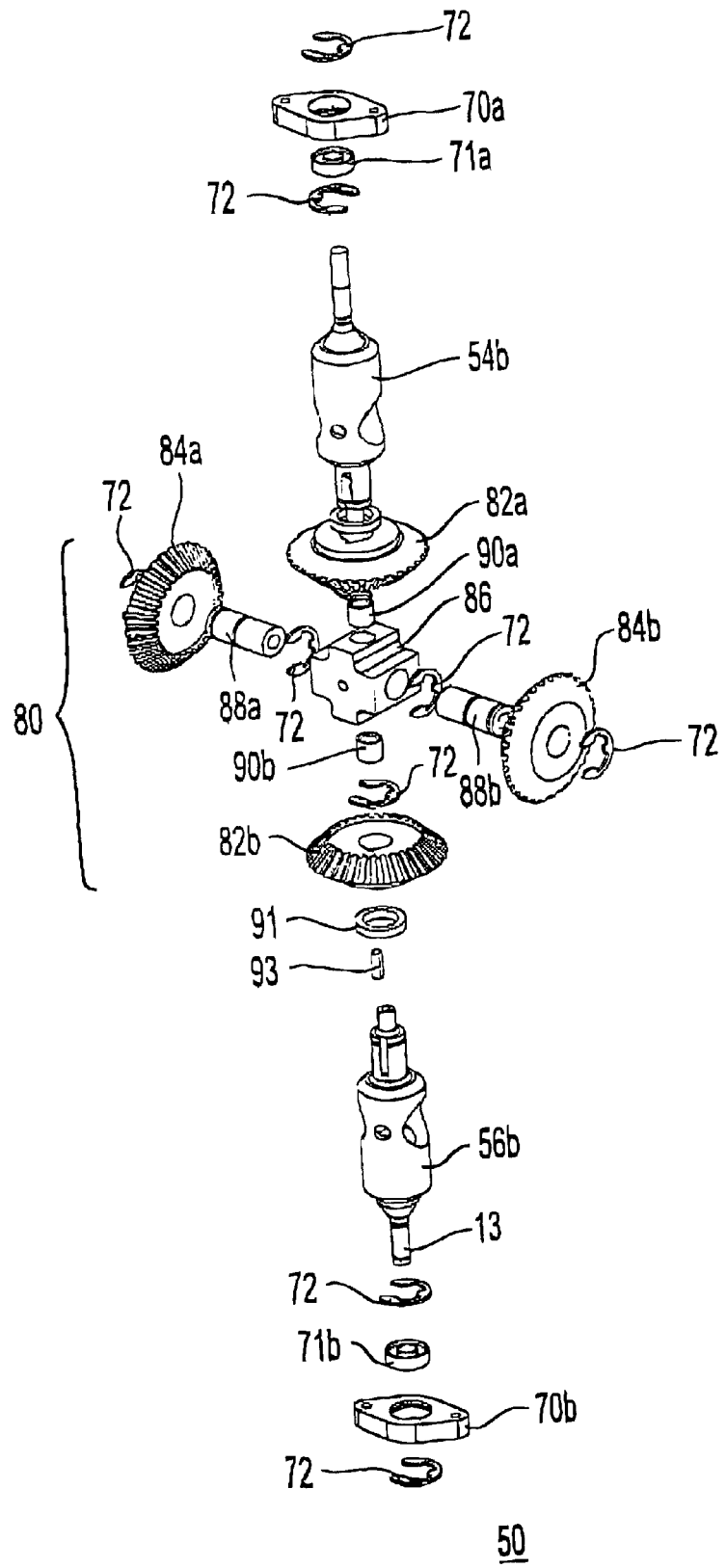
FIG. 11 is an exploded perspective detailed view of the central column of the device of FIG. 1.
Figure 12A:
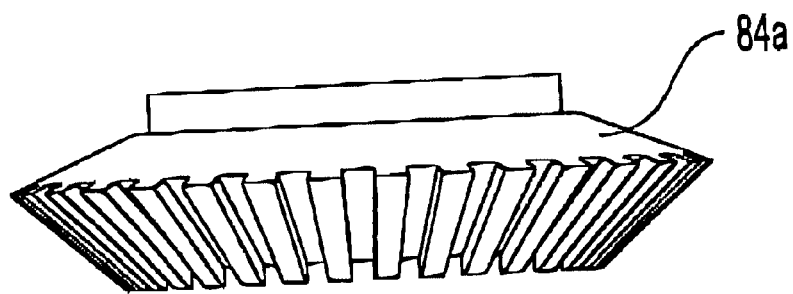
FIG. 12A is a side view of a first driven gear of the device of FIG. 1.
Figure 12B:
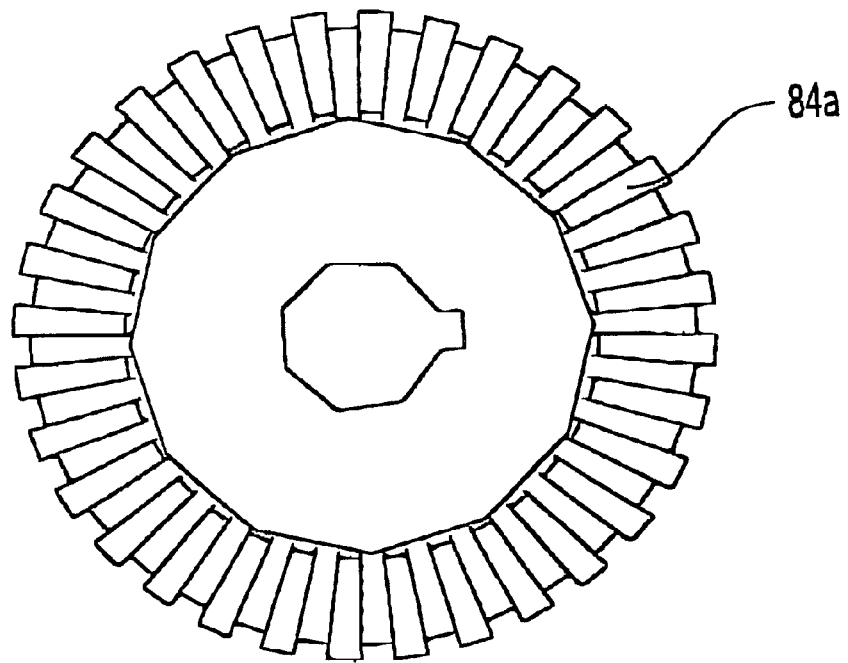
FIG. 12B is a top view of the first driven gear of the device of FIG. 1.
Figure 13A:
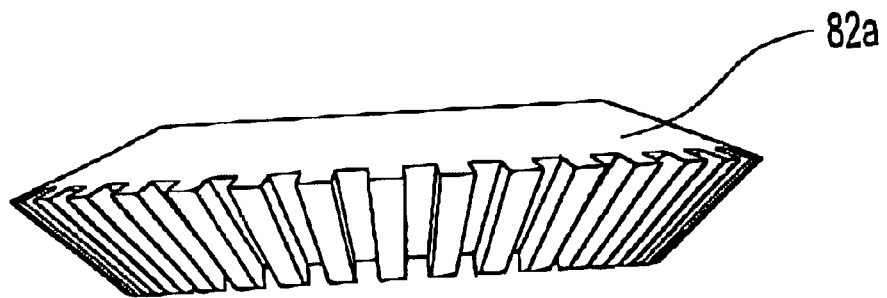
FIG. 13A is a side view of a first idler gear of the device of FIG. 1.
Figure 13B:
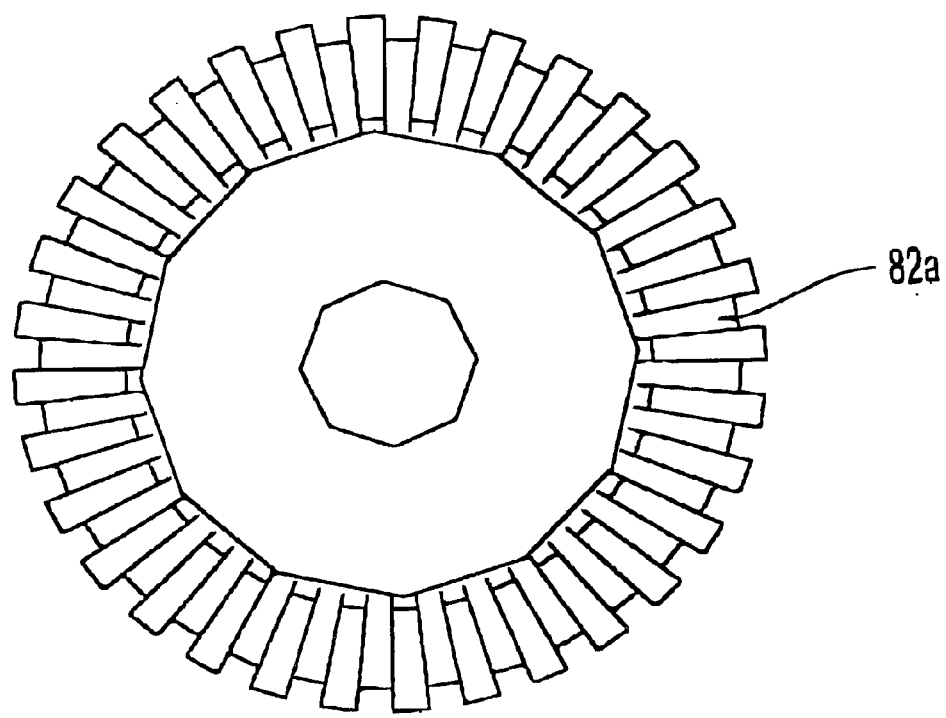
FIG. 13B is a top view of the first idler gear of the device of FIG. 1.
Figure 14:
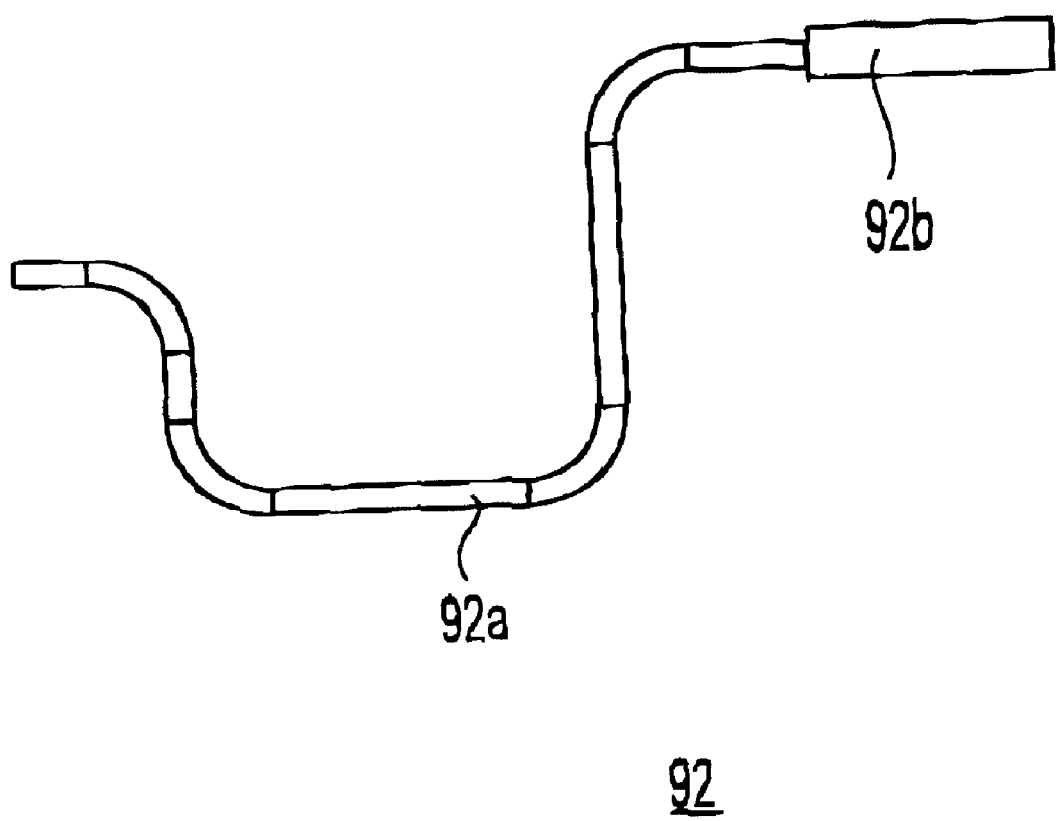
FIG. 14 is a side view of a wire brace assembly of the precessional device of FIG. 1.
Figure 15:
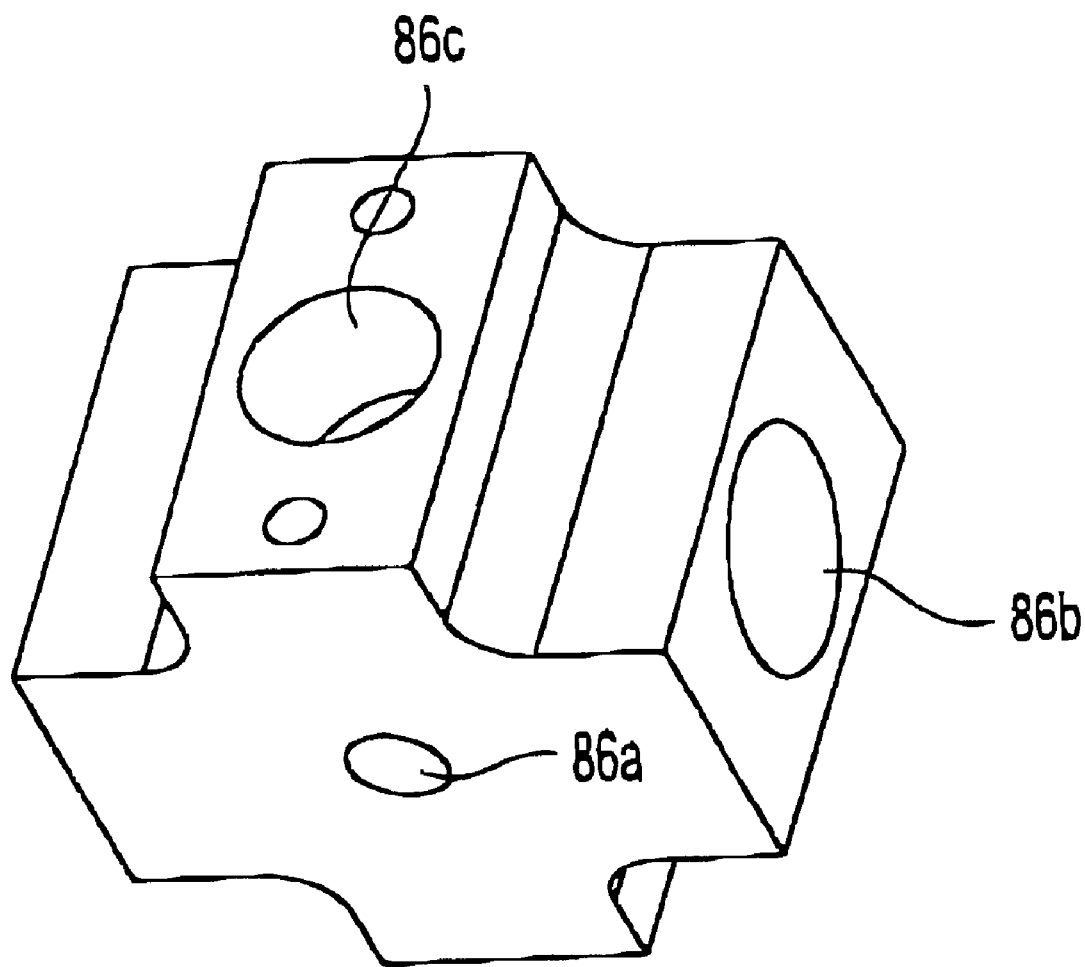
FIG. 15 is a perspective view of a central hub of the precessional device of FIG. 1.

Between the first and second yoke mounts 54b and 56b, and solidly connected to both is the transmission 80 as shown in FIG. 8. The function of the transmission 80 is to create a counter-rotating direct connection between the first and second yokes 54a and 56a and the axles 22 and 23 they support. FIGS. 11–13B illustrate that the transmission 80 is made up of two drive (or first) gears 82a and 82b that are solidly connected to the first and second yoke mount assemblies 54 and 56 and two idler (or second) gears 84a and 84b that passively transmit torque between the drive gears 82a and 82b. In the center of the transmission 80 is a central hub 86 that fixes the gears 82a–82b and 84a–84b in place while allowing the gears 82a–82b and 84a–84b the freedom to rotate as designed. The central hub 86 is connected to the idler gears 84a–84b via e-clips 72 and first and second gear hubs 88a–88b as shown in FIG. 11. The central hub 86 is connected to the drive gears 82a and 82b via first and second sleeves 90a and 90b. The central hub 86 is also connected to first and second wire brace assemblies 92 and 93 as shown in FIG. 4A. Wire brace assemblies 92 and 93 fix the orientation of the central hub 86. Wire brace assembly 92 includes wire brace 92a and wire brace mount 92b. Wire brace assembly 93 includes wire brace 93a and wire brace mount 93b. Each of the wire braces 92a, 93b are solidly fixed to diametrically opposite track supports 16 through wire brace mounts 92b and 93b (as shown in FIGS. 3 and 4A) and formed such that they will not interfere with the swept path of the flywheels 24a, 24b as they rotate about the rotational axis A—A. A detailed view of the wire brace assembly 92 is shown in FIG. 14. FIG. 15 shows a perspective view of central hub 86. Reference numeral 86a represents a wire form hole to receive a stabilizing wire brace 92a or 93a; reference numeral 86b represents a gear hub hole to receive a gear hub; and reference numeral 86c represents a sleeve hole to receive a sleeve. Holes 86a, 86b, and 86c have corresponding holes on the other side of the hub 86 which are not shown.

FIG. 11 shows axle crank pin 13 which is attached to the bottom of the second yoke mount assembly 56 and which may receive the end of a removable hand crank 9 (as shown in FIG.2). When one of the driven gears 82a or 82b is turned, it causes the two idler gears 84a and 84b, axially fixed in space due to the two wire braces 92a and 93b, to rotate. The idler gears 84a, 84b, in turn, cause the other driven gear 82a or 82b to rotate in an opposite direction to gear 82a or 82b. Gears 82a–82b and 84a–84b, have the same number of teeth (as shown in FIGS. 12A–13B) and therefore rotate substantially at the same rate. Due to the direct connections between driven gears 82a and 82b, yoke mounts 54a and 56a and yokes 54b and 56b, rotation of one axle 22 or 23 about the rotational axis A—A requires the counter-rotation of the other axle 22 or 23 about the rotational axis A—A FIG. 16 illustrates the precessional device in a starting position. FIG. 16 is a sectional view along line 16—16 of FIG. 1. FIG. 16 further illustrates that by adjusting the screws 54d and 54e the first axle 22 may be positioned so that one tip 22a is pressing in one direction in the track race 17 and one tip 22b is pressing in the opposite direction in the track race 17. By adjusting the screws 56d and 56e the second axle 23 can be positioned so that one tip 23a is pressing in one direction in the track race 19 and one tip 23b is pressing in the opposite direction in the track race 19. Due to surface friction between the tips 22a–22b and 23a–23b of the axles 22 and 23 and the races 17 and 19 rotation of the rotors 120 and 121 about the axis rotational A—A induces spin of the axles 22, 23 about the spin axes D'—D' and E'—E'. This spin includes the flywheels 24a–24b and 25a–25b. Once again, the central column 50 allows each axle 22 and 23 to spin independently about their respective spin axes. However, rotation about the rotational axis A—A of one rotor is mechanically linked to the counter-rotation of the other rotor about the same rotational axis A—A. Since the rotation about the A—A axis is driving the spin of the flywheels through frictional contact with races 17 and 19, the spin rate of each of the rotors 120 and 121, in absolute terms, is substantially the same at all times.

As shown in FIGS. 4B and 16, the axles 22 and 23 are assembled so that they can align almost parallel (except for the canting by angle α) to the axis C—C running through handles 20a and 20b. The screws 54d–54e and 56d–56e are set so that, in this first embodiment the axles 22 and 23 are tilted or preloaded in the same direction so that they are substantially parallel to each other. In FIG. 16, the axle tips on the right side 22a, 23a are in contact with the first side of their respective races 17 and 19 while the axle tips 22b, 23b on the left side of FIG. 16 are in contact with the second or opposite side of their respective races 17 and 19.

When the hand crank 9 is rotated in a clockwise direction (as shown in FIG. 2), the second axle 23 and second pair of flywheels 25a–25b, which form the second rotor 121, begin to rotate in a clockwise direction. This in turn causes the second axle 23 to spin due to the frictional contact of the axle tips 23a and 23b with the race 19. Likewise the first axle 22 and first flywheels 24a–24b, which form the first rotor 120, begin to rotate in the opposite counter-clockwise direction. This causes the first rotor axle 22 to spin axially as well since axle tips 22a and 22b are in frictional contact with race 17.

As the clockwise rotation of the hand crank 9 continues the first and second rotors' spin 120, 121 continues to accelerate around both spin axes D'—D' and E'—E'. This motion continues with the second rotor 121 rotating continually in a clockwise direction around first track assembly 14 and the first rotor 120 rotating counter-clockwise around second track assembly 15. After one revolution of the hand crank 9, each of the rotors 120 and 121 will have rotated once around each of their respective track assemblies 14 and 15. Assuming constant pressure on the crank 9 by the operator, each successive revolution of the hand crank 9 causes the rotors 120, 121 to spin faster and faster. (The precessional device 8 might also be designed so that the hand crank 9 initially rotates in the counter clockwise direction).

Figure 17A:
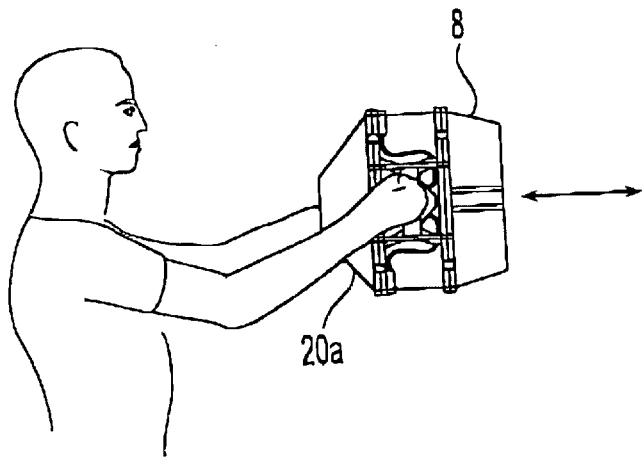
FIG. 17A shows the device being employed by an operator to exercise in a direction directly out from the chest.
Figure 17B:
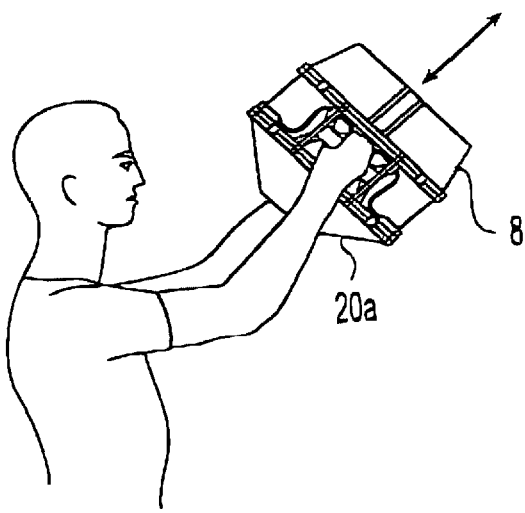
FIG. 17B shows the device being employed by an operator to exercise in an upward angled direction.
Figure 17C:
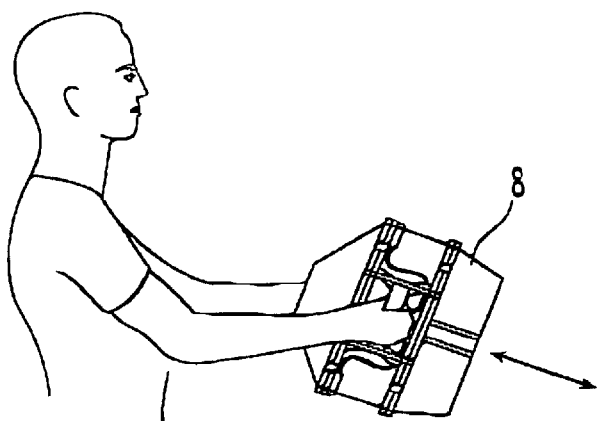
FIG. 17C shows the device being employed by an operator to exercise in a downward angled direction.

A first method of operation of the first embodiment of the precessional device 8 is illustrated with reference to FIGS. 16–26C. After manipulating the hand crank 9 and then optionally removing the handcrank 9, the operator firmly grasps the precessional device 8 by the handles 20a–20b as shown in FIGS. 17A–17C. After a few rotations of the hand crank 9, the axial spinning of the flywheels 24a–24b and 25a–25b becomes great enough to cause a detectable precessional effect to occur. Precession is the effect that a spinning mass exhibits when its axis of spin is deflected. In the precessional device 8, the two rotors 120 and 121 represent two spinning masses with axes of spin D'—D' and E'—E'. The law of precession states that if the spin axis of a spinning mass (i.e., flywheels 24a–24b and 25a–25b) is deflected by a torque that is perpendicular to the spin axis, the mass will react with a precessional torque that is perpendicular to both the spin axis and the deflecting torque. In the case of precessional device 8, first and second deflecting torques $D_1$ and $D_2$ are provided by the operator initially through the hand crank 9 turning rotors 120 and 121 during the startup time period and then during operation by the force of the operator's arms against handles 20a and 20b which creates a third deflecting torque $D_3$ (deflecting torques $D_1$, $D_2$, and $D_3$ will be discussed in further detail below).

In the precessional device 8, as explained, the first and second rotors 120 and 121 each are "spinning masses." Rotors 120, 121 each have two flywheels 24a–24b, 25a–25b mounted at different points on their respective axles to achieve a more compact design for the precessional device 8. The pairs of flywheels are balanced and mounted such that each of the rotors 120, 121 possess the same rotational inertia about their spin axes D'—D' and E'—E'. Rotational inertia may be explained as follows. The inertia of each of the rotors 120, 121 about their spin axes D'—D' and E'—E', is the sum of the moments of inertia of each particle of mass in the rotor. The moment of inertia of a particle with mass m, a distance r from a spin axis, is $mr^2$, and the total rotational inertia of the rotor is $mr_{avg}^2$. By concentrating the mass of the rotors in the outer perimeter of the flywheels, the rotational inertia about the spin axes D'—D' and E'—E' may be maximized. A body is said to spin when all of its particles move in circles about a common axis with a common angular velocity (ω). As discussed above, torque applied so as to tend to change the axis about which a body is spinning results in a precession effect. Precession is explained by one of Newton's Laws of motion which states: the time rate of change of angular momentum about any given axis is equal to the torque applied about the given axis. The formula that defines the resultant torque is T=IωrΩ, where I is the inertia of the rotor about its spin axis, the longitudinal axis formed by the length of the axle and Ω is the rate of precession. It is about each of the precession spin axes D'—D' and E'—E' that the rotors 120, 121 achieve a spin velocity sufficient enough to precess at a detectable magnitude. By maximizing rotational inertia (I) about the spin axes D'—D' and E'E', a greater applied torque is needed to produce the same rate of precession, $\Omega$. The position of the flywheels along the axis of the axle does not affect the distance $r_{avg}$, and therefore has no effect on the flywheels inertia with respect to the spin axis. Thus, assuming each flywheel is properly weighted and balanced the first rotor 120 will have the same inertia about its spin axis as the second rotor 121. Assuming they spin at the same rate, identically applied torques will produce identical precessional torques.

FIGS. 17A–17C show the precessional device 8 in three different exemplary positions that it may be used for anaerobic and aerobic exercise. FIG. 17A shows the device 8 being pushed and pulled straight out from the chest and FIGS. 17B and 17C show the device 8 being operated at an angle with the same push/pull motion.

FIG. 17A shows the operator holding the precessional device 8 in accordance with a typical method of operation. In this method of operation, the operator starts the rotors 120 and 121 moving with the hand crank 9 and then removes the hand crank 9 after the rotors 120, 121 are up to speed. Next, the operator holds the device 8 in front of his body at chest level by the handles 20a and 20b with the right hand on handle 20a and the left hand on handle 20b. In this method, the precessional device 8 is used with the operator pushing out with one hand against a variable precessional force and pulling back with one hand against a variable precessional force. (From the perspective of the operator grasping the handles 20a and 20b, the precessional torque produced by the device 8 is perceived as a force and it is therefore convenient to use the term "net precessional force" when specifying the resistance the operator is pushing or pulling against on the handles 20a and 20b. $NP_R$ will be used to indicate the net precessional force the operator feels acting on his right hand as he grasps handle 20a and $NP_L$ will be used to indicate the net precessional force the operator feels acting on his left hand as he grasps handle 20b. "Total precessional torque" (TPT) will be used to indicate substantially the net precessional torque acting on the device 8 during operation due to the rotors 120 and 121).

Figure 18A:
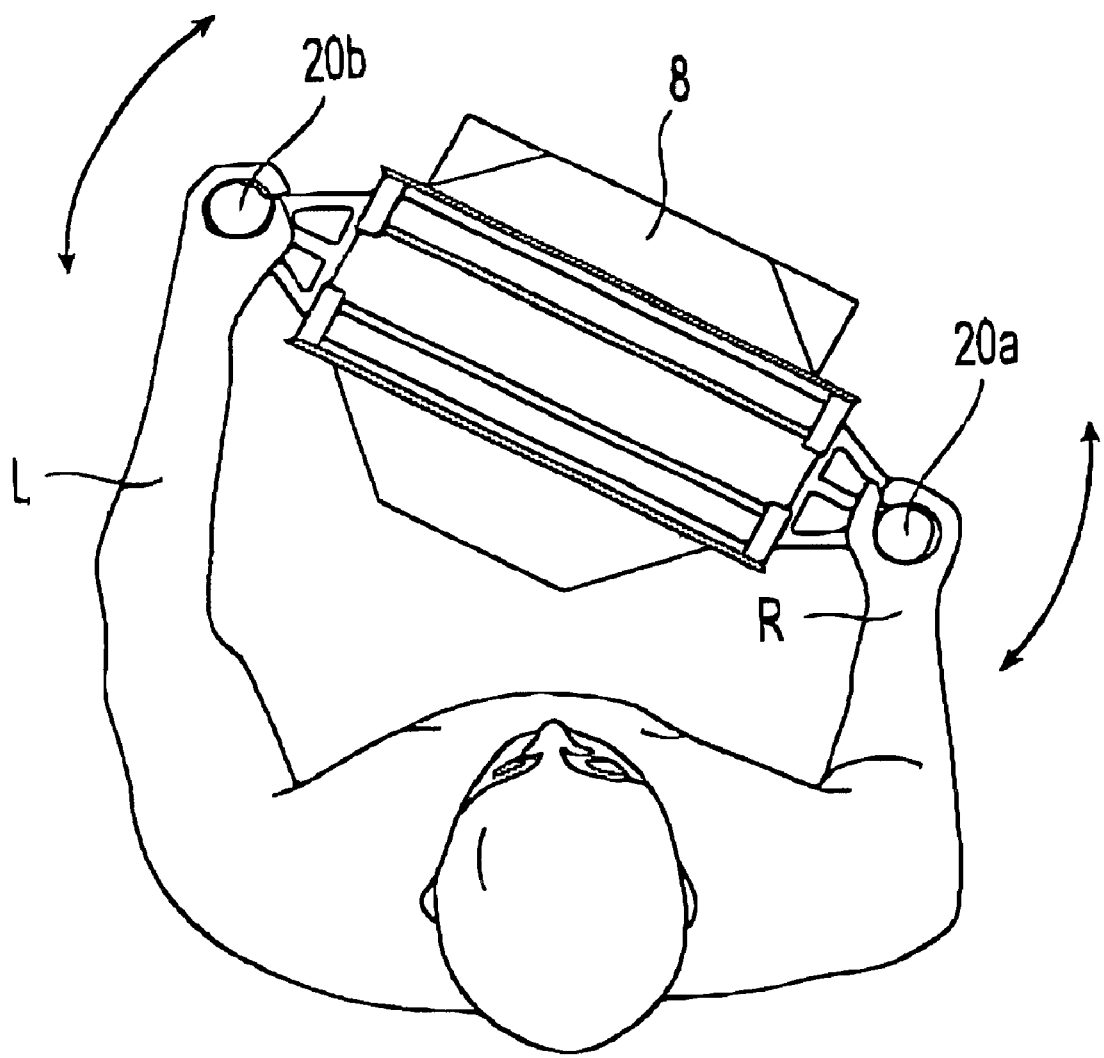
FIG. 18A shows a top view of the operator with the device in a first operating position.
Figure 18B:
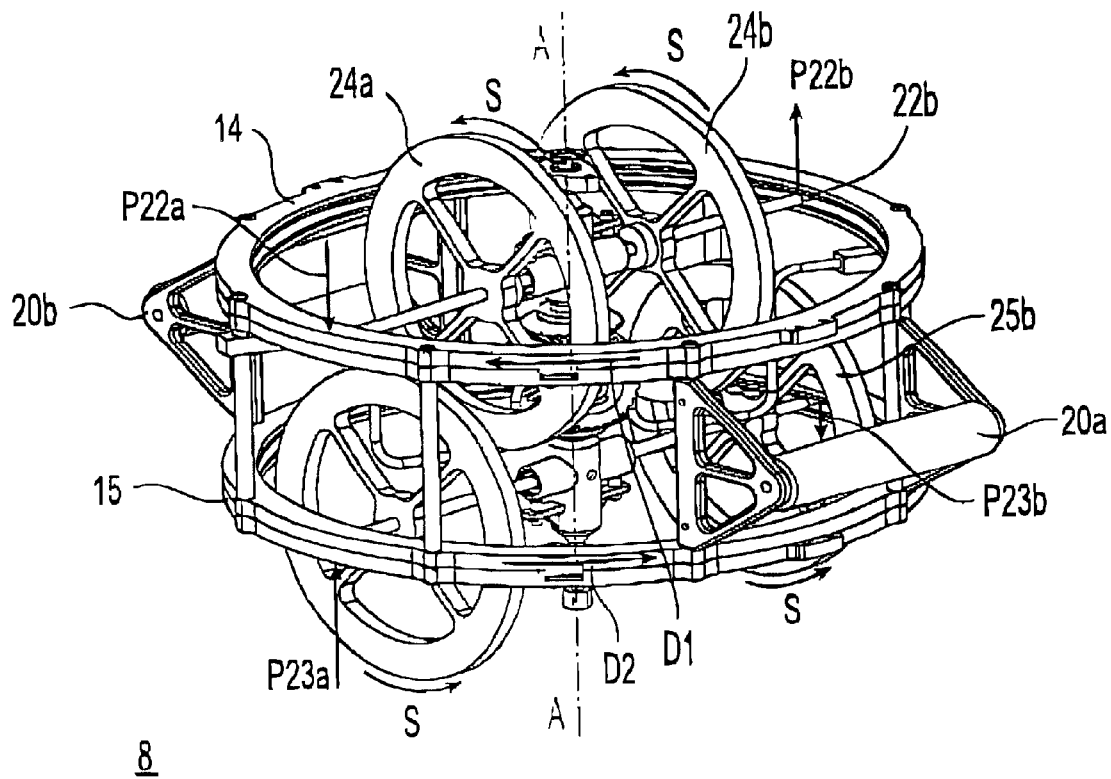
FIG. 18B shows a perspective cutaway view of the device with the rotors in the first operating position.
Figure 18C:
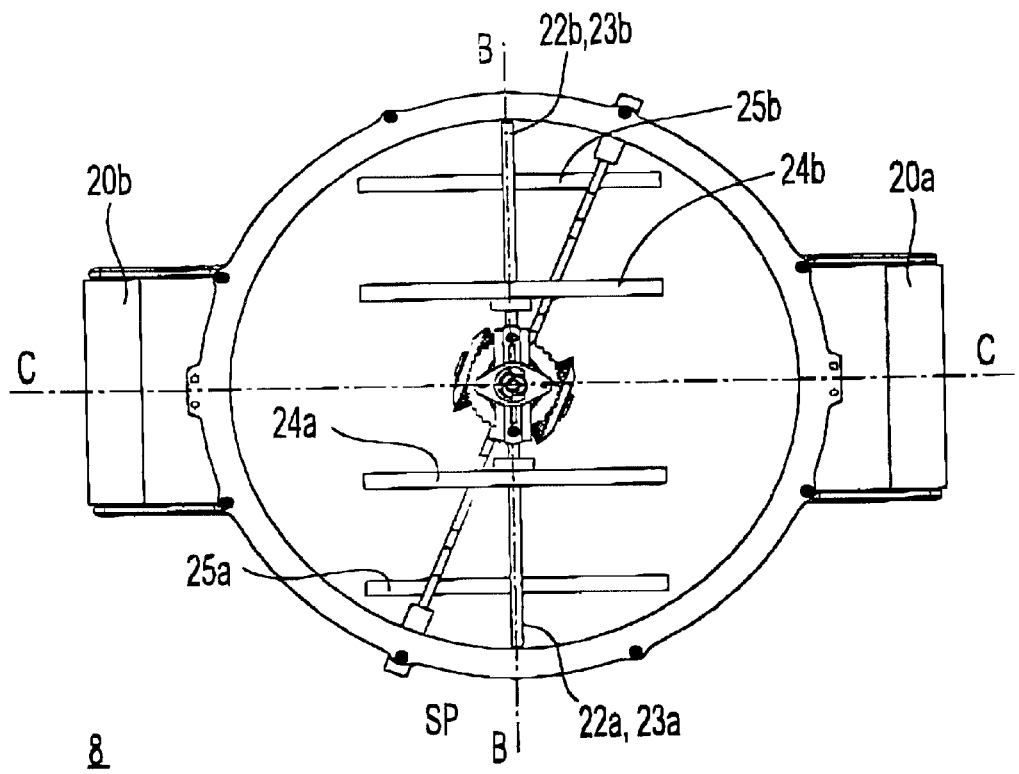
FIG. 18C shows a top cutaway plan view of the device with the rotors in the first operating position.

The first operating position, as shown in FIG. 18A, has the operator's right arm R holding the handle 20a near the operator's body in a fully contracted position and the operator's left arm L holding the handle 20b in a fully extended position. As shown in FIGS. 18B and 18C, given the fixed equivalent moment of inertia (I) of each of the rotors 120 and 121, the magnitude of the total precessional torque (TPT) produced by the device is determined by the rate of axial rotation of axes 22 and 23 in races 17 and 19. The direction of the total precessional torque (TPT) is determined by the orientation of a deflecting torque relative to the direction of the spinning masses, flywheels 24a–25b. As previously discussed, deflecting torques $D_1$ and $D_2$ (as shown in FIG. 18B) are initially produced by the operator's manipulation of the crank 9 which deflects the spin axes D'—D' and E'—E' of the axles 22 and 23 containing the flywheels 24a–25b. In turn, the deflecting torque $D_1$ will produce precessional torque in rotor 120 that exerts forces P22a and P22b through contact between the axle tips 22a and 22b and race 17 to the entire structure of the precessional device 8. Deflecting torque $D_2$ will produce precessional torque in rotor 121 that exerts forces P23a and P23b acting through contact between axle tips 23a and 23b and race 19 to the entire structure of the precessional device 8.

SP as shown in FIG. 18C indicates the starting point of axle tip 22a and will be used as a comparison point to locate the position of axle tip 22a as it travels around race 17. (Note that SP is an arbitrary starting point and the device 8 may be started with the axles 22 and 23 located in any orientation around the races 17 and 19). At point SP, axle tip 22a is at 0 degrees from the starting point. S indicates the direction of spin of each of the flywheels 24a–24b and 25a–25b.

In the first operating position as shown in FIG. 18A, the operator is about to begin extending the right hand and pulling or contracting with the left hand. An operator will have completed a full stroke when the right arm R is fully extended and the left arm L is fully retracted. An operator will have completed a full cycle or two strokes when the right arm is fully retracted back to the starting position and the left arm L is fully extended back to the starting position.

At the first operating position, the operator's right arm R is contracted and his left arm L is extended. This position is a momentary state of equilibrium where there are no substantial net forces being generated by the device 8 or the operator. As illustrated by FIG. 18B, precessional forces P22a, P23a and P22b, P23b are approximately equal and in opposite directions so they will substantially cancel each other out. Therefore, the operator will not feel a net precessional force $NP_R$ or $NP_L$ the device 8 in either hand R or L.

Figure 19A:
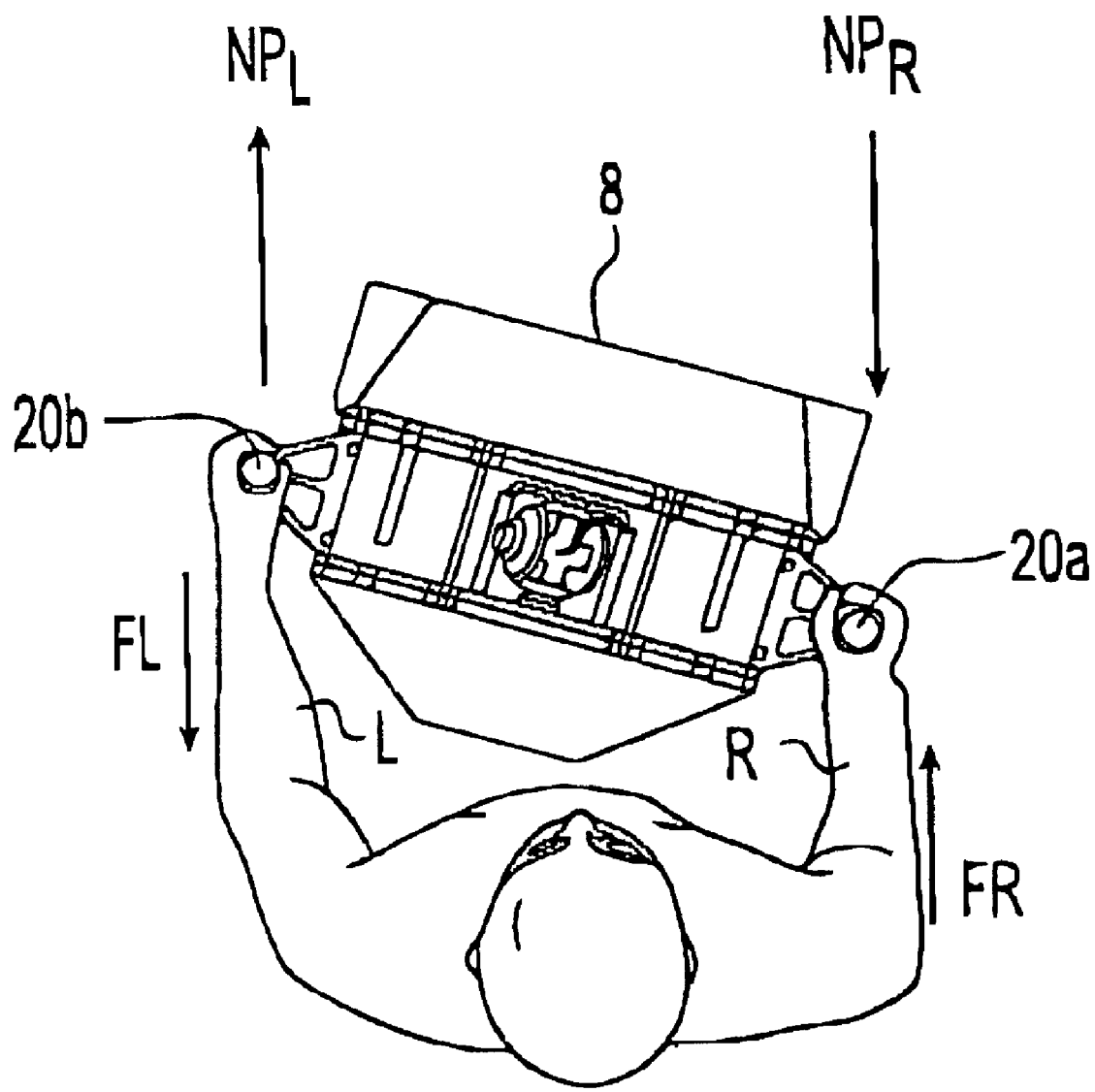
FIG. 19A shows a top view of the operator with the device in a second operating position.
Figure 19B:
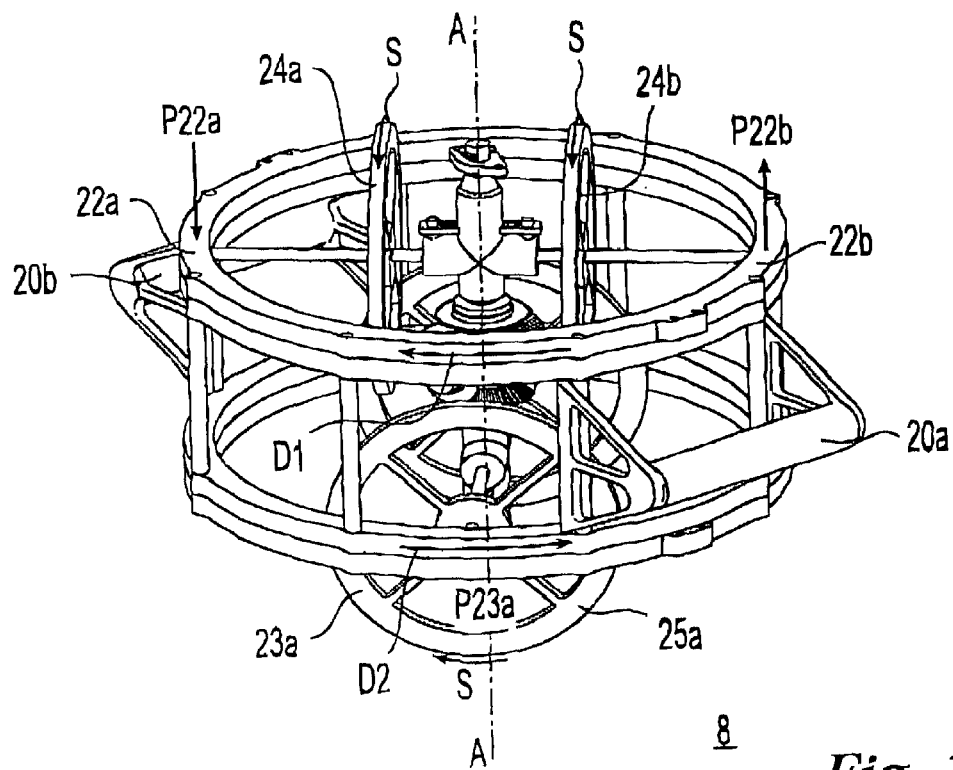
FIG. 19B shows a perspective cutaway view of the device with the rotors in the second operating position.
Figure 19C:
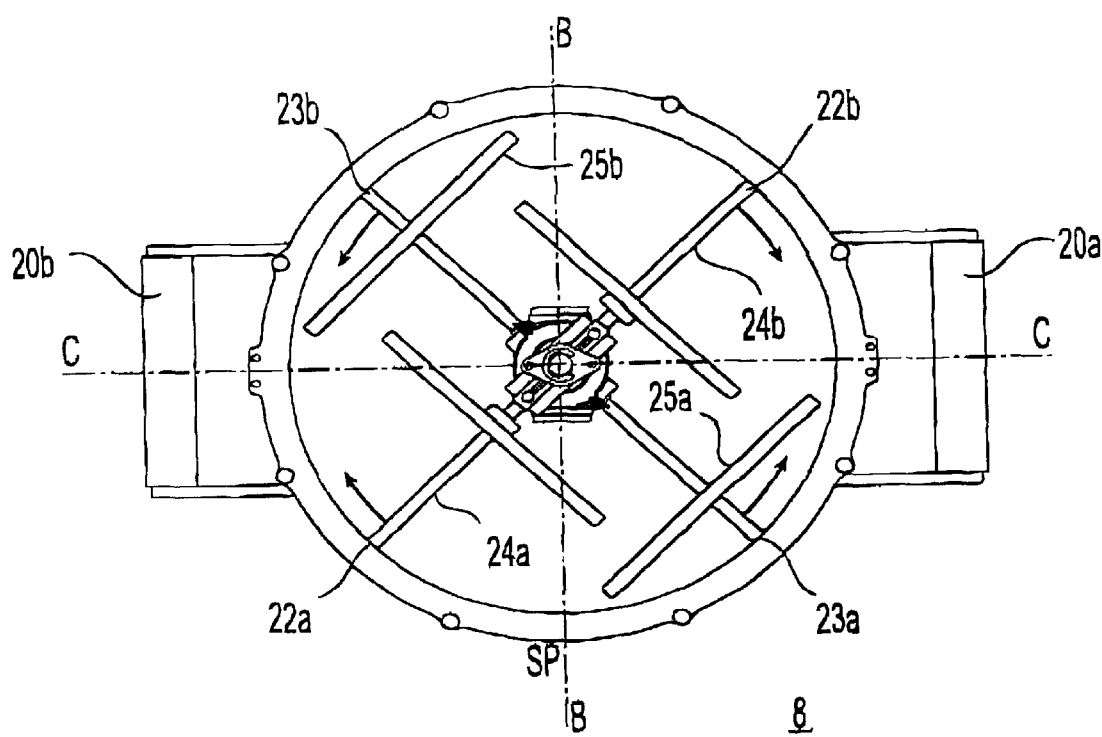
FIG. 19C shows a top cutaway plan view of the device with the rotors in the second operating position.

FIGS. 19A–19C illustrate the second operating position with axle tip 22a at 45 degrees from the starting point SP. FIG. 19A shows the operator's right arm R pushing against $NP_R$ (net precessional force on right handle) with force $F_R$ and a quarter of the way through a stroke. At the second operating position, $NP_R$ is equal to the sum of P22b and P23a. FIG. 19A also shows the operator's left hand L pulling against $NP_L$ (net precessional force on left handle) with force $F_L$ and also a quarter of the way through a stroke. $NP_L$ is equal to the sum of P23a and P23b.

Figure 20A:
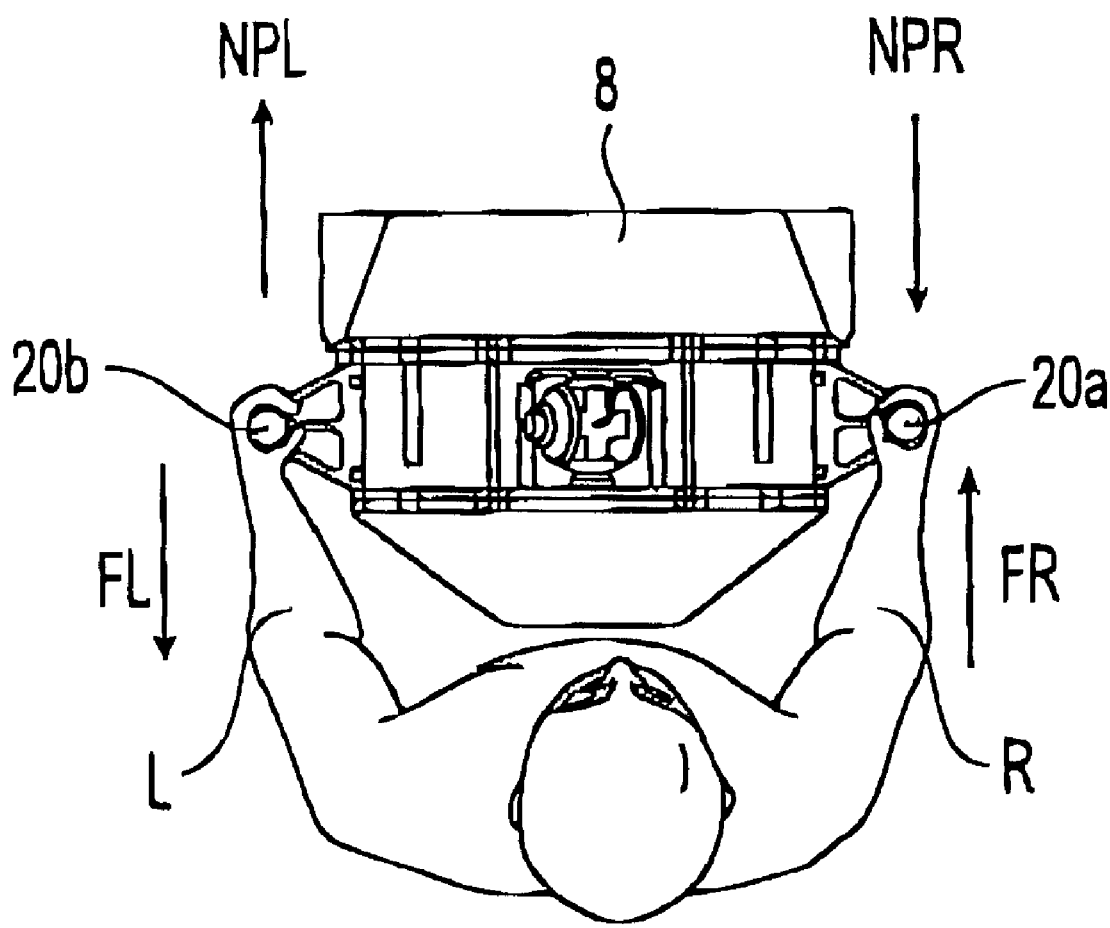
FIG. 20A shows a top view of the operator's hands in relation to the forces acting on the device in a third operating position.
Figure 20B:
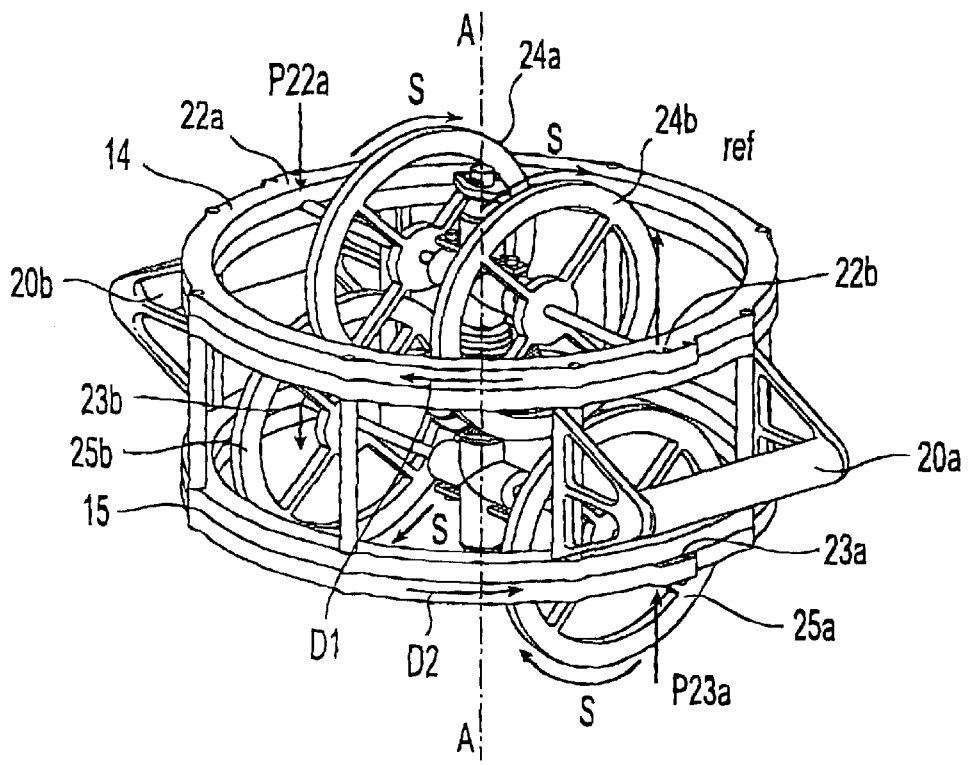
FIG. 20B shows a perspective cutaway view of the device with the rotors in the third operating position.
Figure 20C:
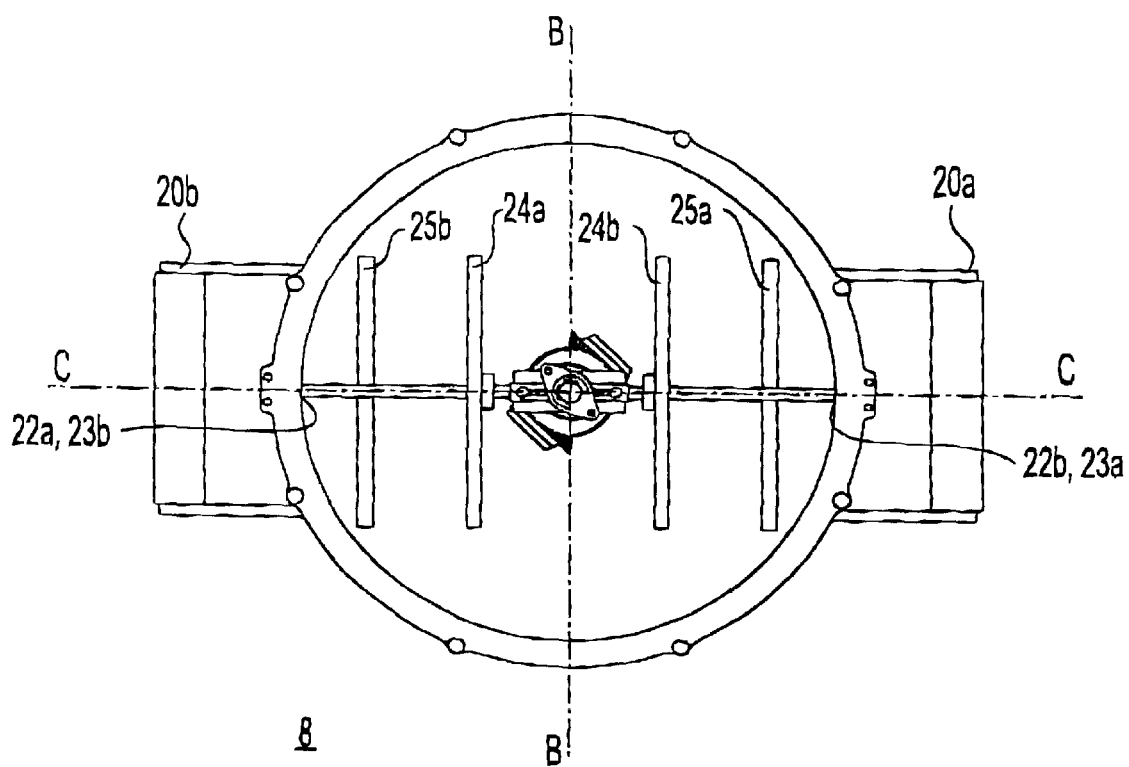
FIG. 20C shows a top cutaway plan view of the device with the rotors in the third operating position.

FIGS. 20A–20C illustrate the third operating position with axle tip 22a at 90 degrees from starting point SP. FIG. 20A shows the operator's right and left arms R, L at positions halfway through the stroke traveling in opposite directions. $NP_R$ is at its maximum because P22b and P23a are adding with substantially no cancellation effects and $NP_L$ is also at its maximum because P22a and P23b are also substantially adding with no cancellation effects. Therefore, the operator is feeling maximum net precessional forces $NP_R$ and $NP_L$ against him in each arm at this operating position.

Figure 21A:
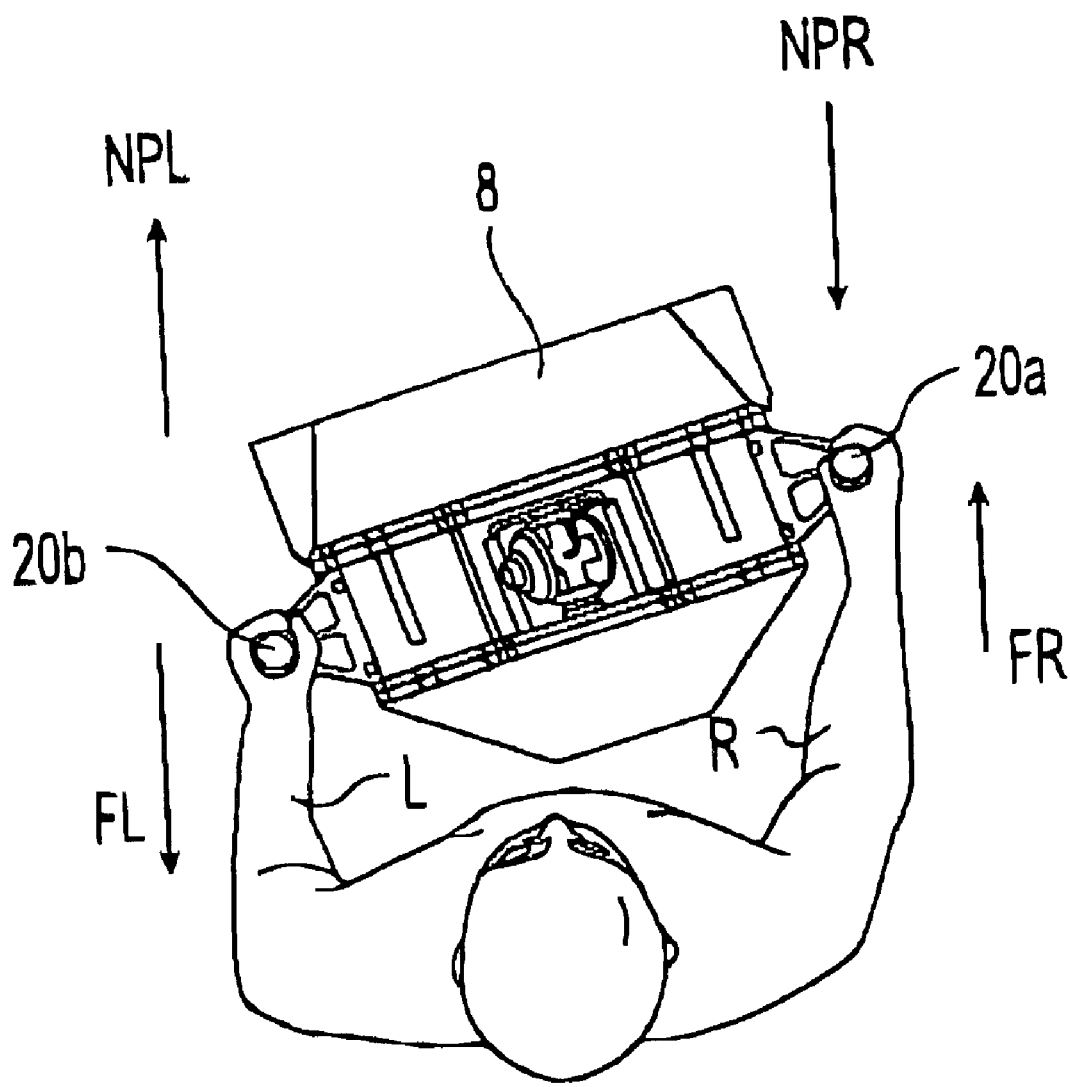
FIG. 21A shows a top view of the operator with the device in a fourth operating position.
Figure 21B:
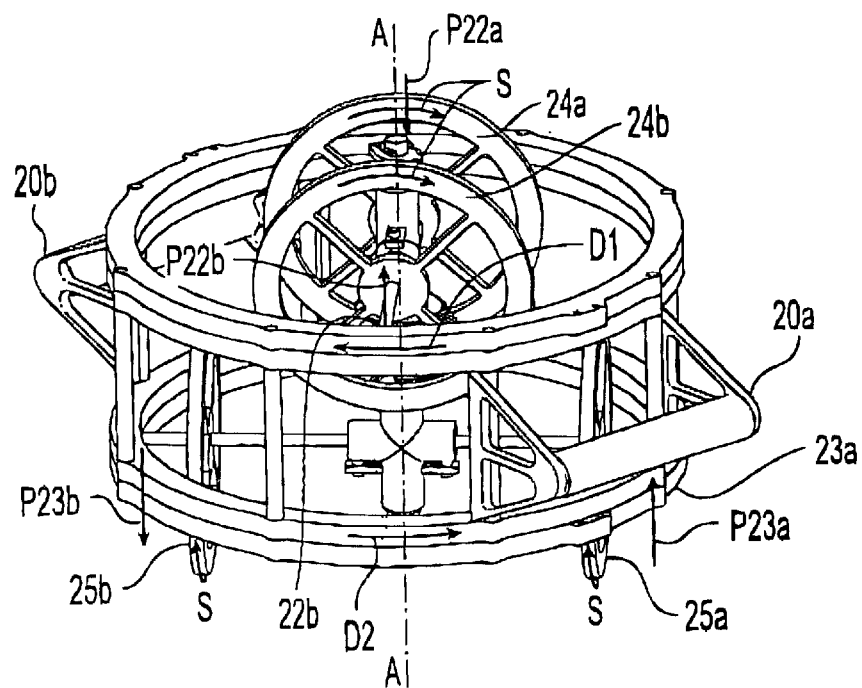
FIG. 21B shows a perspective cutaway view of the device with the rotors in the fourth operation position.
Figure 21C:
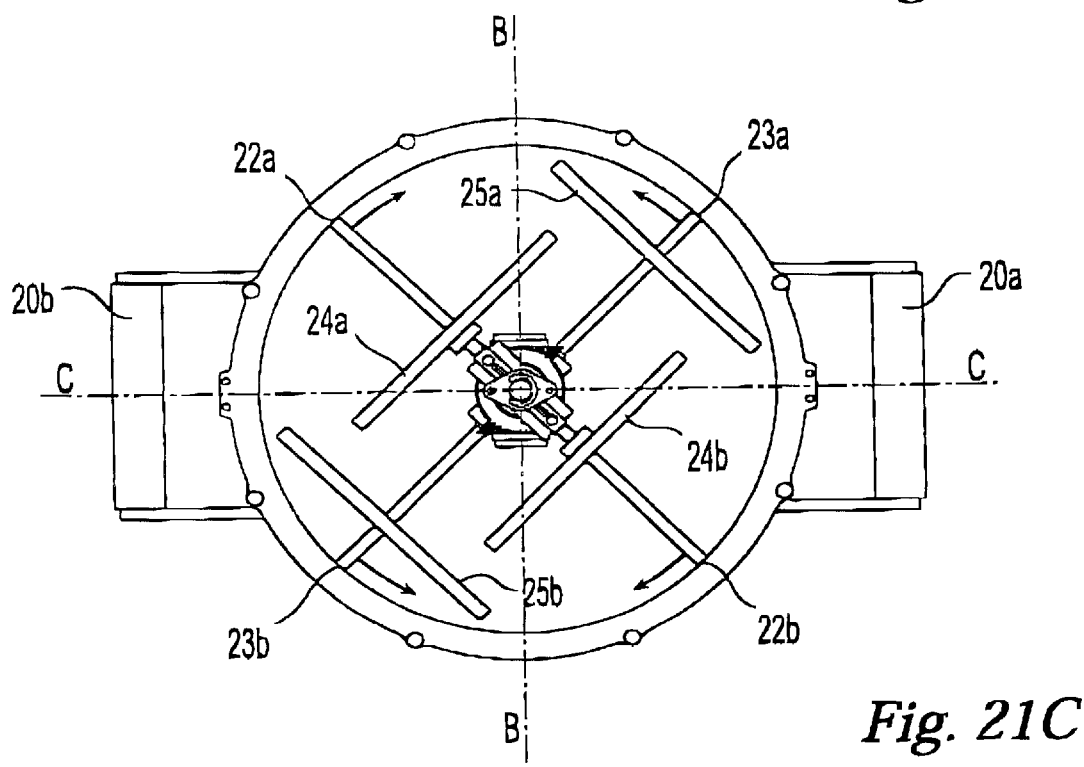
FIG. 21C shows a top cutaway plan view of the device with the rotors in the fourth operating position.

FIGS. 21A–21C illustrate the fourth operating position with axle tip 22a at 135 degrees from the starting point SP. In this position the right arm R is almost fully extended and the left hand is almost fully contracted close to the body. $NP_R$ is the sum of P22b and P23a and $NP_L$ is the sum of P22a and P23b. $NP_R$ and $NP_L$ have both weakened since the third operating position.

Figure 22A:
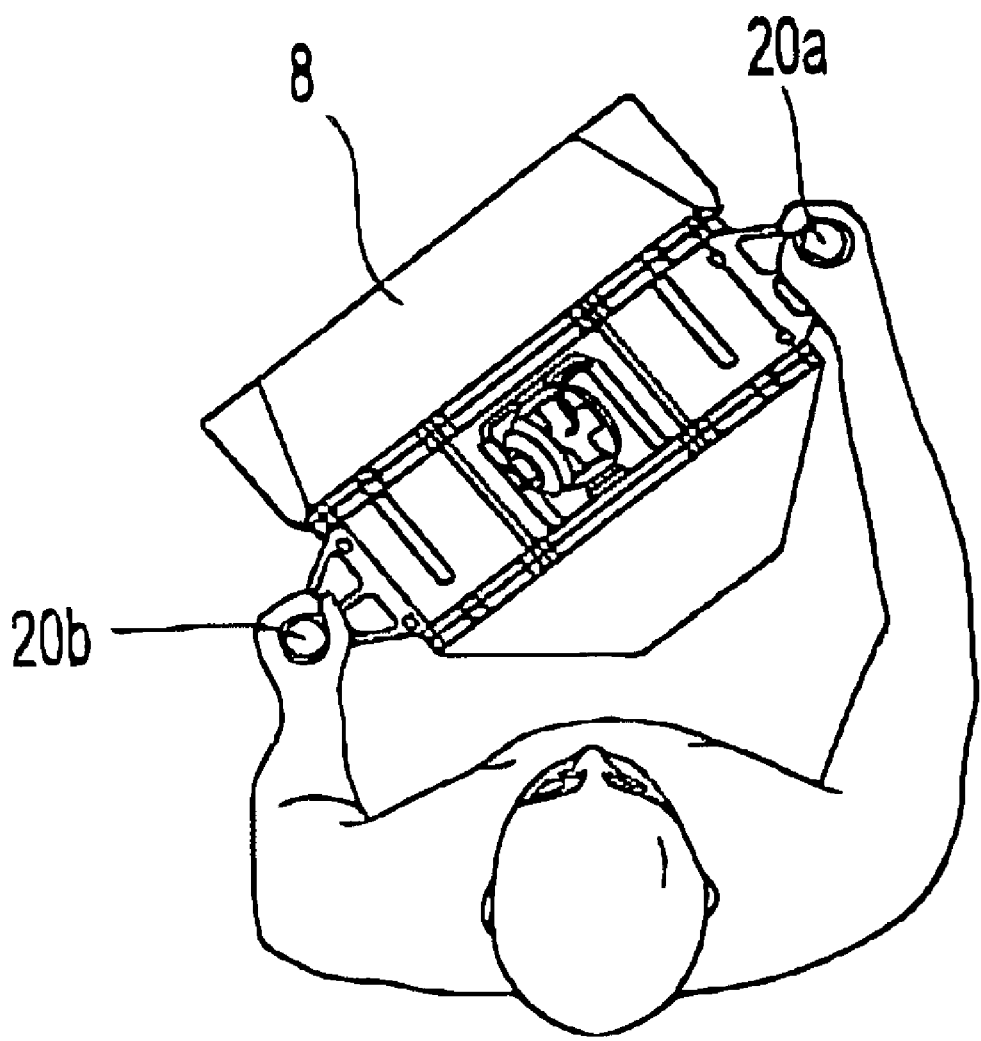
FIG. 22A shows a top view of the operator with the device in a fifth operating position.
Figure 22B:
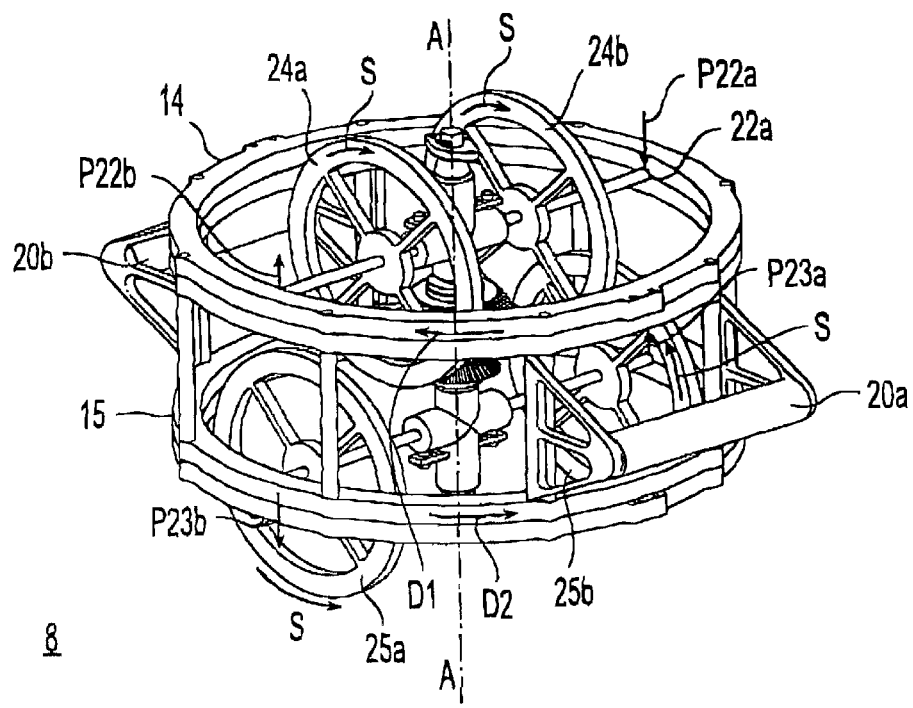
FIG. 22B shows a perspective cutaway view of the device with the rotors in the fifth operating position.
Figure 22C:
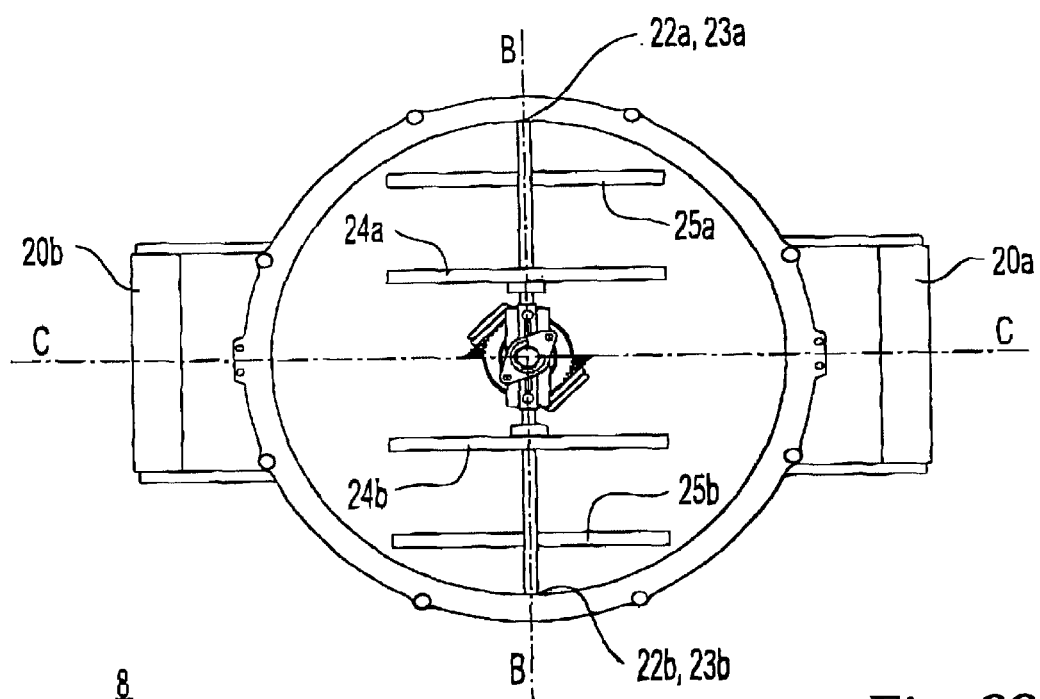
FIG. 22C shows a top cutaway plan view of the device with the rotors in the fifth operating position.

FIGS. 22A–22C illustrate the fifth operating position with axle tip 22a at 180 degrees from the starting point SP. In this position, the right hand R is fully extended and the left hand L is fully retracted close to the body. $NP_R$ and $NP_L$ are both substantially zero due to the canceling effect of P22a, P23a and P23a, P23b. Likewise, the operator is exerting substantially no force at this point of equilibrium. In this position the operator has completed a first full stroke and is about to begin a second full stroke.

Figure 23A:
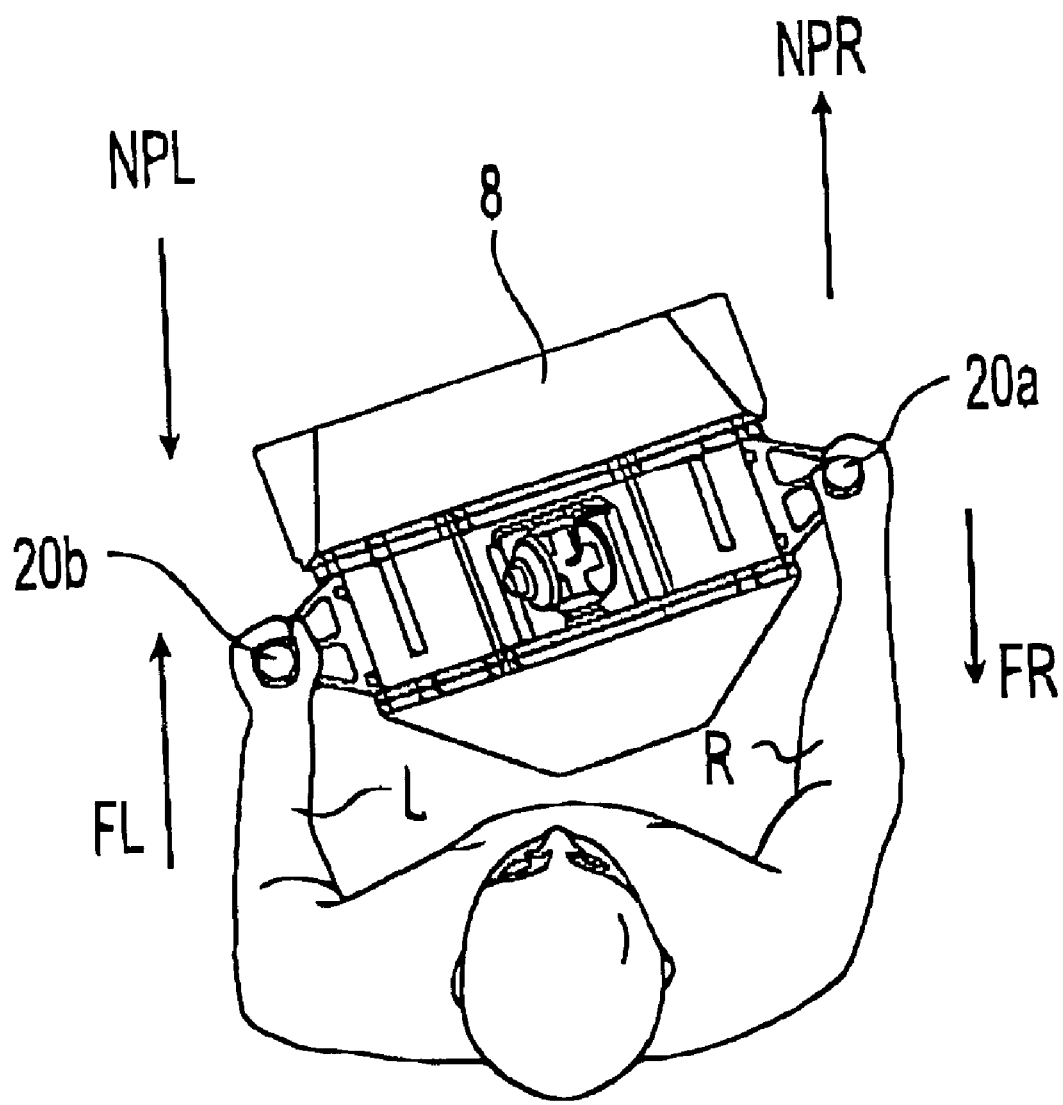
FIG. 23A shows a top view of the operator with the device in a sixth operating position.
Figure 23B:
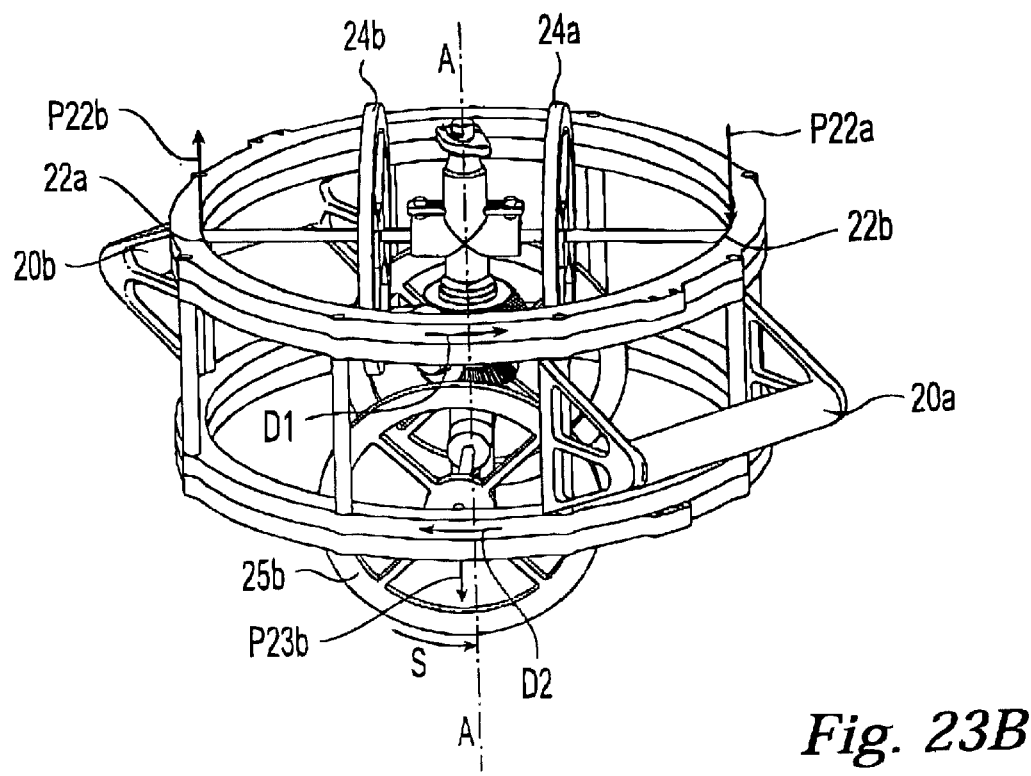
FIG. 23B shows a perspective cutaway view of the device with the rotors in the sixth operating position.
Figure 23C:
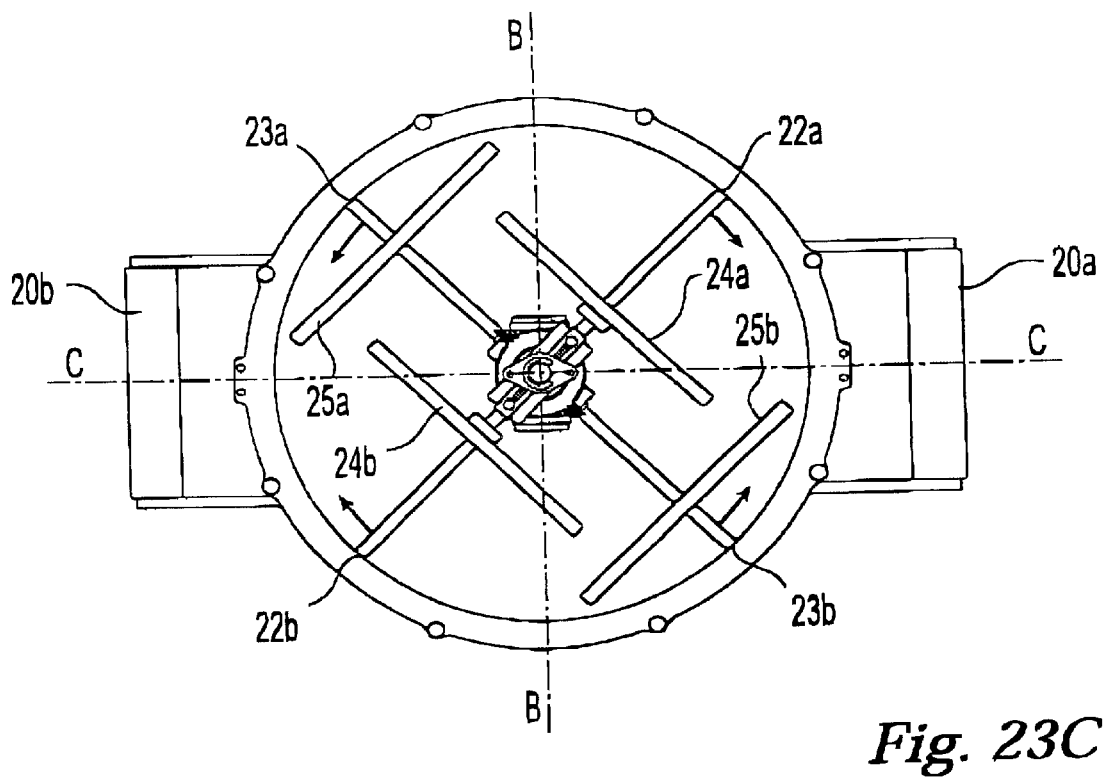
FIG. 23C shows a top cutaway plan view of the device with the rotors in the sixth operating position.

FIGS. 23A–23C illustrate the sixth operating position with axle tip 22a at 225 degrees from the starting point SP. In this position, the right arm R is pulling against precessional force $NP_R$ with force $F_R$ and the left hand is pushing against precessional force $NP_L$ with force $F_L$. $NP_R$ is equal to P22a summed with P23b and $NP_L$ is equal to P22b summed with P23a (not shown in FIG. 23B).

Figure 24A:
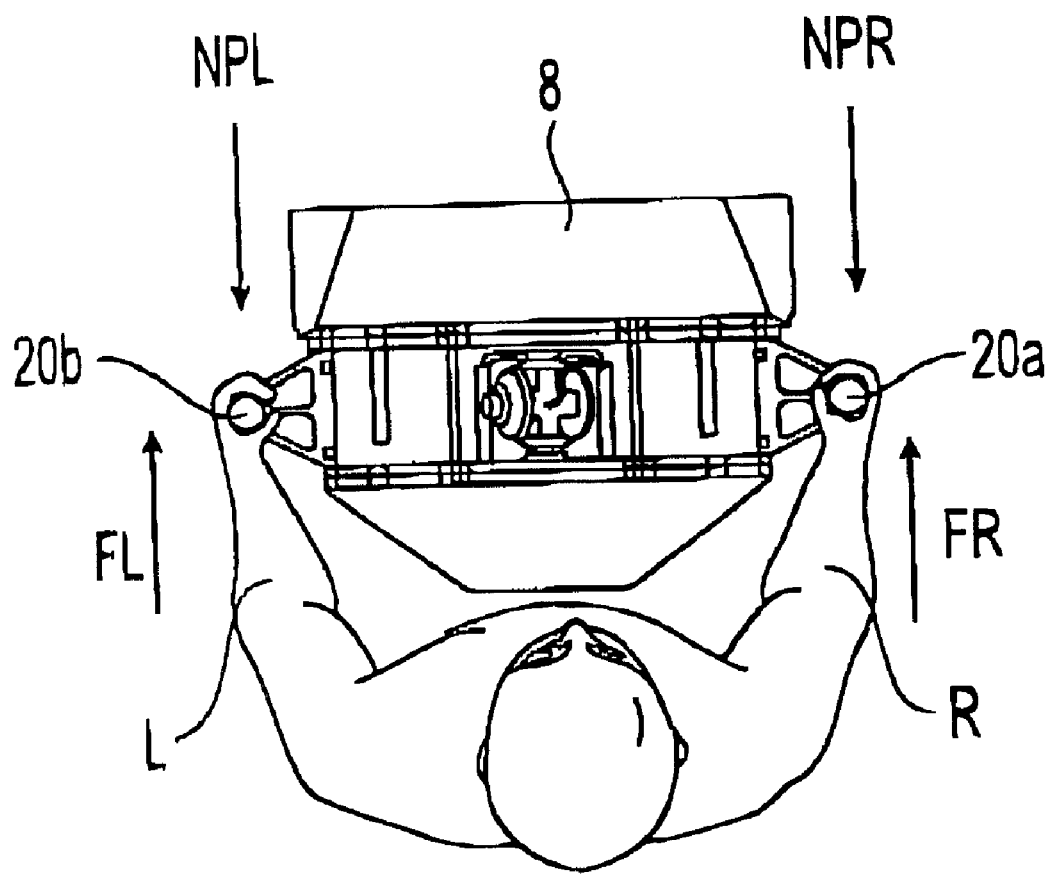
FIG. 24A shows a top view of the operator with the device in a seventh operating position.
Figure 24B:
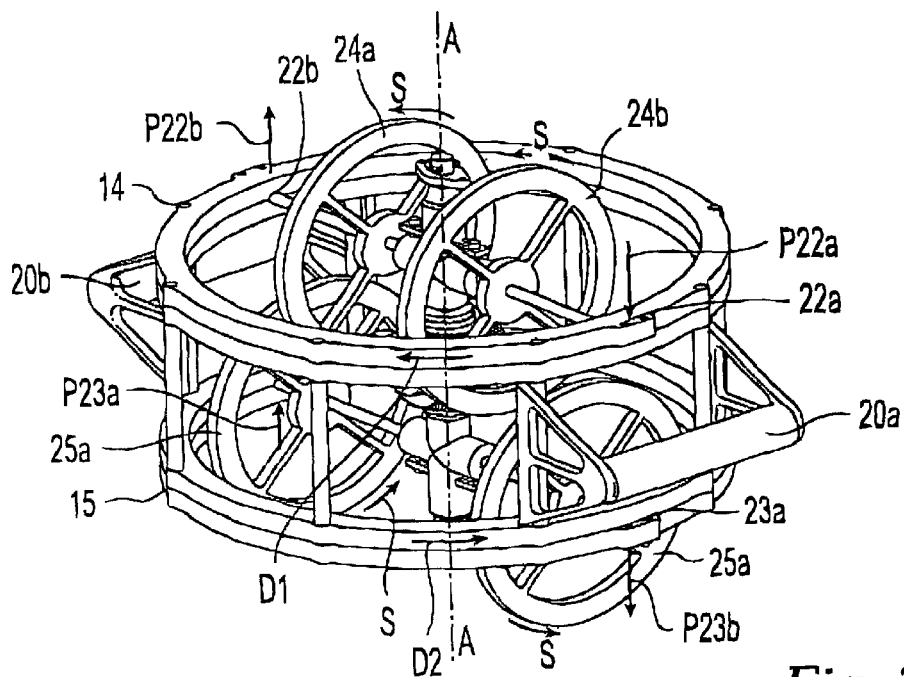
FIG. 24B shows a perspective cutaway view of the device with the rotors in the seventh operating position.
Figure 24C:
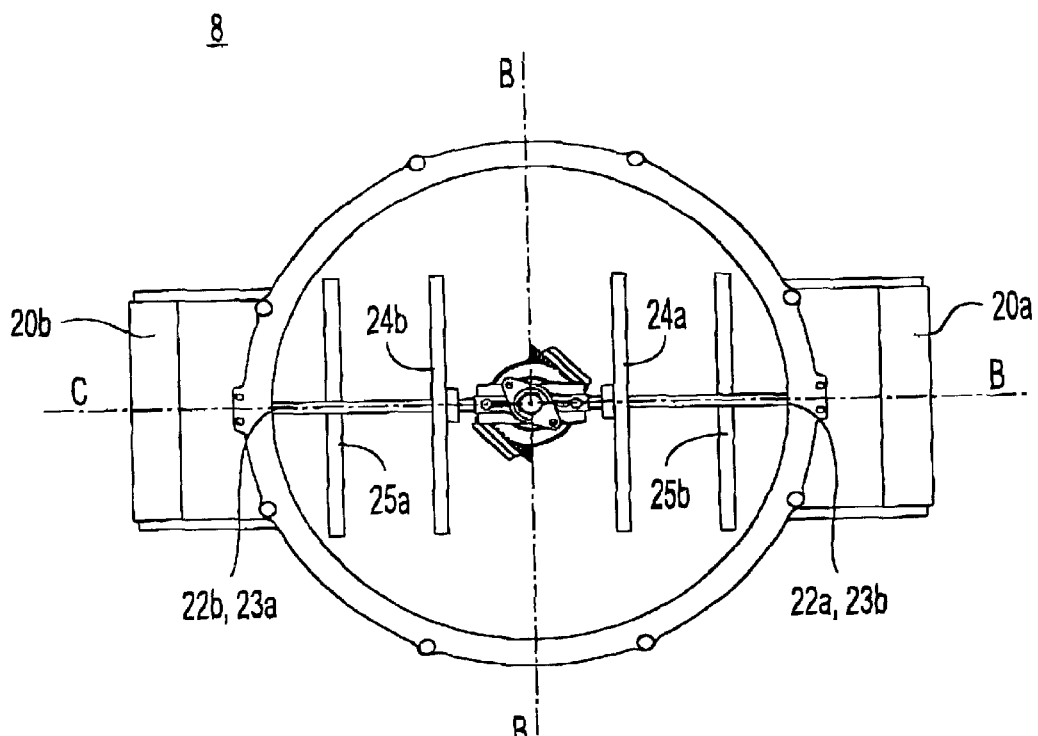
FIG. 24C shows a top cutaway plan view of the device with the rotors in the seventh operating position.

FIG. 24A–24C illustrate the seventh operating position with axle tip 22a at 270 degrees from the starting point SP. In this position, the right arm R is pulling against maximum precessional force $NP_R$ of force $F_R$ and the left arm L is pushing against maximum precessional force $NP_L$ with force $F_L$. $NP_R$ is equal to P22b summed with P23b and $NP_L$ is equal to P22a summed with P23a.

Figure 25A:
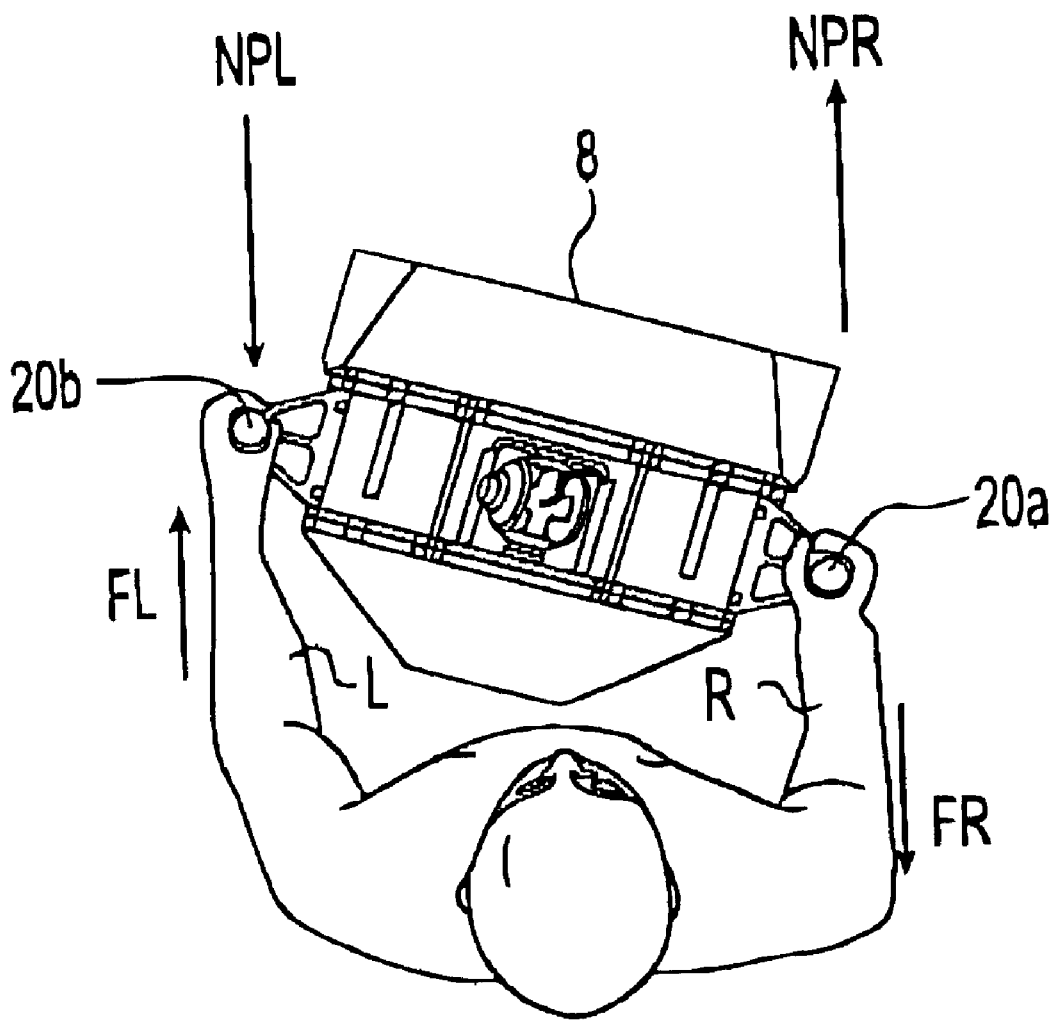
FIG. 25A shows a top view of the operator with the device in an eighth operating position.
Figure 25B:
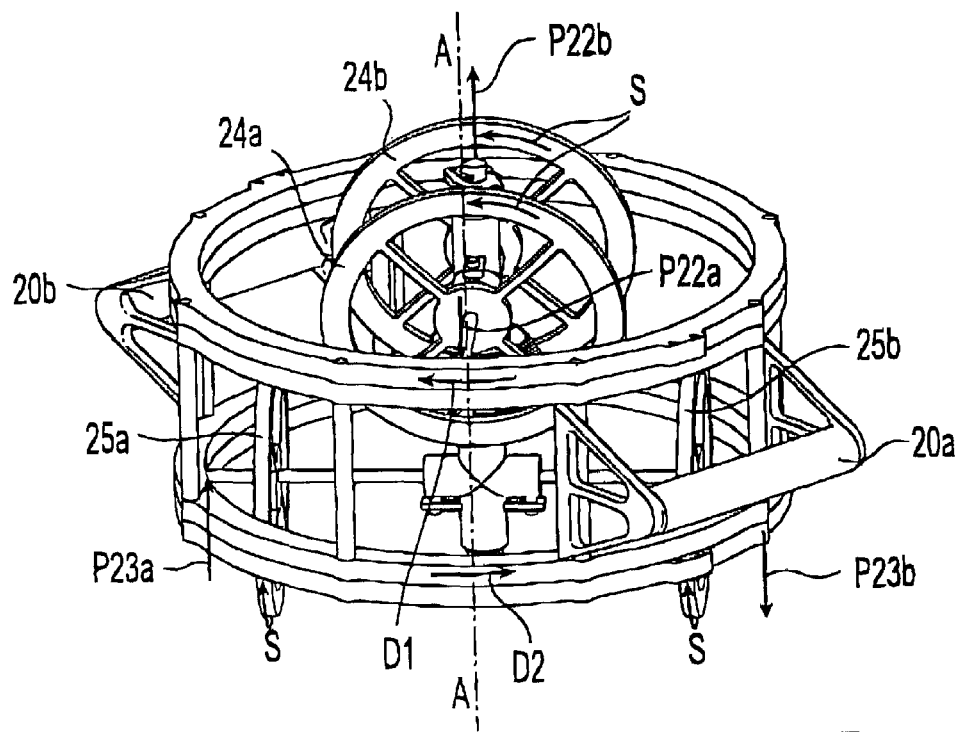
FIG. 25B shows a perspective cutaway view of the device with the rotors in the eighth operating position.
Figure 25C:
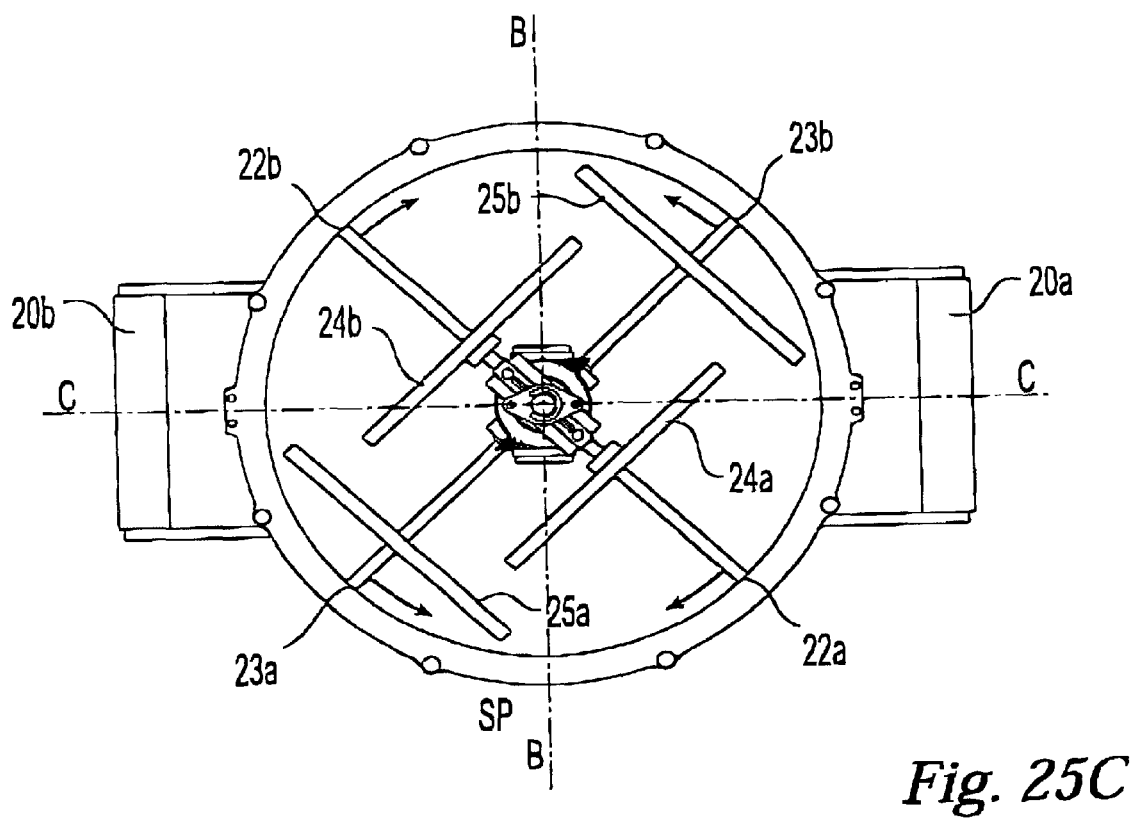
FIG. 25C shows a top cutaway plan view of the device with the rotors in the eighth operating position.

FIGS. 25A–25C illustrate the eighth operating position with axle tip 22a at 315 degrees from the starting point SP. In this position, the right arm R is pulling against a lessening precessional force $NP_R$ with force $F_R$ and the left arm L is pushing against a lessening precessional force $NP_L$ with force $F_L$. $NP_R$ is equal to P22b summed with P23b and $NP_L$ is equal to P22a summed with P23a.

Figure 26A:
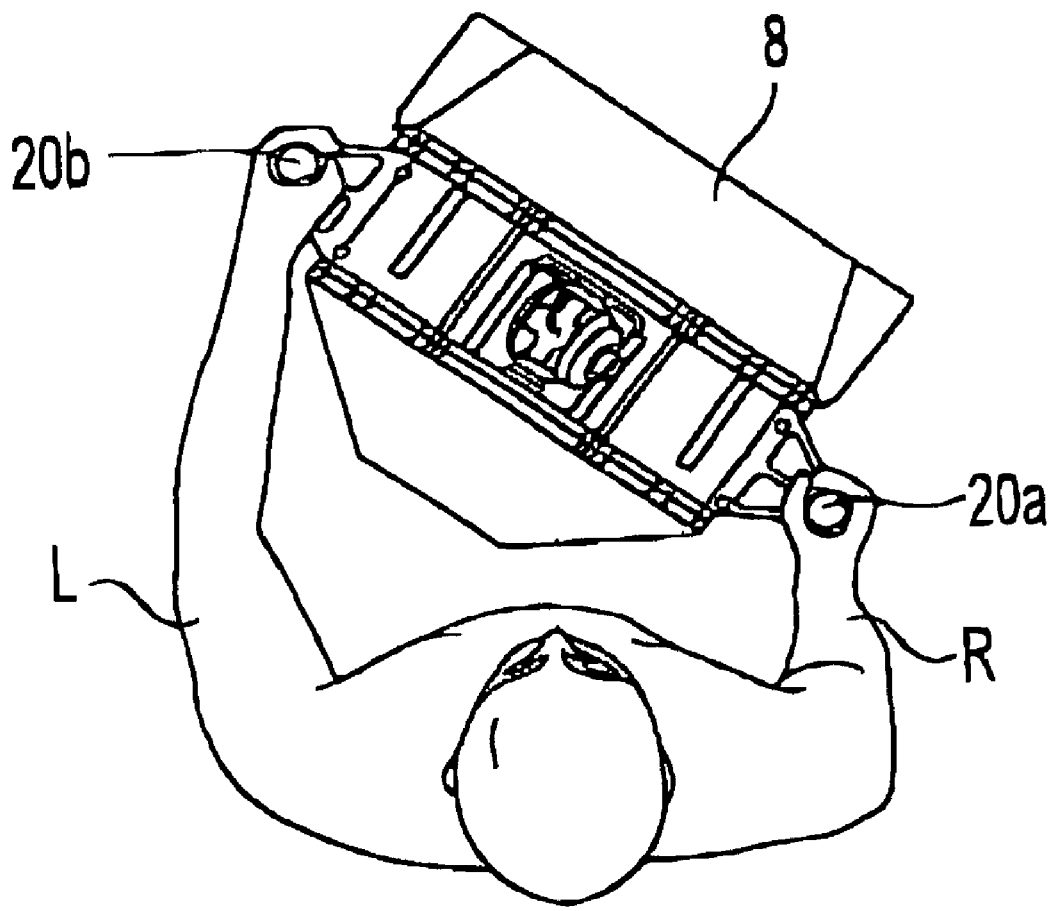
FIG. 26A shows a top view of the operator with the device back in the first operating position and a cycle completed.
Figure 26B:
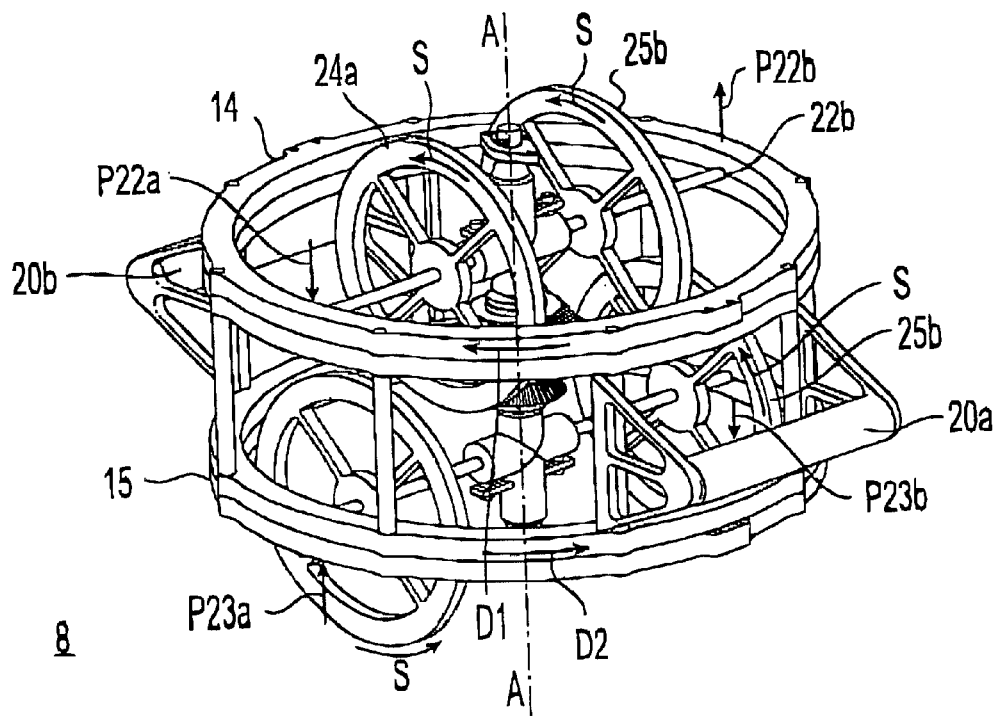
FIG. 26B shows a perspective cutaway view of the device with the rotors back in the first operating position.
Figure 26C:
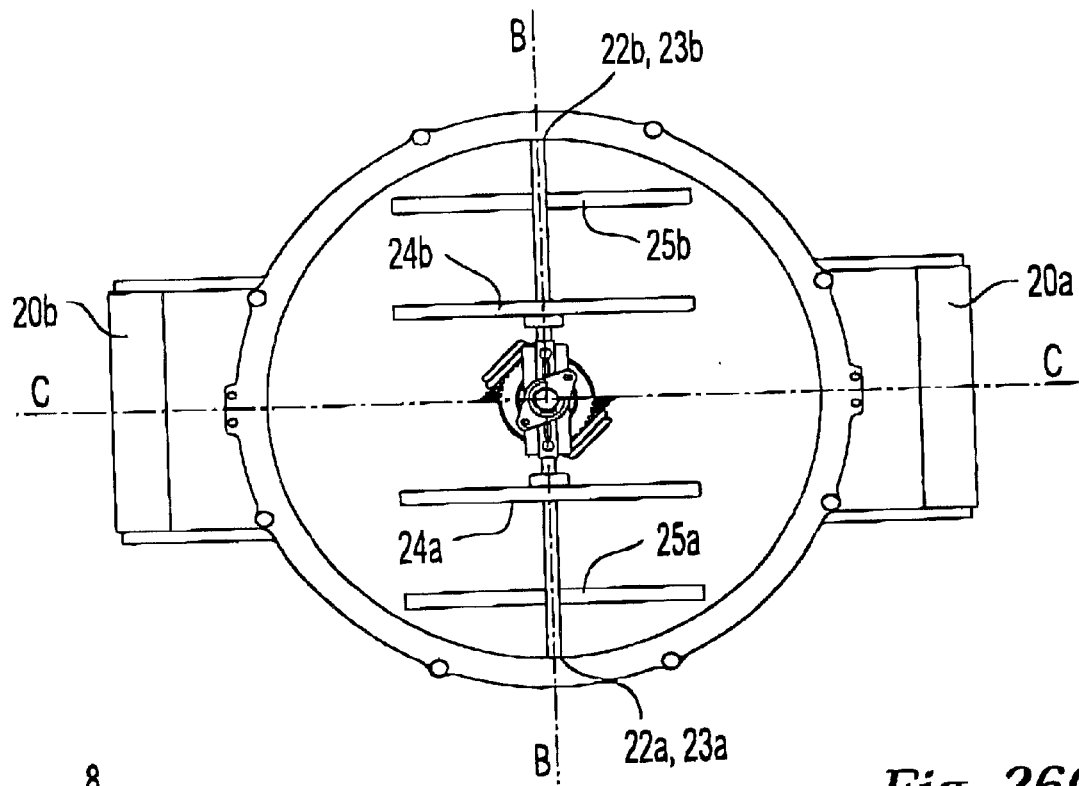
FIG. 26C shows a top cutaway plan view of the device with the rotors back in the first operating position.

FIGS. 26A–26c illustrate the ninth and final operating position with the axle tip 22a at 360 degrees. This is the same point of equilibrium as the first operating position and the operator has finished the second stroke and also completed a full cycle.

Figure 27A:
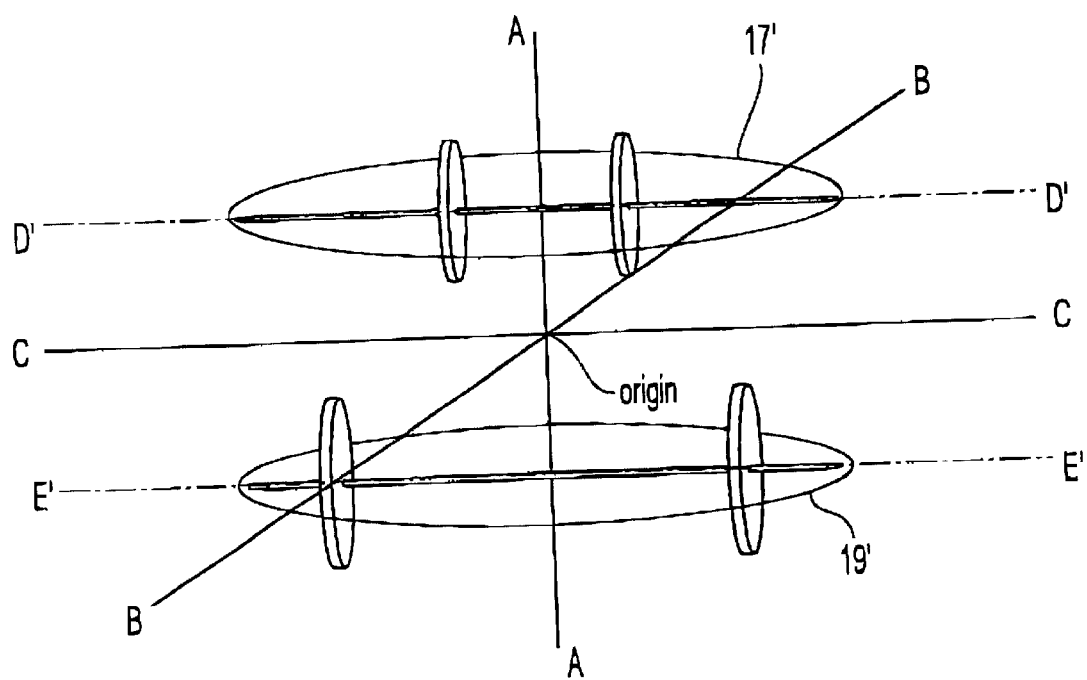
FIG. 27A illustrates the first and second rotors rotating in first and second planes.
Figure 27B:
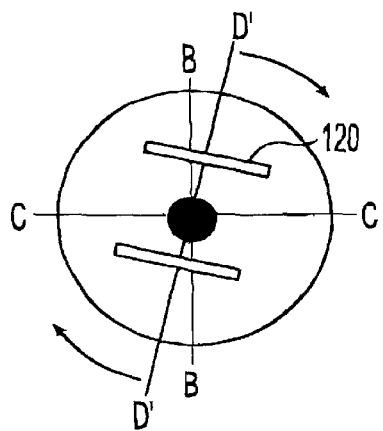
FIG. 27B shows a top cutaway view of the first rotor as it transitions between the first position and the second position (for example purposes) and rotating in a clockwise direction.
Figure 27C:
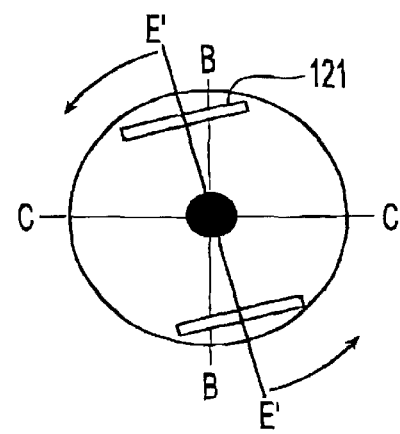
FIG. 27C shows a top cutaway view of the second rotor as it transitions between the first position and the second position (for example purposes) and rotating in a counter-clockwise direction.

FIG. 27A illustrates a conceptual drawing of the three-dimensional space bounded by the device 8. The space is primarily defined by three axes A—A, B—B and C—C. The origin of the space is fixed as the central point of the transmission 86. (The transmission 86 is not shown in the conceptual view). The origin lies equidistant between the two races 17 and 19 which are shown forming two circular rotational planes 17' and 19' in FIG. 27A. As previously discussed, the axis defined by the first spinning axis 22 is labeled D'—D'. The axis defined by the second spinning axis 23 is labeled E'—E'. FIG. 27B shows a top plan view of the first rotor 120 as it transitions between the first and second operating positions (corresponding to FIGS. 18A–19C) and the rotation of axis D'—D' in relation to axes B—B and C—C. FIG. 27C shows a top plan view of the second rotor 121 as it transitions between the first and second operating position and the rotation of axis E'—E' in relation to axes B—B and C—C (with first rotor 120 not shown).

Figure 27D:
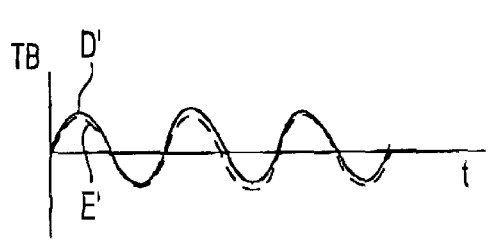
FIG. 27D shows a diagram of the torque about axis B generated by the first and second rotors compared on the same graph over time.

FIG. 27D shows a graph illustrating the precessional torques about the B—B axis ($T_B$) due to axle 22 (D') and axle 23 (E') plotted over time (t). The graph shows three complete cycles or revolutions of the axles 22 and 23 about axis A—A. The precessional torque due to axles 22 and 23 are substantially equal and complementing each other. Beginning with time t=0, the graph shows a sinusoidal wave with three complete cycles; each delineated top portion of the wave where $T_B>0$ represent the rotor 120 as it transitions from operating position 1 to 5 and the bottom portions of the wave where $T_B<0$ represent the device 8 as it transitions from operating positions 5 back to 1. Therefore, when the operator is performing a push/pull routine the precessional torque about the B axis will provide a variable resistance.

Figure 27E:
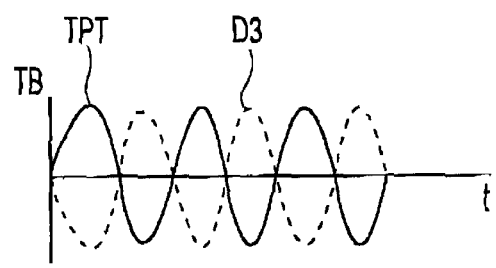
FIG. 27E shows a diagram of the net torque about axis B generated by the rotors and the operator on the same graph over time.

FIG. 27E shows a graph illustrating the net torques produced about axis B—B ($T_B$). The sum of the torques produced by axles 22 and 23 is the total precessional torque (TPT). The graph shows that the amplitude of the input of the operator which is deflecting torque $D_3$ is substantially equal to the output of the device 8 and the two are in an opposite phase relationship meaning that the output of one counteracts the output of the other. Disregarding the effects of surface friction and aerodynamic drag on the device 8, if the operator's deflecting torque $D_3$ and the total precessional torque (TPT) were equal it would result in the device 8 having no oscillating motion and the rotors 120, 121 would maintain a constant angular velocity. Since the moving parts of the device 8 do experience energy loss from surface friction and aerodynamic drag, in order to maintain constant velocity of the rotors 120, 121, the operator must exert a force $F_R$ that is greater than $NP_R$ and $F_L$ that is greater than $NP_L$. As a result, the operator effectively exerts a torque equivalent to the difference between $F_R$ and $NP_R$ multiplied by half the distance between the handles 20a and 20b (torque equals force times length of lever arm) and a torque equivalent to the difference between $F_L$ and $NP_L$ multiplied by half the distance between the handles 20a and 20b. This torque will be deflecting torque $D_3$, and it opposes the total precessional torque TPT. Whereas deflecting torques $D_1$ and $D_2$ deflect rotors 120 and 121 respectively, $D_3$ deflects both rotors 120 and 121. $D_3$ causes rotor 120 to produce a precessional torque that is aligned with $D_1$ and causes rotor 121 to produce a precessional torque that is aligned with $D_2$. In this fashion, the operator's manipulation of the handles 20a and 20b accomplishes the same result in accelerating the rotation of the rotors about the A—A axis that manipulation of the hand crank 9 initially did.

Figure 27F:
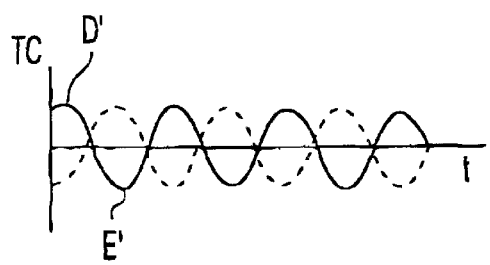
FIG. 27F shows a diagram of the torque about axis C generated by the first and second rotors compared on the same graph over time.
Figure 27G:
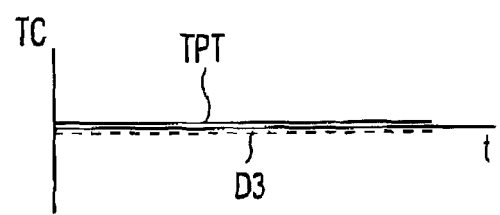
FIG. 27G shows a diagram of the net torque about axis C generated by the rotors and the operator on the same graph over time.

FIG. 27F shows a graph illustrating the precessional torques about the C—C axis ($T_C$) due to axle 22 (D') and axle 23 (E') plotted over time (t). The torques due to axles 22 and 23 cancel each other as shown by the total precessional torque about the C—C axis (TPT) in FIG. 27G. TPT and $D_3$ are substantially zero about the C axis as shown by the flat line graphs. FIGS. 27E and 27G demonstrate that the input and output torques ($D_3$ and TPT) oscillate or vary substantially along one dimension only (the axis B—B). Whereas FIGS. 27D and 27F show the torque from each rotor 120 and 121 varying about both axes B—B and C—C, the total precessional torque (TPT) oscillates only about axis B—B. This feature of the precessional device 8 allows the operator to obtain a controlled, variable resistance exercise routine.

Figure 27H:
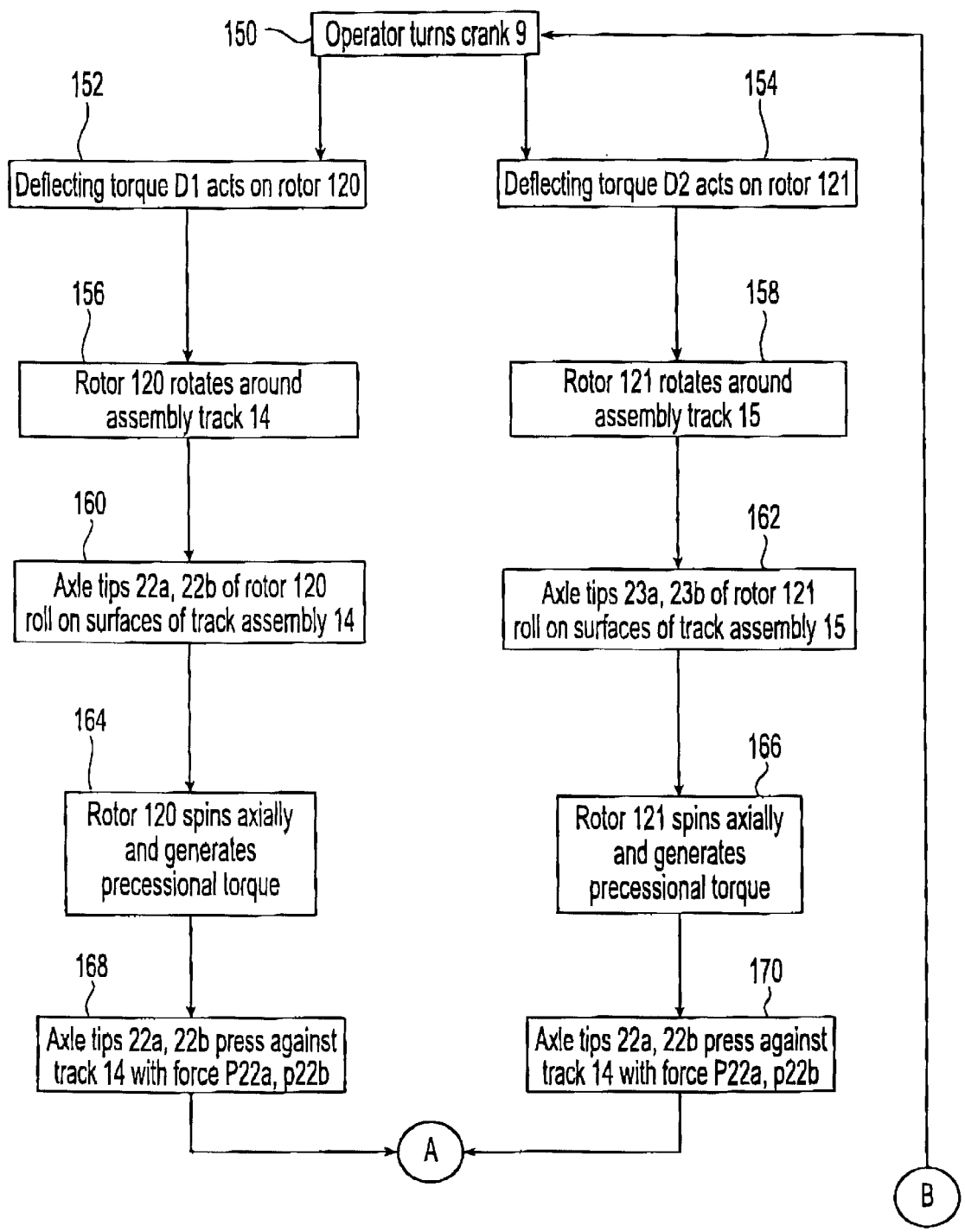
FIG. 27H–27J disclose a method of operation of the precessional device.
Figure 27I:
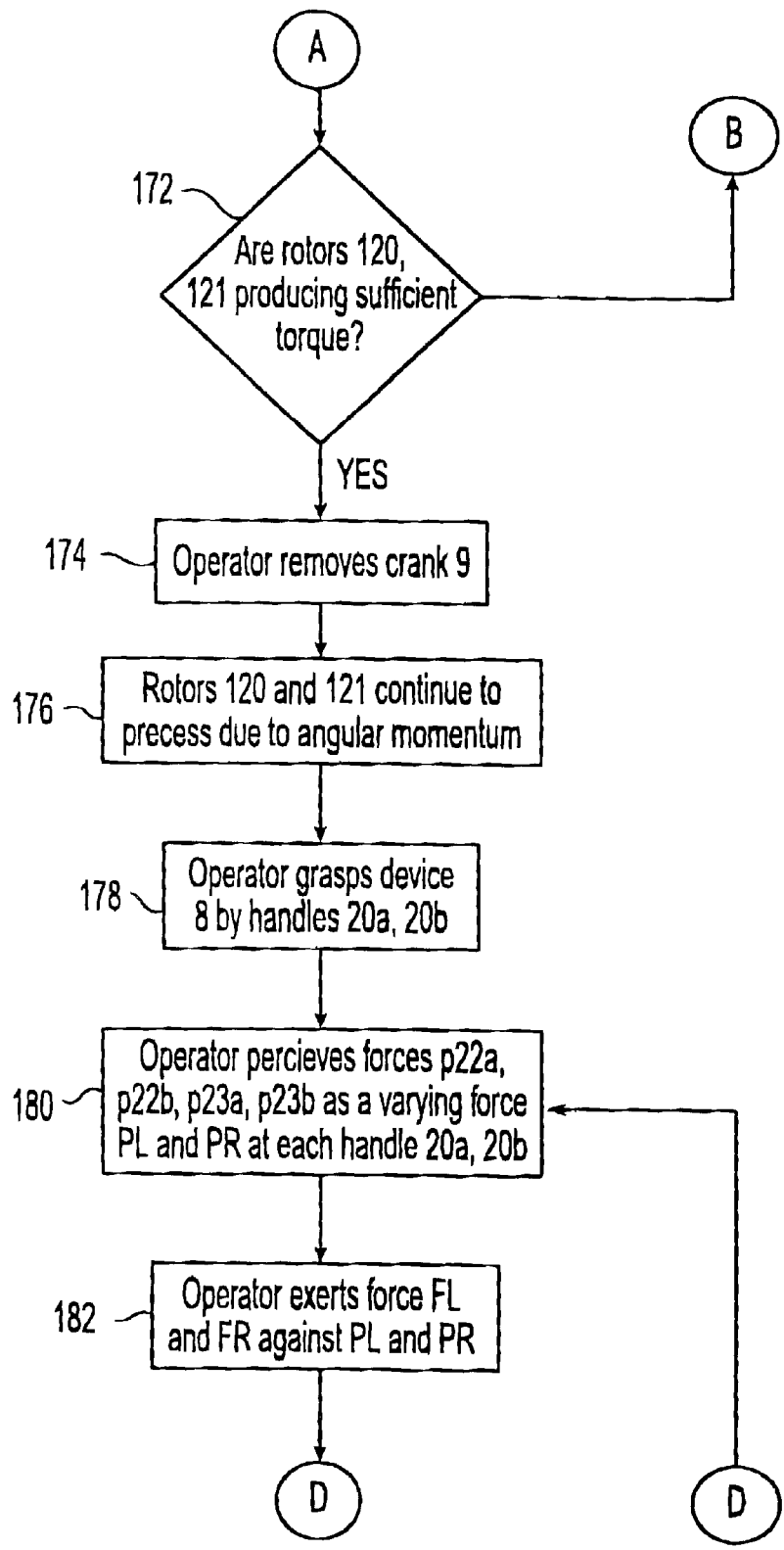
Figure 27J:
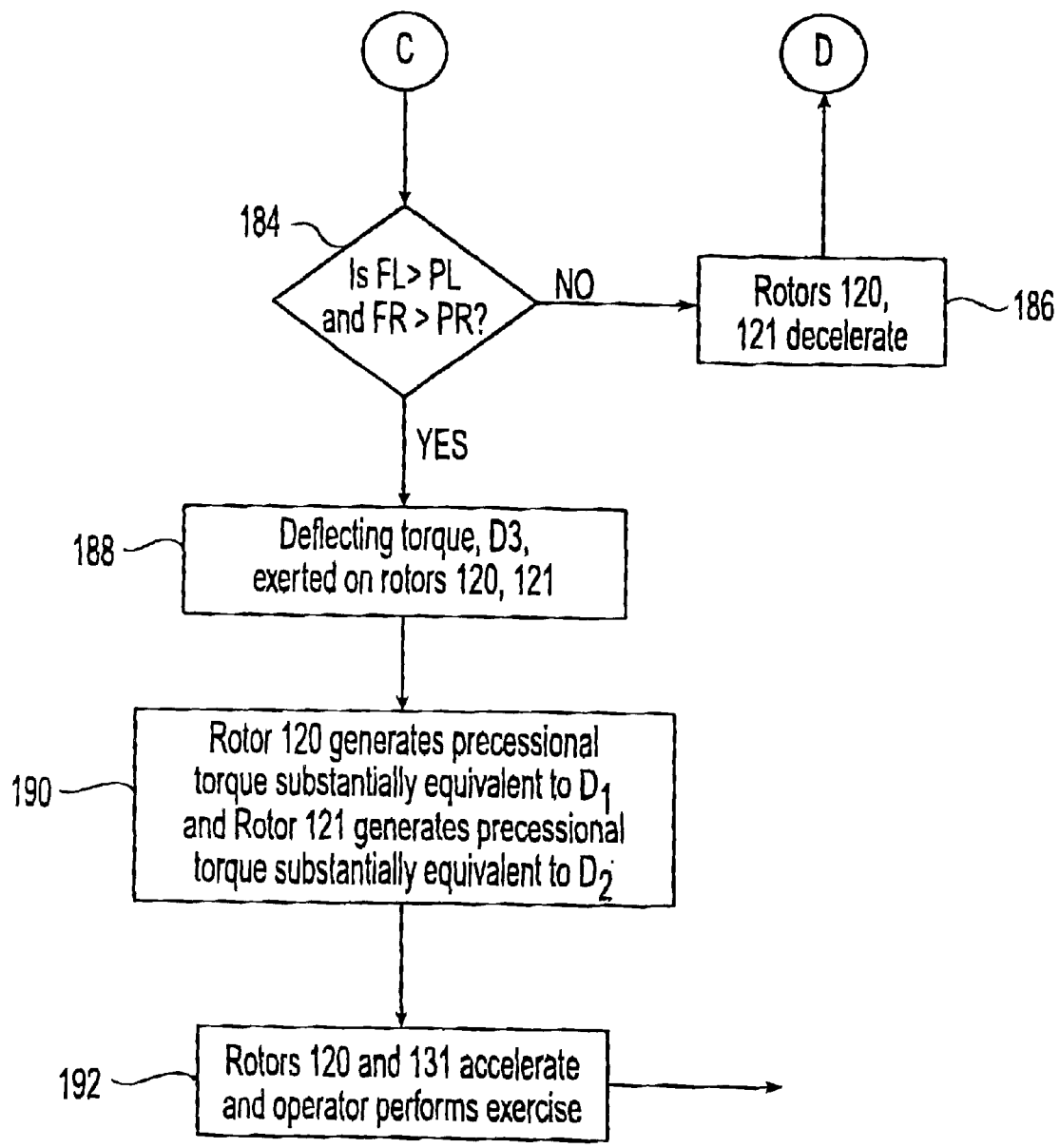

FIGS. 27H–27J disclose a method of operation of the first embodiment. The operator turns the hand crank 9 in a first step 150. Simultaneously in steps 152 and 154 deflecting torques $D_1$ and $D_2$ are created by the turning of the hand crank 9. In steps 156, 158 deflecting torques $D_1$ and $D_2$ drive rotors 120, 121 around rotational axis A—A. In steps 160, 162 axle tips 22a–22b and 23a–23b are frictionally driven by coming into contact with races 17 and 19 of track assemblies 14 and 15. In steps 164, 166 rotors 120 and 121 spin axially and generate precessional torques which are orthogonal to the rotational direction of the rotors. In steps 168, 170 axle tips 22a, 22b, 23a and 23b press against track assemblies 14 and 15 with precessional forces P22a, P22b, P23a and P23b, respectively. At step 172, a decision is made whether rotors 120 and 121 are generating sufficient torque. If not, the operator will repeat the cranking of the hand crank 9. If the rotors 120 and 121 are generating enough torque to begin a workout the operator will remove the crank 9 in step 174. Rotors 120 and 121 continue to precess in step 176 due to angular momentum. In the next step 178, the operator grasps precessional device 8 by handles 20a and 20b. In step 180, the operator perceives precessional forces P22a, P22b, P23a and P23b as varying net precessional forces $NP_L$ and $NP_R$ at handles 20a and 20b. In step 182, the operator exerts forces $F_R$ and $F_L$ against net precessional forces $NP_R$ and $NP_L$. In step 184, the forces $F_R$ and $F_L$ applied by the operator are compared to the net precessional forces $NP_R$ and $NP_L$. If the net precessional forces $NP_R$ and $NP_L$ are greater than the operator's applied forces $F_R$ and $F_L$, the rotors 120 and 121 decrease (step 186) and the operator will have to input greater force to maintain the intensity of the exercise routine. Third deflecting torque $D_3$ is applied by the operator on rotors 120 and 121 (step 188). Rotor 120 will generate a precessional equivalent to $D_1$ and rotor 121 will generate a precessional torque substantially equivalent to $D_2$ (step 190). Rotors 120 and 121 continue to accelerate and the operator performs the exercise routine (192).

Figure 28:
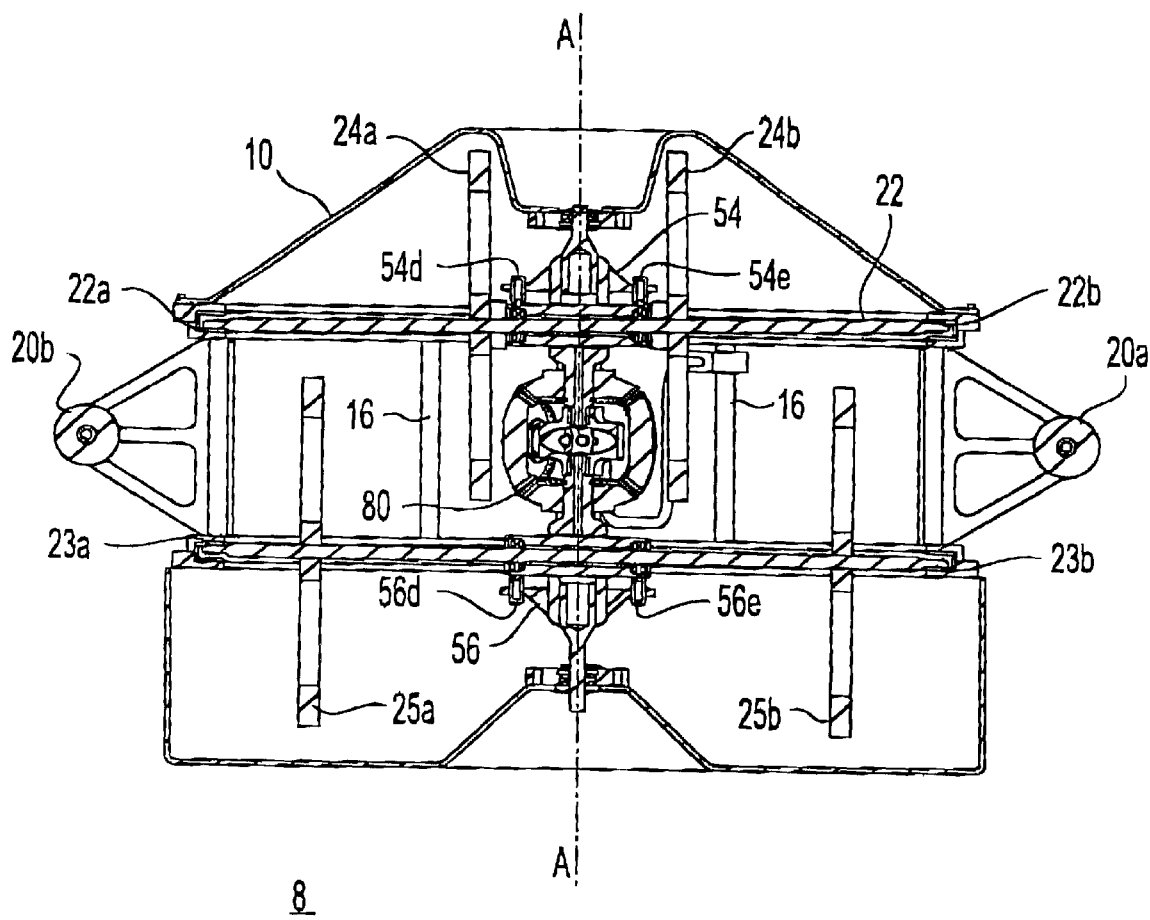
FIG. 28 is a sectional view of a second embodiment of the precessional device shown in FIG. 1.

FIG. 28 shows a second embodiment of the precessional device 8 shown in FIG. 1. In the second embodiment, the precessional device 8 is adjusted so that an exercise involving a curling motion with the arms can be performed. Essentially, whereas the total precessional torque (TPT) oscillated or varied about axis B—B in the first embodiment, the total precessional torque (TPT) oscillates about axis C—C in the second embodiment. The adjustment is made by adjusting the screws 56d and 56e as shown in FIG. 28 so that axle 23 tilts opposite to the direction of the first method of operation as shown in FIG. 16. By changing the tilt of the axle 23 and thereby changing the direction of the deflecting torque $D_3$ provided by the operator, the precessional force will also be changed from the first method of operation.

Figure 29:
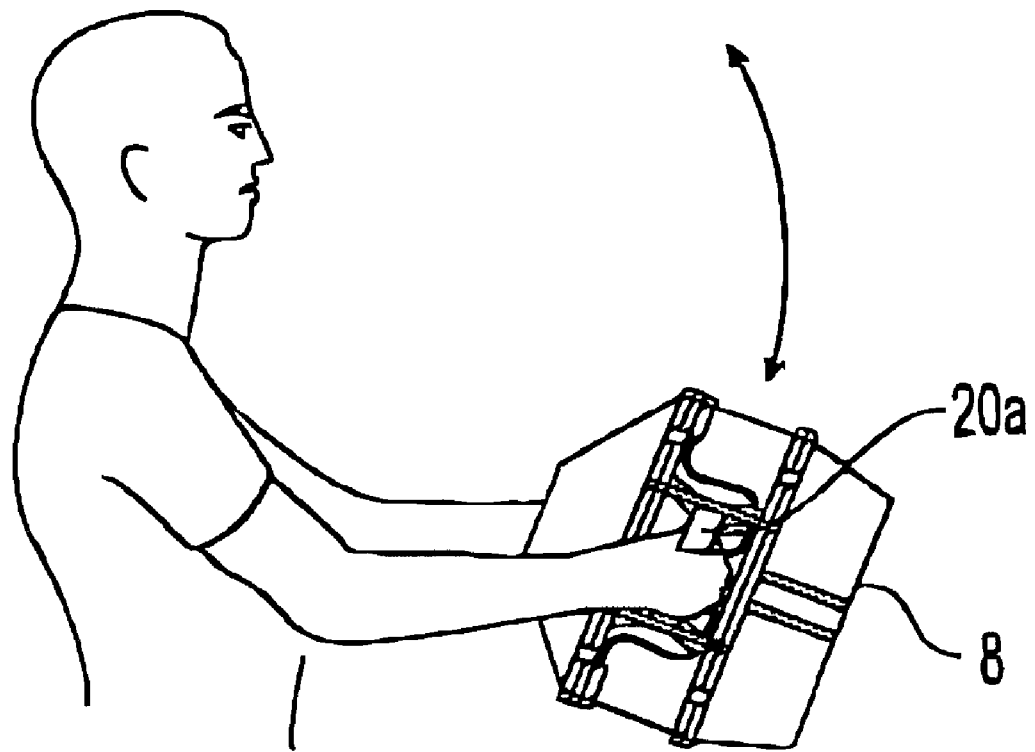
FIG. 29 shows the device being employed by an operator to exercise in a curling motion.

FIG. 29 discloses an operator using the precessional device 8 to perform a curling exercise. The device 8 will function similarly to the first method of operation except for the direction of the precessional forces felt at the handles 20a and 20b.

Figure 30A:
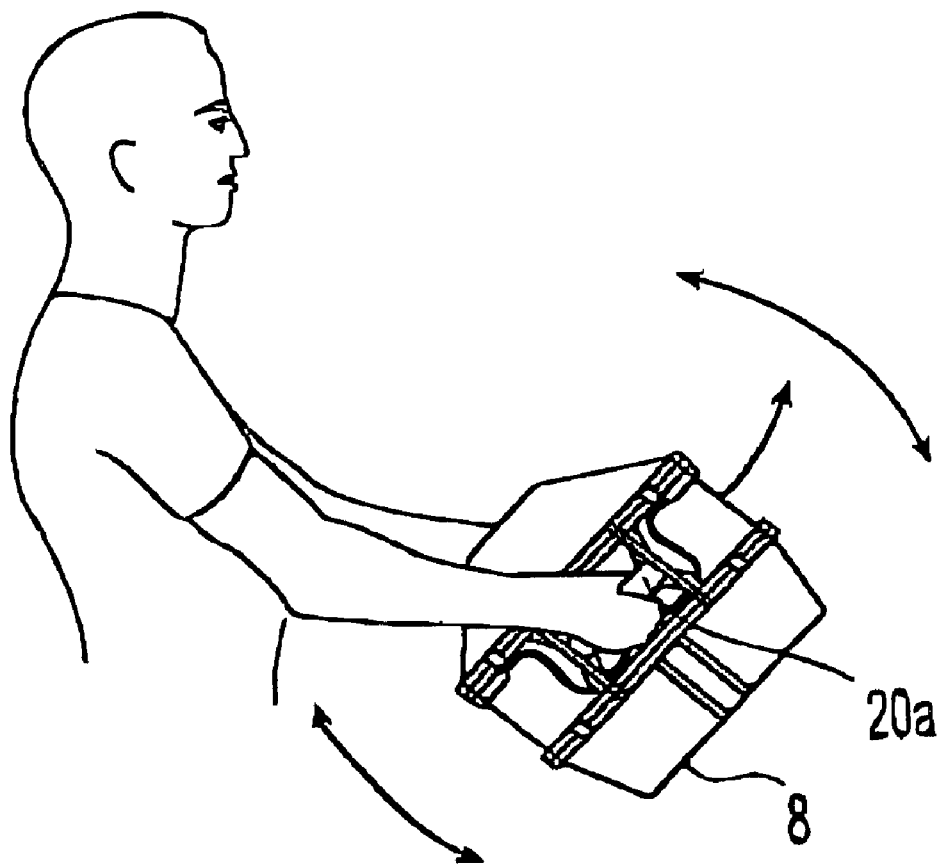
FIG. 30A shows the operator's hands in relation to the forces acting on the device in a first location.
Figure 30B:
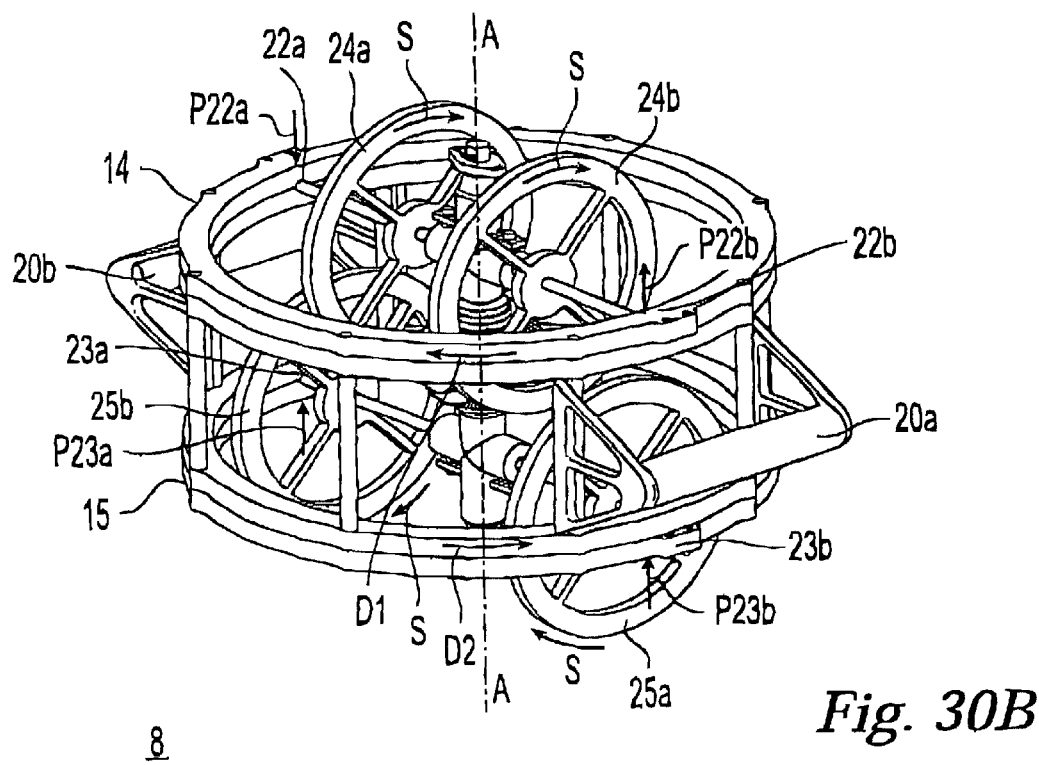
FIG. 30B shows an isometric cutaway view of the device with the rotors in the first location.
Figure 30C:
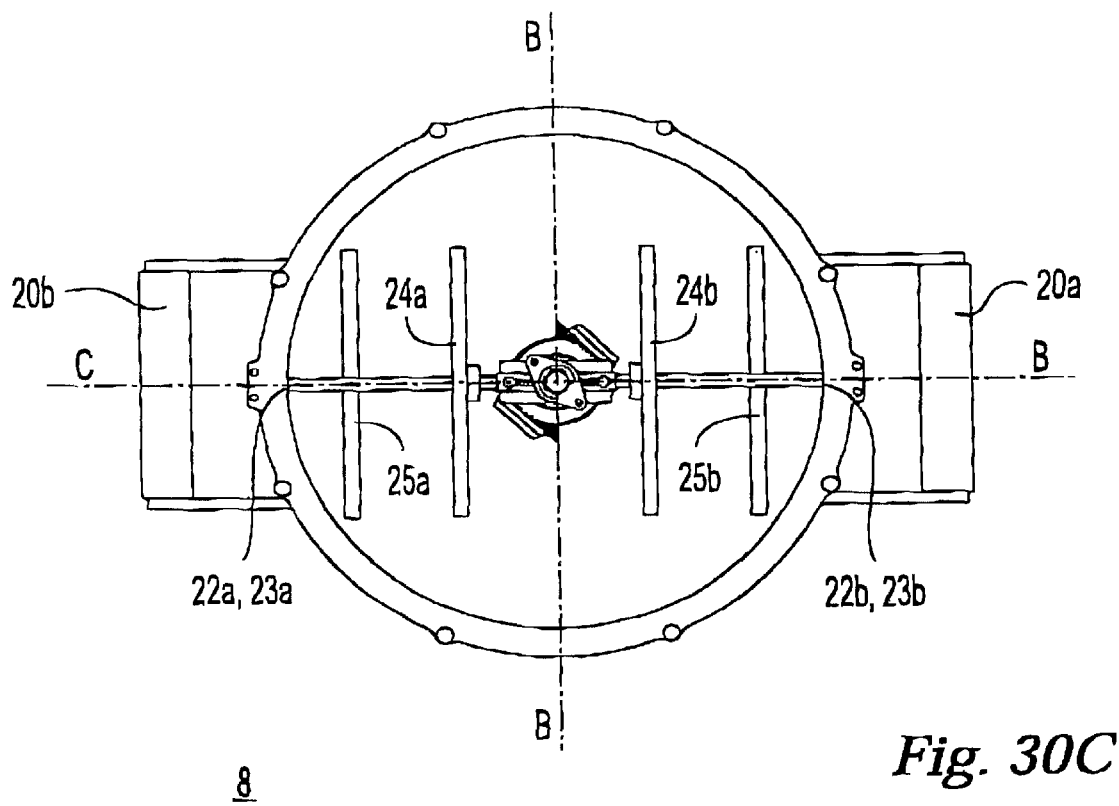
FIG. 30C shows a top cutaway plan view of the device with the rotors in the first location.

FIGS. 30A–30C show the device 8 in a first location or starting position. After starting the device using the hand crank 9, the operator again grasps the precessional device 8 by handles 20a and 20b. The precessional torques are canceling each other about the axis B—B and axis C—C. The device is at a momentary state of equilibrium and the operator is about to begin the stroke upwards.

Figure 31A:
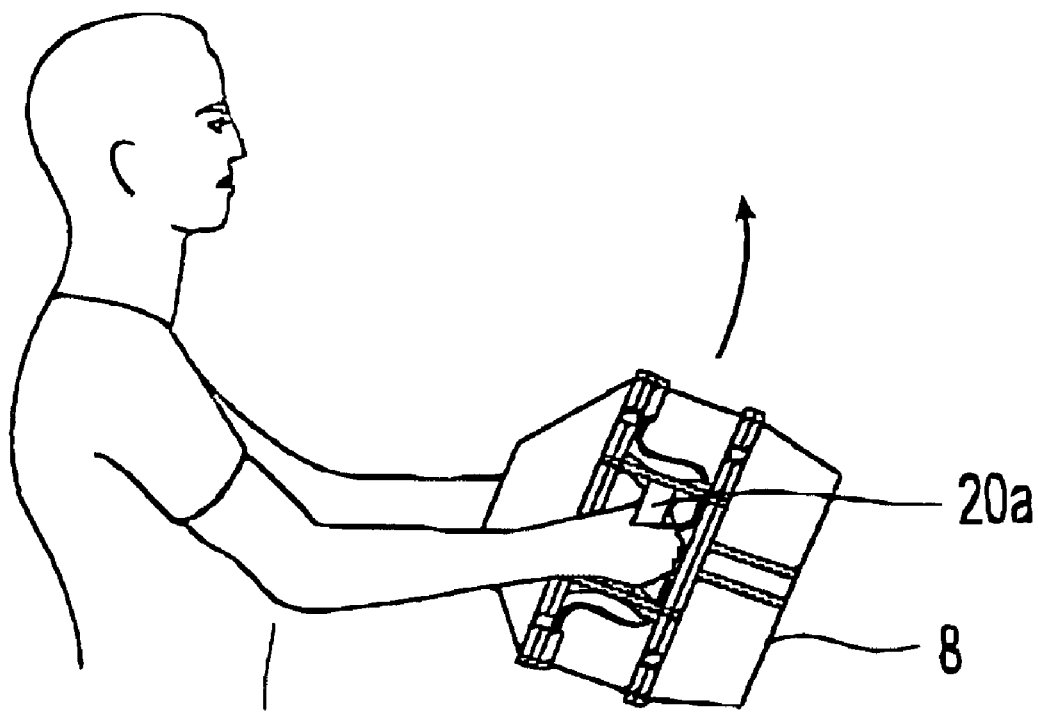
FIG. 31A shows the operator's hands in relation to the forces acting on the device in the second location.
Figure 31B:
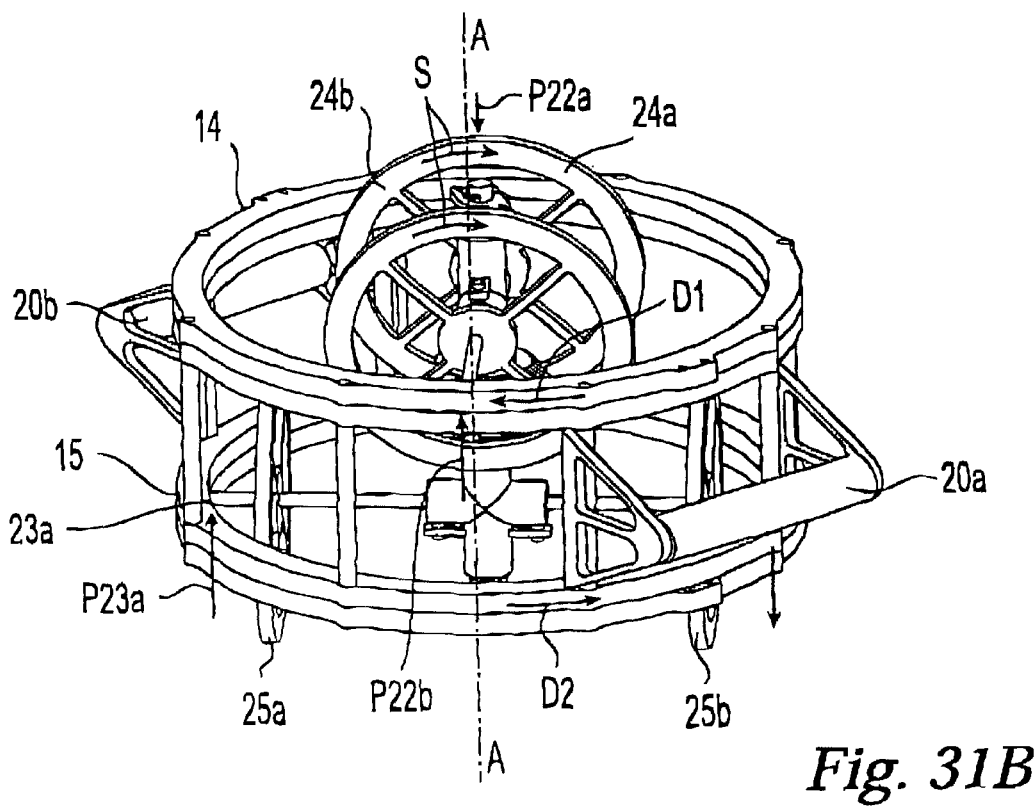
FIG. 31B shows an isometric cutaway view of the device with the rotors in the second location.
Figure 31C:
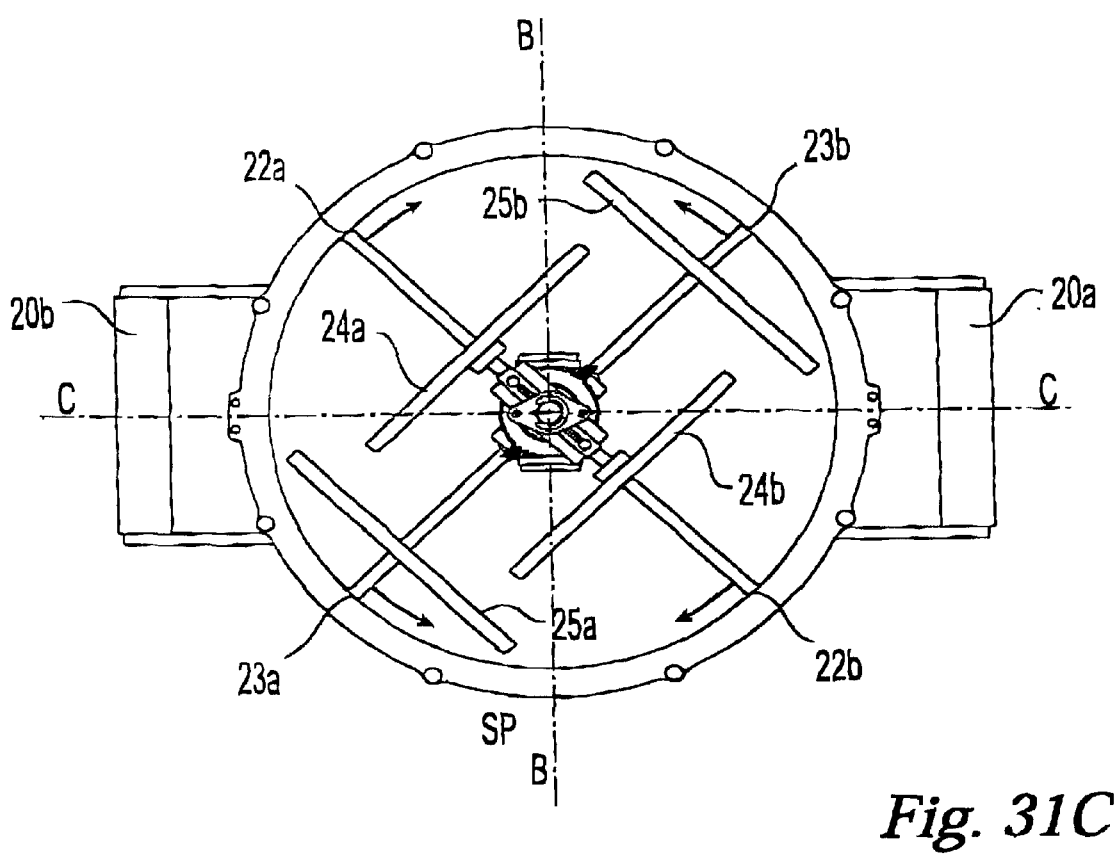
FIG. 31C shows a top cutaway plan view of the device with the rotors in the second location.

FIGS. 31A–31C show the device in a second location and the operator has completed a quarter of a stroke.

Figure 32A:
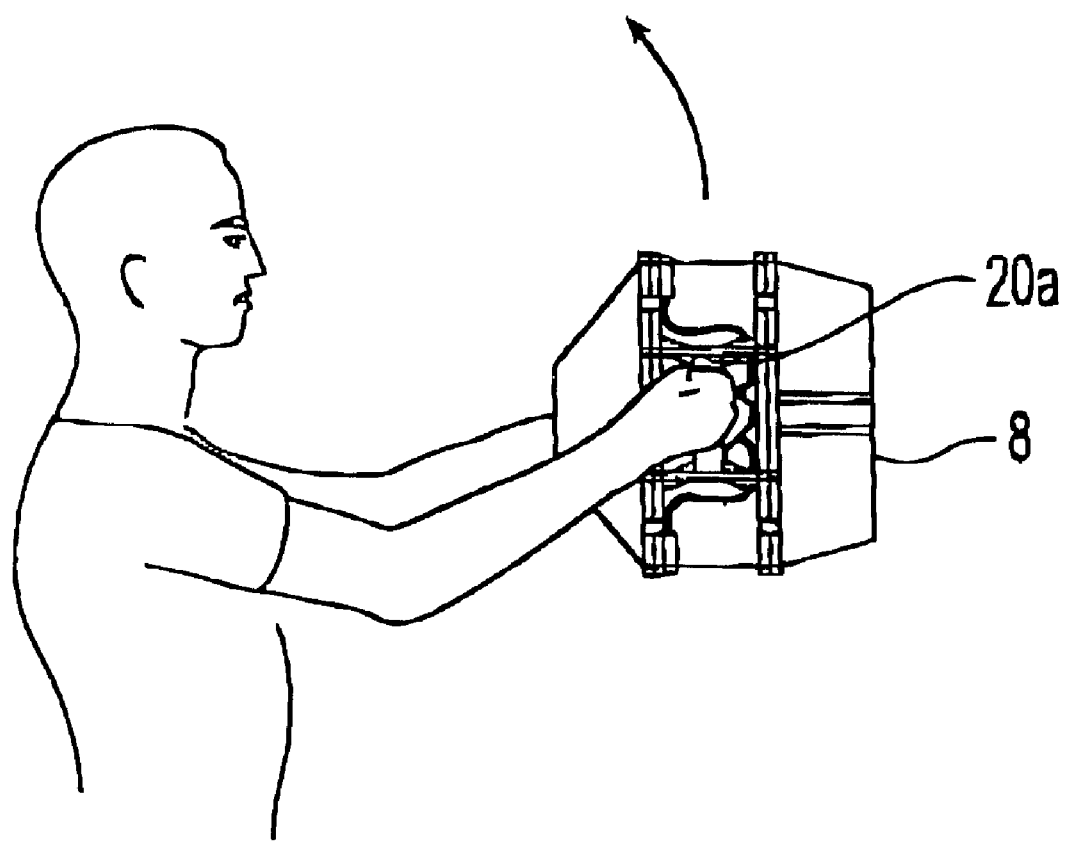
FIG. 32A shows the operator's hands in relation to the forces acting on the device in the third location.
Figure 32B:
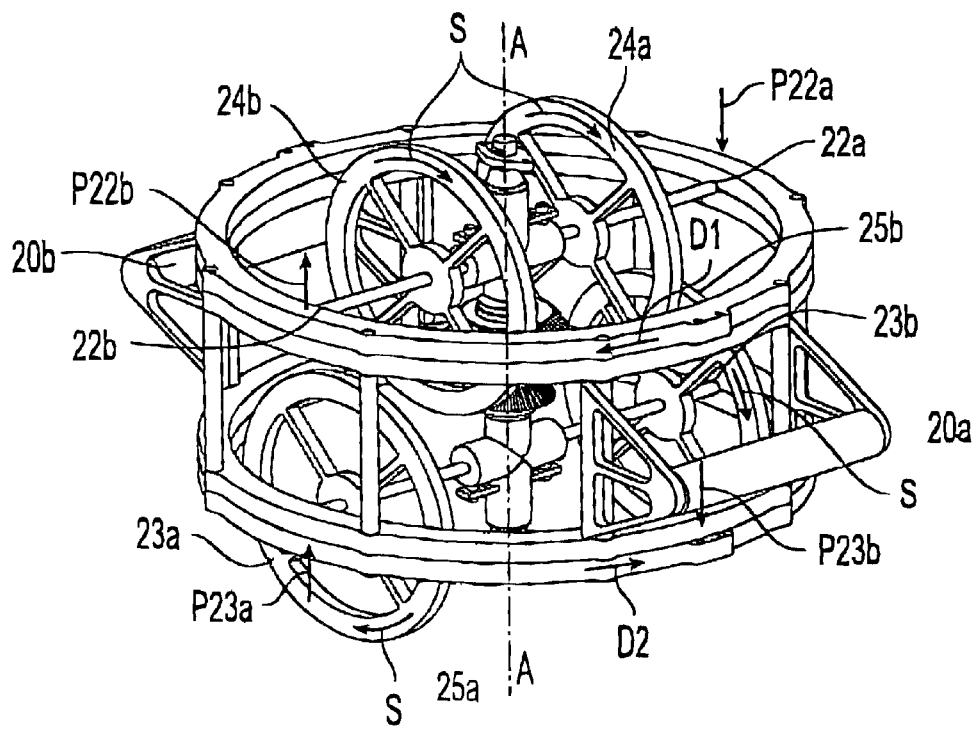
FIG. 32B shows an isometric cutaway view of the device with the rotors in the third location.
Figure 32C:
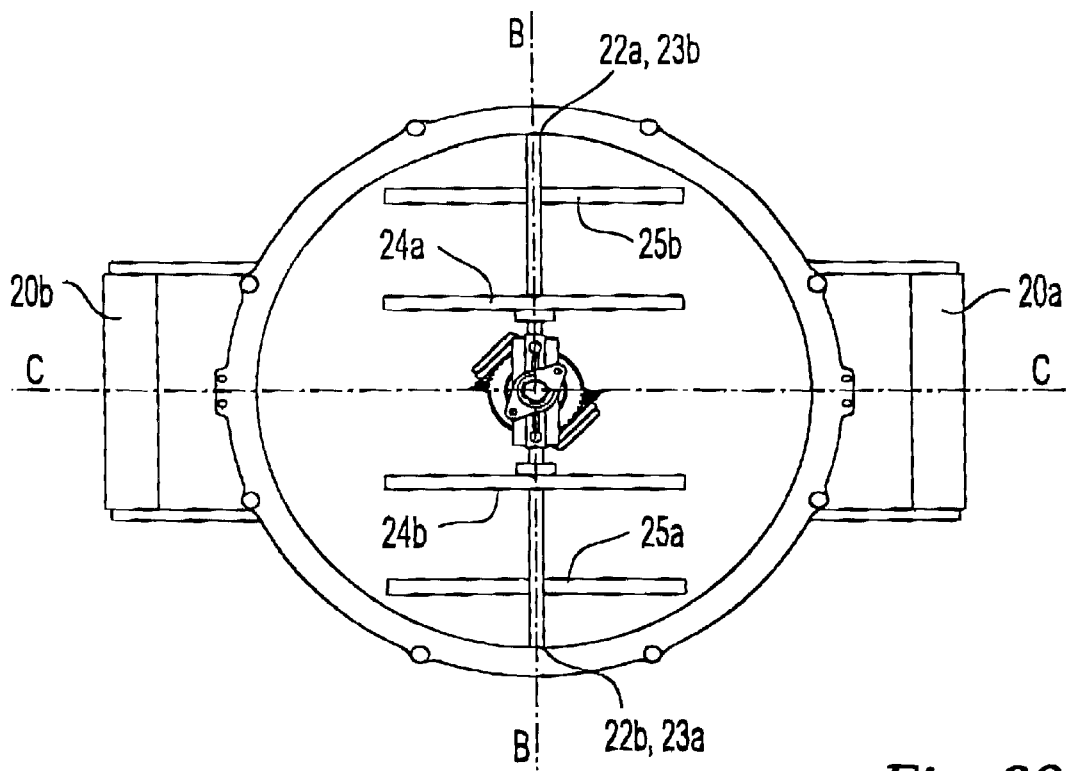
FIG. 32C shows a top cutaway plan view of the device with the rotors in the third location.

FIGS. 32A–32C show the device in a third location and the operator has completed half of a stroke.

Figure 33A:
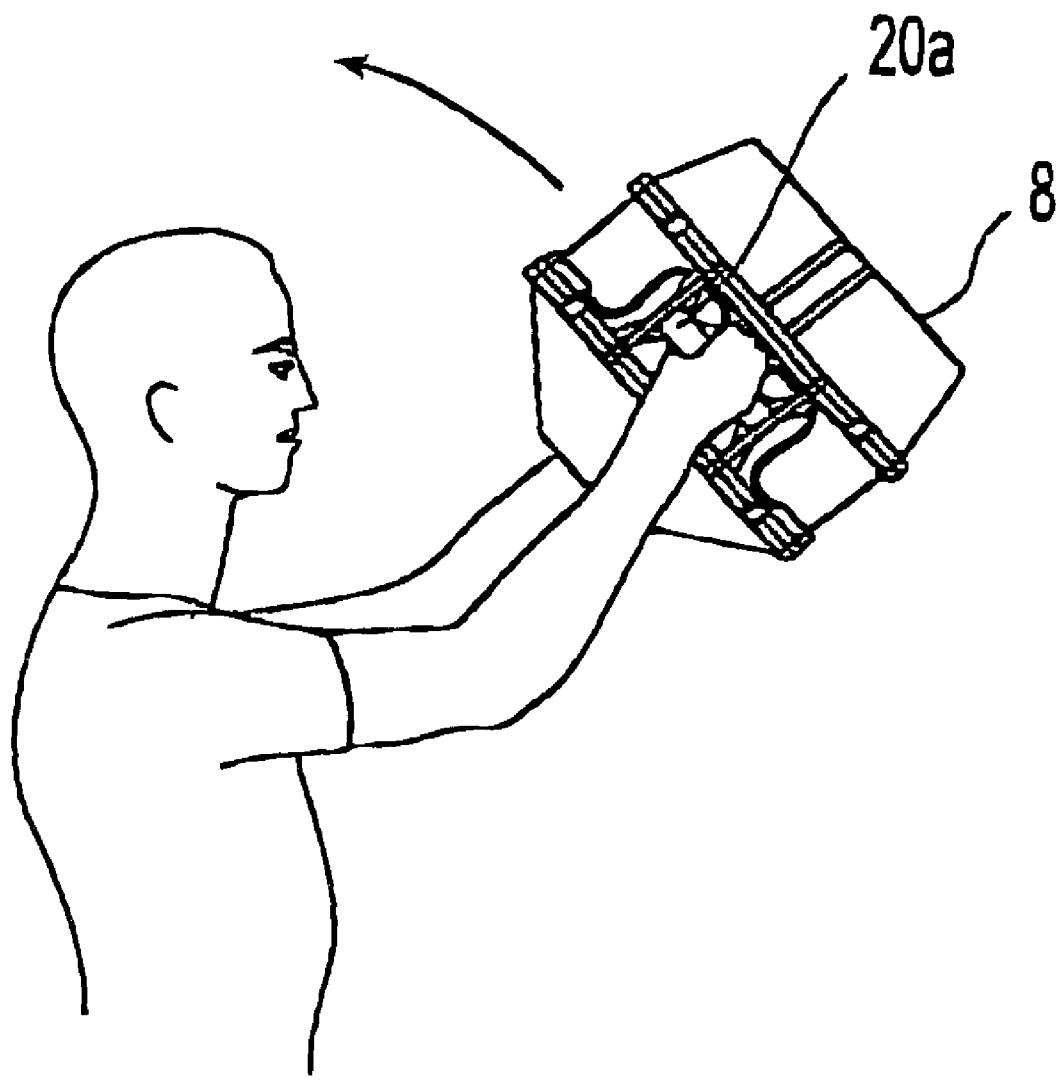
FIG. 33A shows the operator's hands in relation to the forces acting on the device in the fourth location.
Figure 33B:
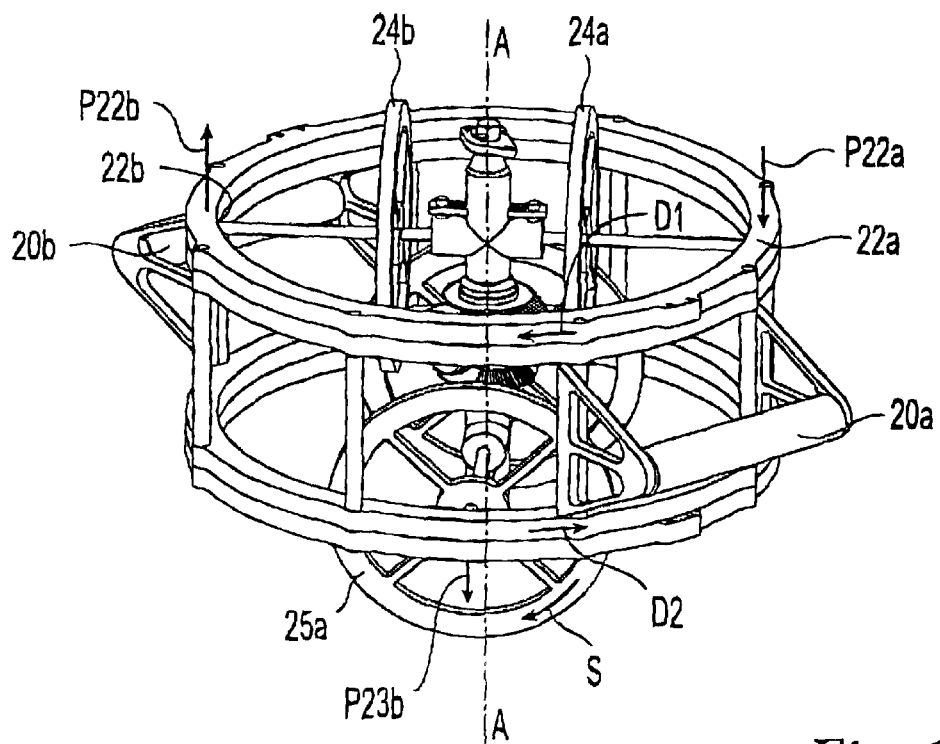
FIG. 33B shows an isometric cutaway view of the device with the rotors in the fourth location.
Figure 33C:
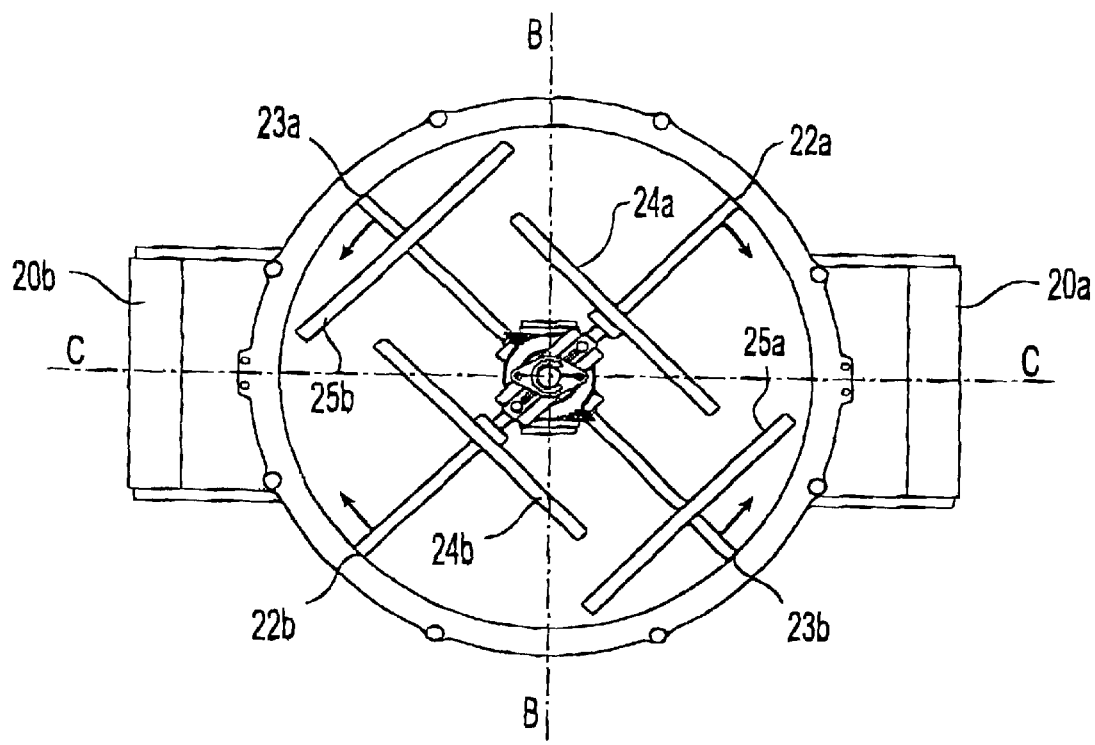
FIG. 33C shows a top cutaway plan view of the device with the rotors in the fourth location.

FIGS. 33A–33C show the device in a fourth location and the operator has completed three quarters of a full stroke.

Figure 34A:
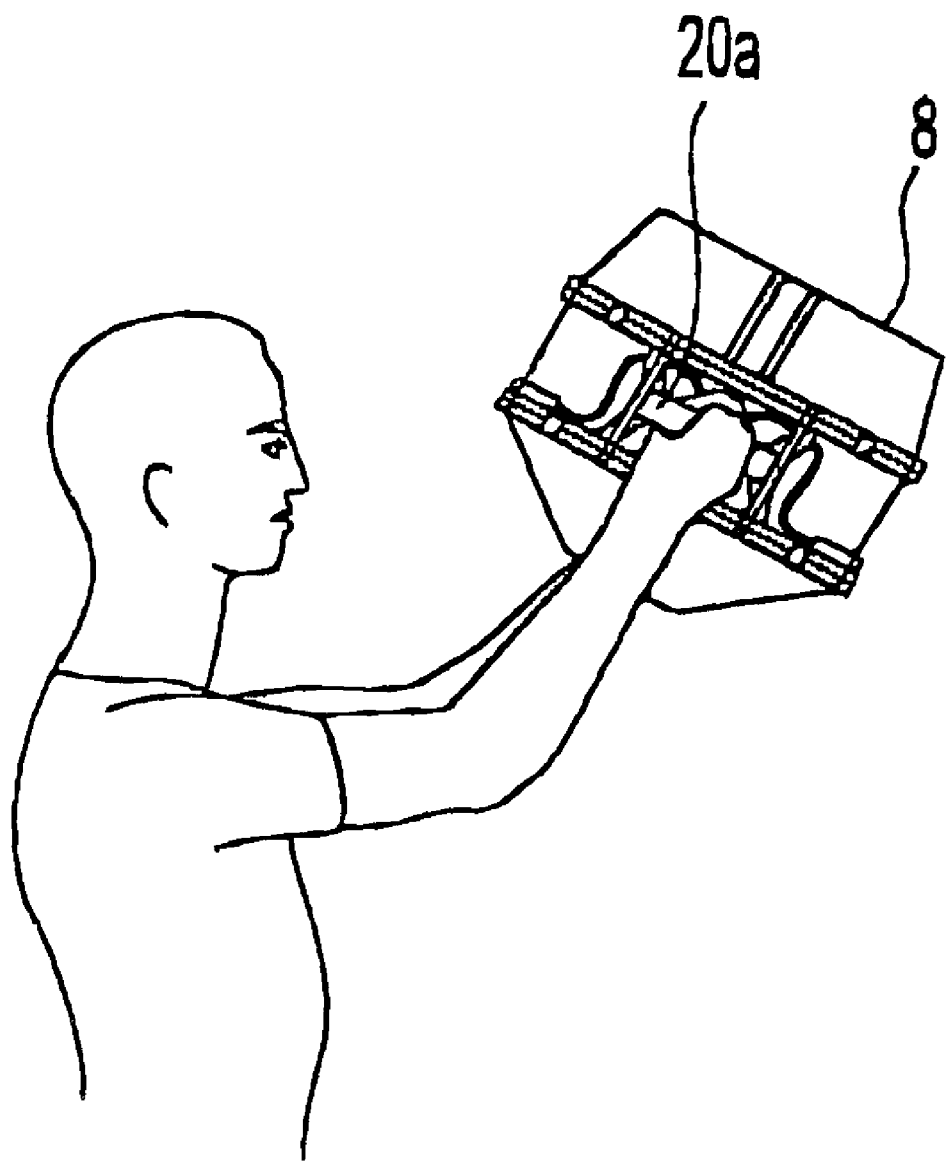
FIG. 34A shows the operator's hands in relation to the forces acting on the device in the fifth location.
Figure 34B:
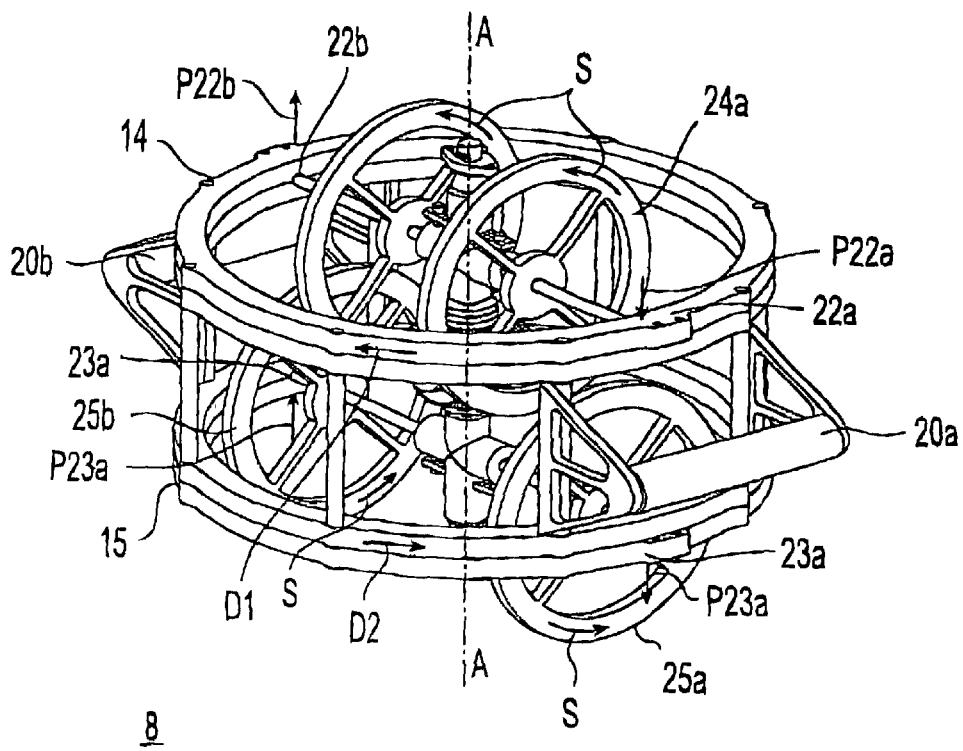
FIG. 34B shows an isometric cutaway view of the device with the rotors in the fifth location.
Figure 34C:
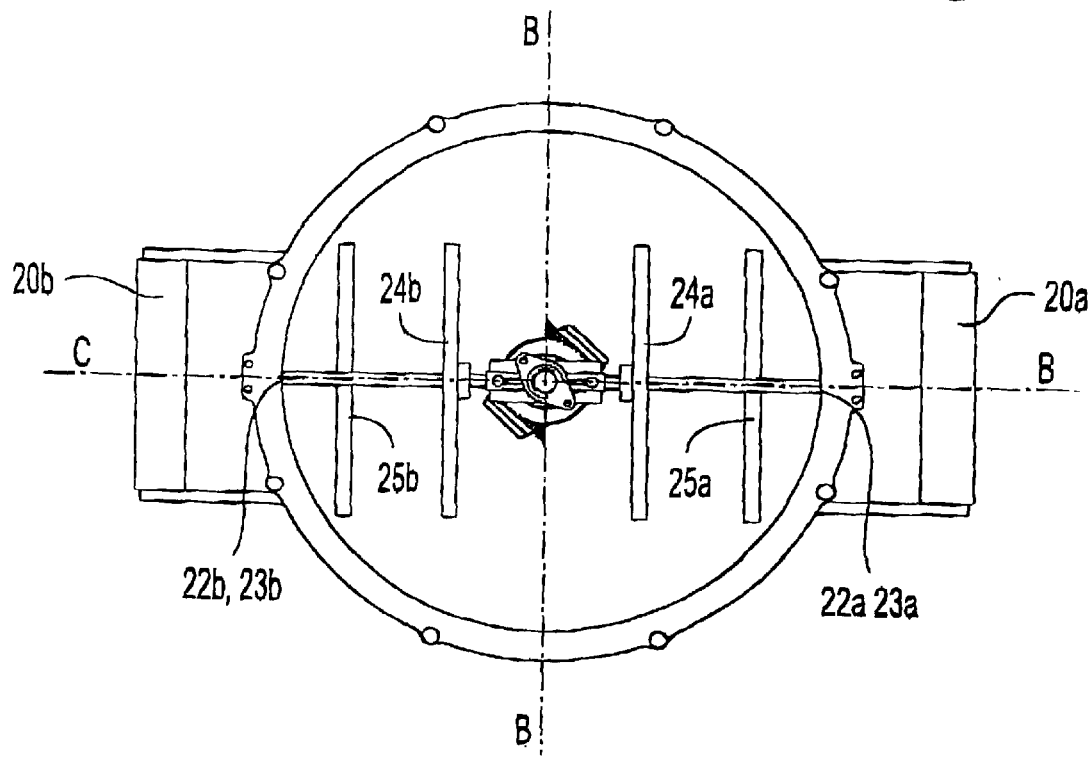
FIG. 34C shows a top cutaway plan view of the device with the rotors in the fifth location.

FIGS. 34A–34C show the device in a fifth location and the operator has completed a full stroke and half of a cycle. To complete a full cycle the operator will return the device 8 to the starting position.

FIG. 35A shows a top plan view of the first rotor 120 as it transitions between the first and second location and the rotation of axis D'—D' in relation to axes C—C and B—B. FIG. 35B shows a top plan view of the second rotor 121 and axis E'—E' as they transition between the first and second locations with first rotor 120 removed. FIG. 35C shows the torques about axis B—B due to axle 22 (D') and axle 23 (E') canceling each other out. The sum of the torques due to axle 22 and axle 23 is shown by total precessional torque (TPT) in FIG. 35D, and the torque generated by the operator along axis B—B is identified as $D_3$ as before. FIG. 35E illustrates the torques of the axles 22 and 23 about the C axis. As can be seen from the graph, the torques due to axle 22 (D') and that due to axle 23 (E') are complementary. FIG. 35F shows the total precessional torque TPT and $D_3$ compared over time as in FIG. 35D. FIGS. 35C–35F illustrate that TPT and $D_3$ oscillate or are variable about Axis C—C in the second embodiment, whereas they oscillated about axis B—B in the first embodiment.

Figure 36:
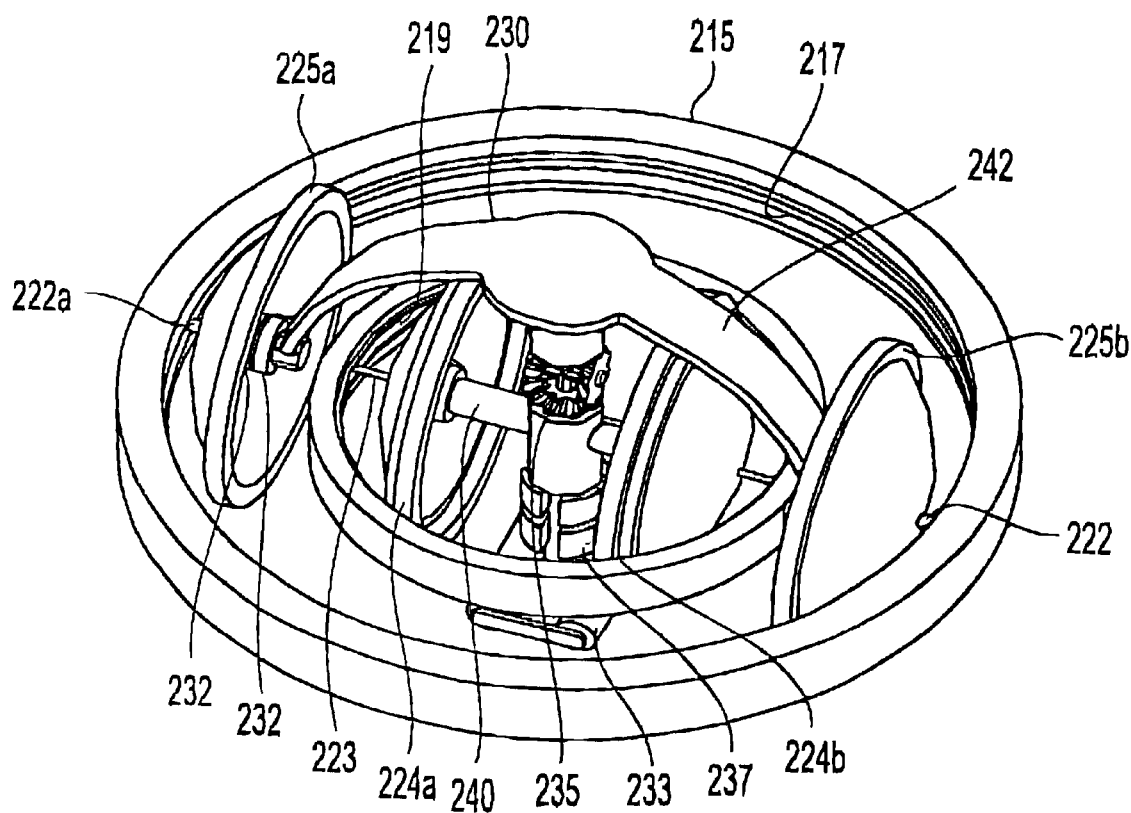
FIG. 36 illustrates a third embodiment of the precessional device in a perspective view with the housing broken away to show internal structure.
Figure 37D:
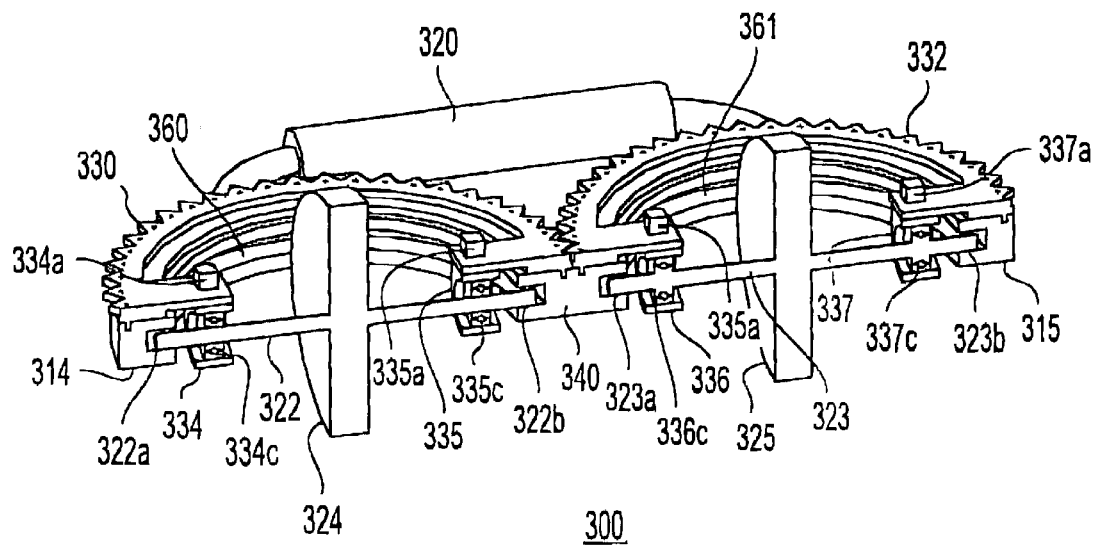
FIG. 37D shows a front perspective sectional view of the fourth embodiment of the precessional device taken along line 37—37 in FIG. 37B.
Figure 37E:
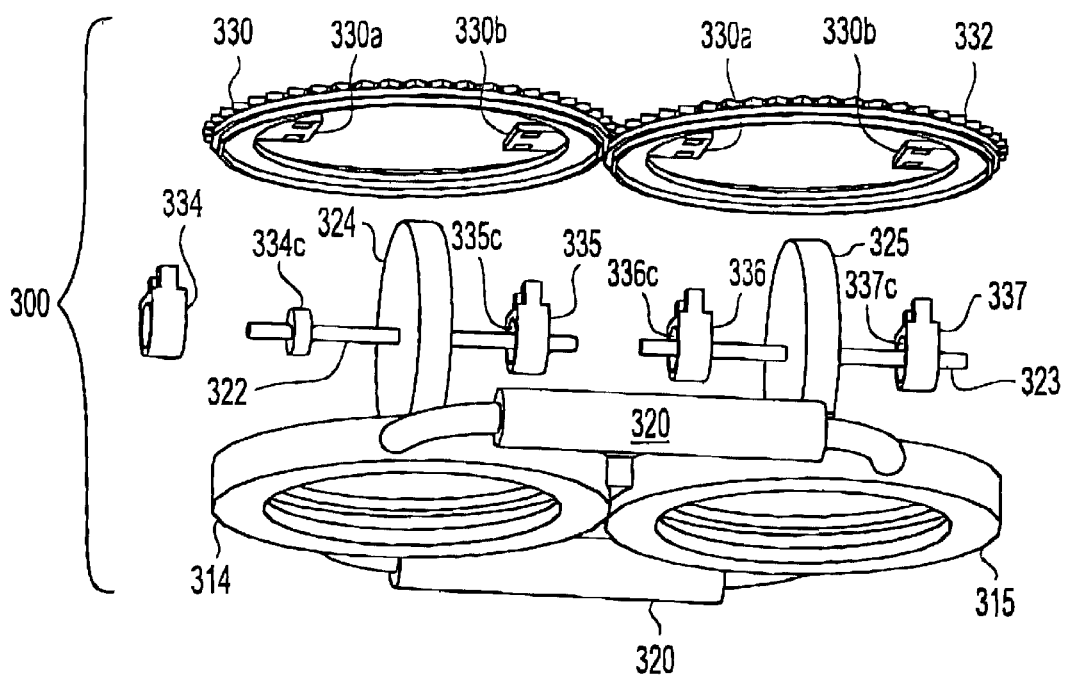
FIG. 37E shows an exploded view of the fourth embodiment of the precessional device.
Figure 38A:
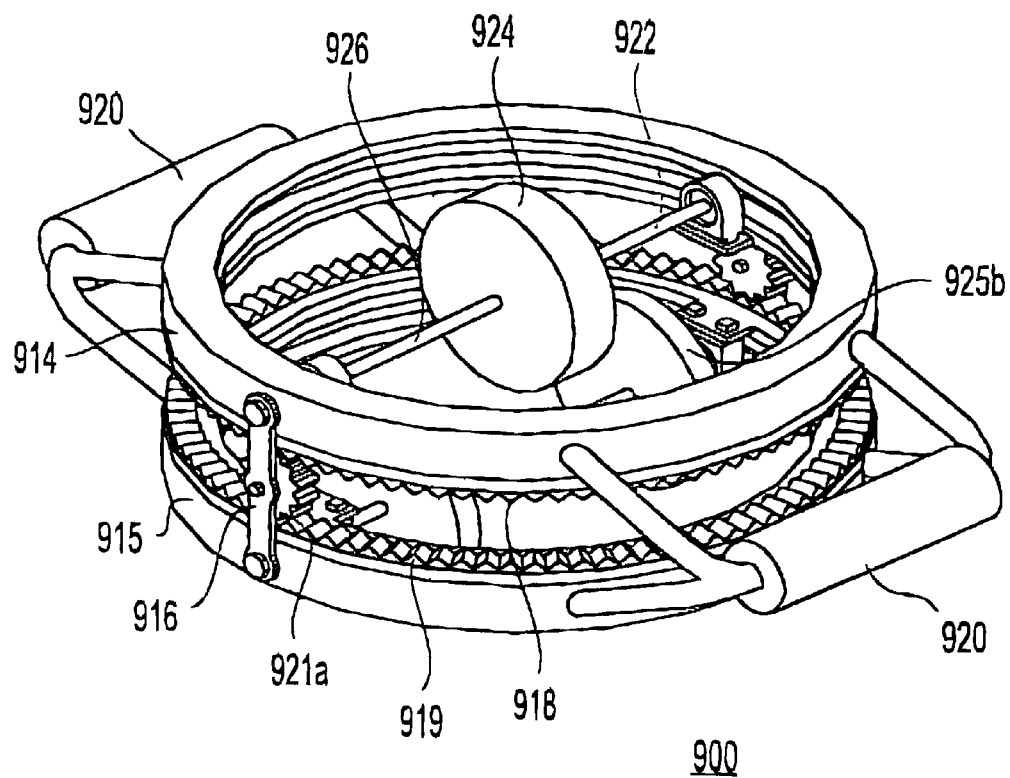
FIG. 38A is a perspective view of a fifth embodiment of the precessional device with the housing broken away to show internal structure.
Figure 38B:
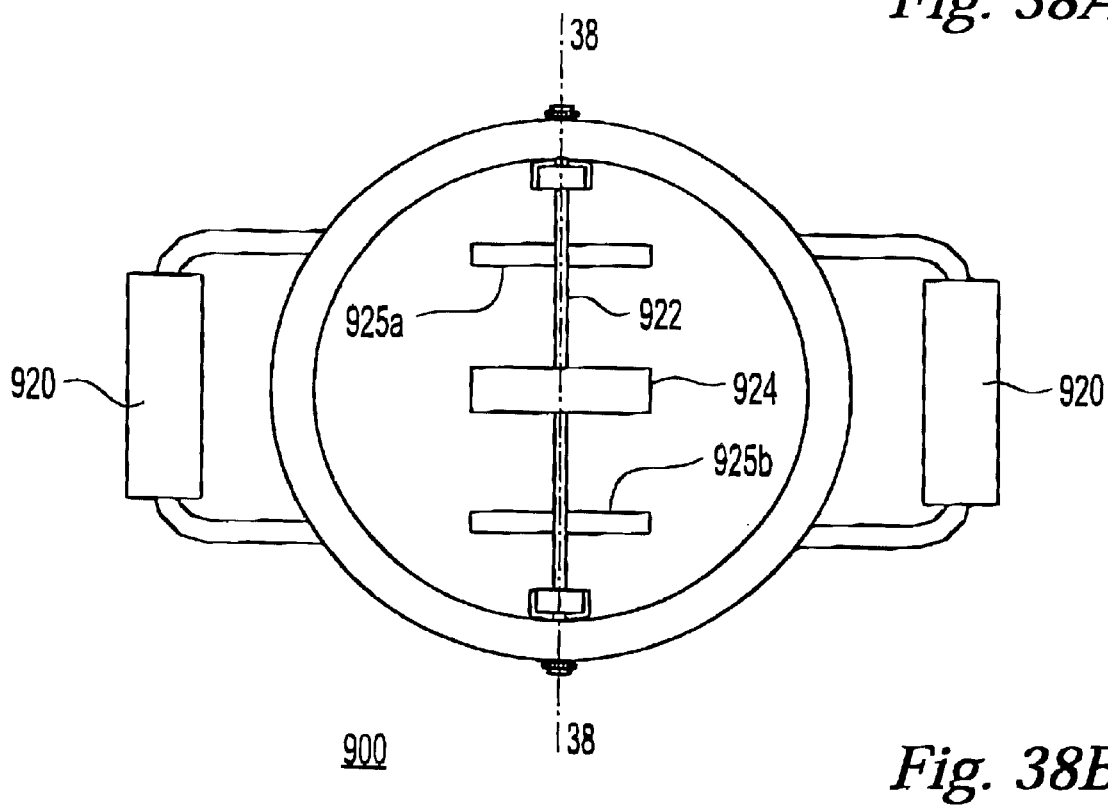
FIG. 38B is a top plan view of the fifth embodiment of the precessional device.
Figure 38C:
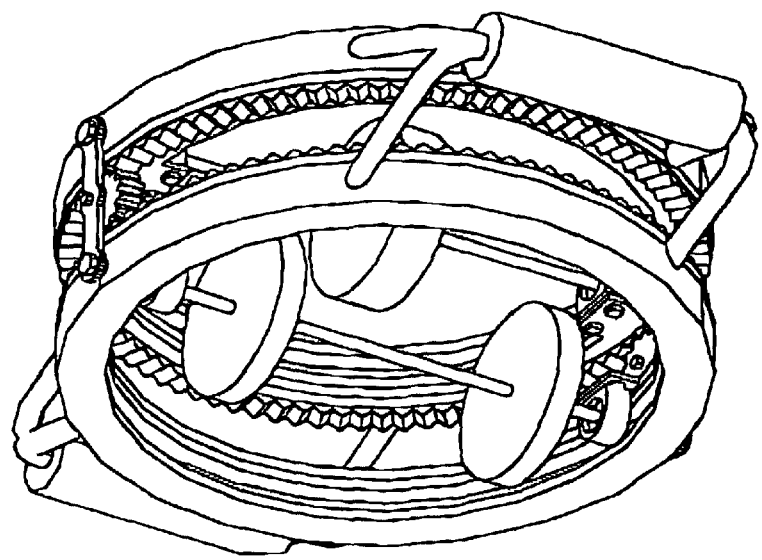
FIG. 38C is a bottom perspective view of the fifth embodiment of the precessional device.
Figure 38D:
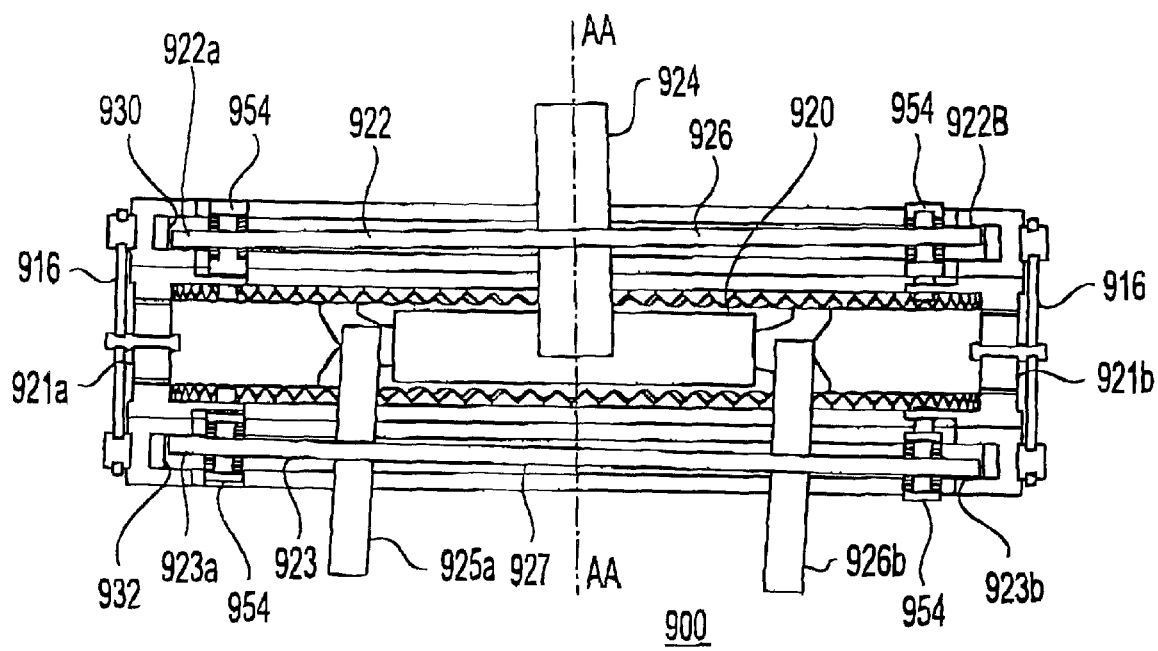
FIG. 38D is a sectional view of the fifth embodiment taken along line 38—38 of FIG. 38B.

FIG. 36 illustrates a perspective view of a third embodiment of the precessional device which is labeled 200. In this embodiment, the precessional device 200 features an alternative method of configuring the tracks. Whereas the first embodiment uses two tracks vertically aligned about a central rotational axis, the third embodiment 200 discloses two tracks that are concentric and coplanar to obtain a more compact device. However, the third embodiment operates based on the same principles as the first and second embodiments. The third embodiment also employs a pair of handles, a start-up mechanism and enclosure (not shown) similar to the first and second embodiments.

FIG. 36 discloses an outer track assembly 215 including a race 217 in which axles 222a and 222b rotate. The opposite end of axle 222a is mounted in bearings 232. The opposite end of axle 222b is also mounted in bearings (not shown). Mounted on axles 222a and 222b are outer flywheels 225a and 225b. Flywheel 225a is mounted on the first outer axle 222a and flywheel 225b is mounted on the second outer axle 222b. Located on inner axle 223 are inner flywheels 224a and 224b. Inner axle 223 travels inside race 219 in track assembly 214. Support arm 230 provides structural stability to outer axes 222a and 222b. Support arm 230 is attached to a central transmission 235 which allows the first rotor 240 to rotate in a counter-clockwise direction and the second rotor 242 to rotate in a clockwise direction. Bearings 237 connect the transmission to 235 batteries 233. Batteries 233 provide an alternative method of starting the device besides using a handcrank. Note that wire brace assemblies used to support the transmission 235 and a supporting device for track assembly 214 are not shown. Due to the different diameter of the outer and inner track assemblies 214 and 215, the diameter of the outer and inner axles must vary in the same proportion so that the inner and outer flywheels 224a, 224b and 225a, 225b spin at the same rate. The method of operation of the third embodiment will be very similar to that of the first and second embodiments.

FIGS. 37A–37E disclose a fourth embodiment 300 of the precessional device in which the track assemblies 314 and 315 are non-concentric and coplanar. Attached to the precessional devices are handles 320. In the center of the track assembly 314 is rotor 324. Rotor 324 spins on axle 322. Rotor tips 322a and 322b are frictionally driven inside race 360. Axle 322 is attached to bearings 334c and 335c which turn inside support assemblies 334 and 335, respectively. Support assembly 334 is attached to plate portion 330a of a first circular gear 330 through attachment pieces 334a and 334b. Support assembly 335 is attached to plate portion 330b of the first circular gear 330 through attachment pieces 335a and 335b. In the center of track assembly 315 is rotor 325. Rotor 325 spins on axle 323. Axle tips 323a and 323b are frictionally driven inside race 361. Axle 323 is attached to bearings 336c and 337c which turn inside support assemblies 336 and 337, respectively.

The fourth embodiment 300 operates on the same principles as the first and second embodiments. A hand crank as shown in FIG. 37C is inserted into pin hole 340 in FIG. 37A and is used to start the second circular gear 332 turning. Second gear 332 in turn causes first circular gear 330 to rotate. As the circular gears 330, 332 turn, the axle tips 322a, 322b, 323a, and 323b are frictionally driven by coming into contact with the races 360 and 361. In turn, rotors 324 and 325 begin turning. The total precessional torque produced by the rotors 224 and 225 will then buildup a variable resistance. The method of operation of the fourth embodiment will be similar to that of the first and second embodiments.

FIGS. 38A–38D disclose a fifth embodiment 900 which features an alternative method of designing the rotors. However, the fifth embodiment will also operate on the same principles as the first and second embodiments. The fifth embodiment 900 includes a first rotor 926 made up of a single flywheel 924 mounted on an axis 922 and a second rotor 927 made up of a pair of flywheels 925a and 925b mounted on axis 923. Single flywheel 924 has the equivalent mass of both flywheels 925a and 925b together. The coordinated counter-rotation of the first rotor 926 about the central rotational axis AA—AA is controlled by first and second perimeter transmissions 921a and 921b driven between first and second track assemblies 918 and 919 respectively. Track assemblies 918 and 919 are separated by supports 916 and handle assemblies 920. The first and second perimeter transmissions 921a and 921b are started by a hand crank (not shown). As they rotate in track assemblies 918 and 919, axle tips 922a and 922b are frictionally driven within race 930. As axis 922 is turned, flywheel 924 turns. The first and second perimeter transmissions also cause axis tips 923a and 923b to be frictionally driven within race 932. As axes 923 is turned, flywheels 925a and 925b are also turned. The axis tips 923a and 923b are canted using a plurality of screws 954 to set the direction of rotation of the axis 923. Similarly to the first embodiment, the operator grasps the handle assemblies 920 and opposes the net precessional torque created by the rotors 926 and 927 to perform a variable resistance workout.

Figure 39:
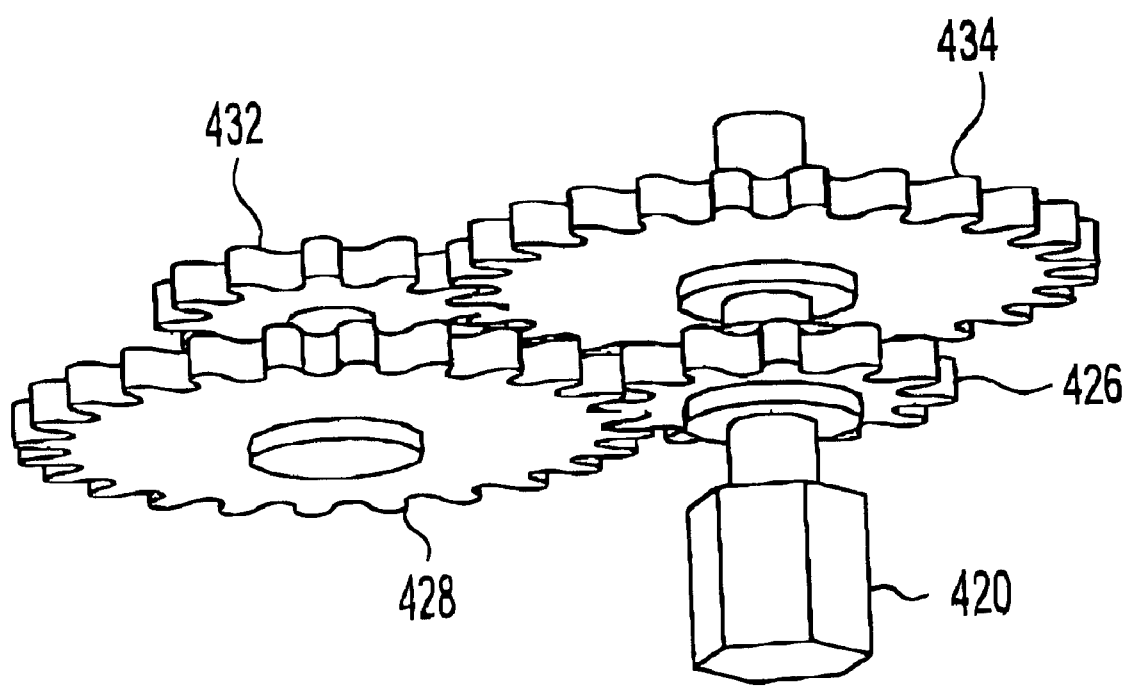
FIG. 39 is a perspective fragmentary view of a sixth embodiment of the precessional device illustrating an alternative hand crank assembly.

FIG. 39 discloses a sixth embodiment which is similar to the first embodiment except that it has an alternative hand crank assembly 400. Crank assembly 400 shows a crank pin 420 that is connected to a bearing 422 which turns a first crank gear 426. First crank gear 426 interacts with second crank gear 428 which turns third crank gear 432. Third crank gear 432 turns a fourth crank gear 434 which turns the transmission 86 (not shown) of the first embodiment. Hand crank assembly 400 allows for a lesser degree of force to be used by the operator when starting up the precessional device.

Figure 40A:
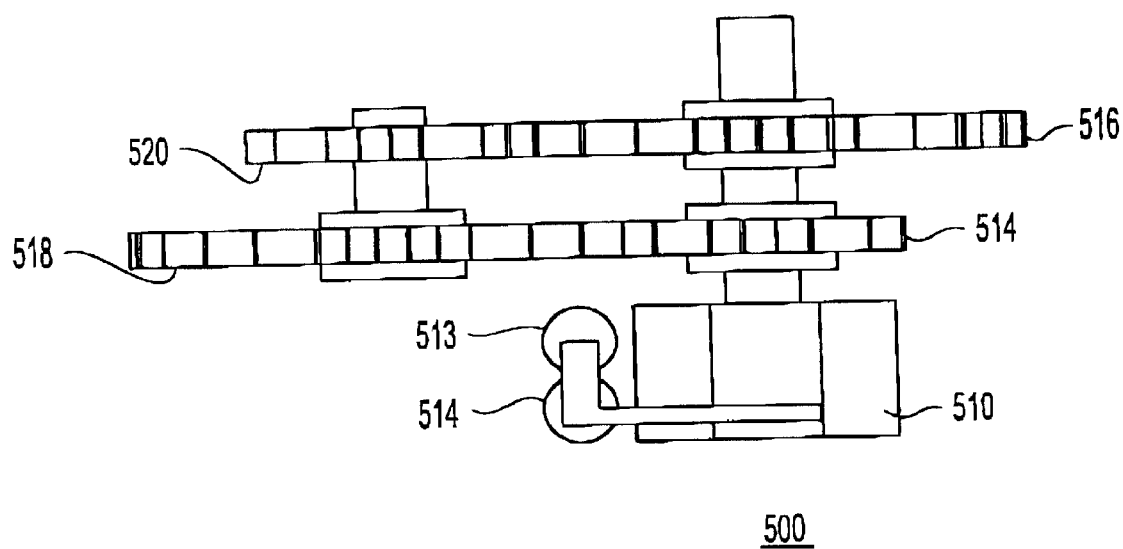
FIGS. 40A–40B are perspective fragmentary views of a seventh embodiment of the precessional device illustrating an electric starter.
Figure 40B:
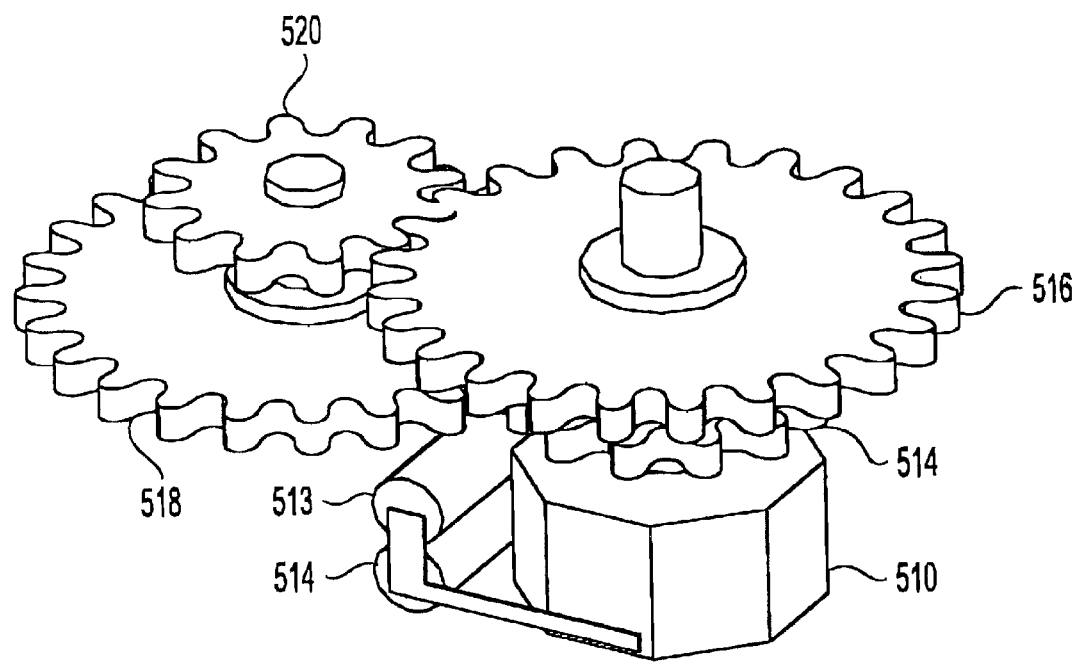

FIGS. 40A–40B disclose a seventh embodiment which features another means of starting the rotation of the rotors of the precessional device 8 of the first embodiment. Whereas the first embodiment uses a hand crank, the seventh embodiment 500 illustrates an electric motor driving the transmission 86 (not shown) of the first embodiment through a plurality of gears. A motor 510 turns a first gear 514 which turns a second gear 518. In turn, third gear 520 is turned by the second gear 518. Fourth gear 516 is turned by the third gear 520. Fourth gear 516 is connected to the transmission 86 of the first embodiment. The use of different sized gears allows for increase in the output torque of the motor 510. The motor 510, driven by rechargeable batteries 513 and 514, is activated when the operator presses a button (not shown). Also, when the user is operating the device, the motor can act as an electric generator by converting a portion of the kinetic energy of the system into electricity to recharge the batteries.

Figure 41:
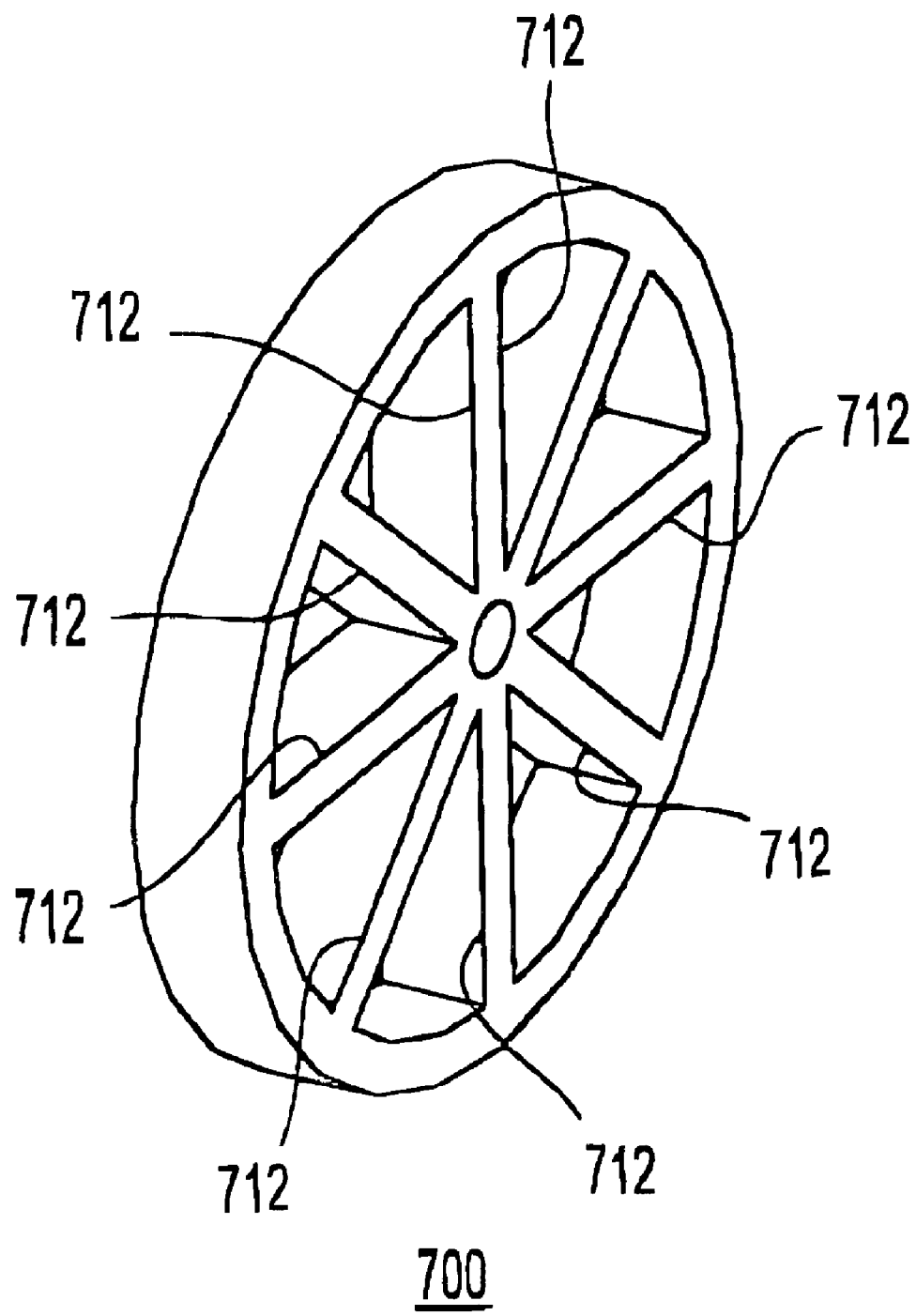
FIG. 41 is a perspective view of an eighth embodiment of the precessional device featuring flywheels with fins.

FIG. 41 discloses an eighth embodiment which shows a flywheel 700 with fins 712. The fins 712 will allow increased air flow in the precessional device 8 to provide cooling and reduce the possibility of damage to the device from being operated at too high a rate.

Figure 42A:
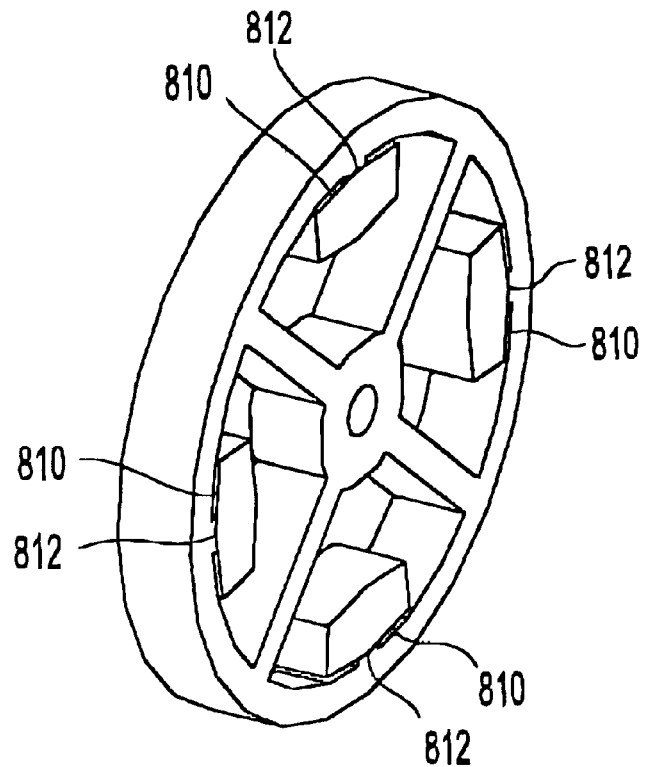
FIG. 42A is a perspective view of a ninth embodiment of the precessional device featuring flywheels with detachable weights.
Figure 42B:
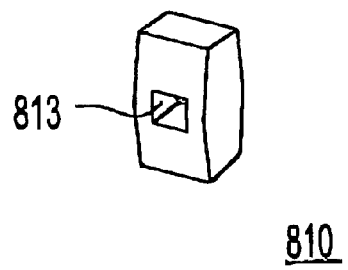
FIG. 42B is a perspective view of a detachable weight of the ninth embodiment.

FIGS. 42A–42B show a ninth embodiment featuring a flywheel 800 which allows its moments of inertia to be adjusted manually. In this embodiment, the flywheel 800 has removable weights 810 mounted on shafts 812 through shaft holes 813 located inside the rim 814 of the flywheel. The flywheel 800 has weights that are removable so that sets of flywheels with different radii or different masses can be used in the same device.

Figure 43A:
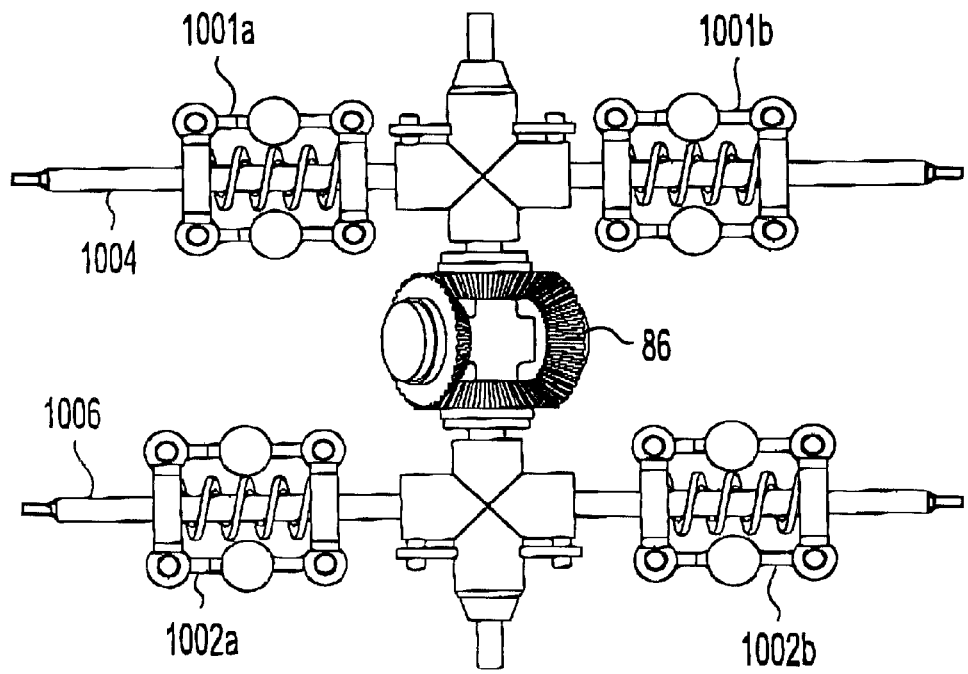
FIGS. 43A–43C are views of the tenth embodiment of the precessional device featuring expandable flywheels.
Figure 43B:
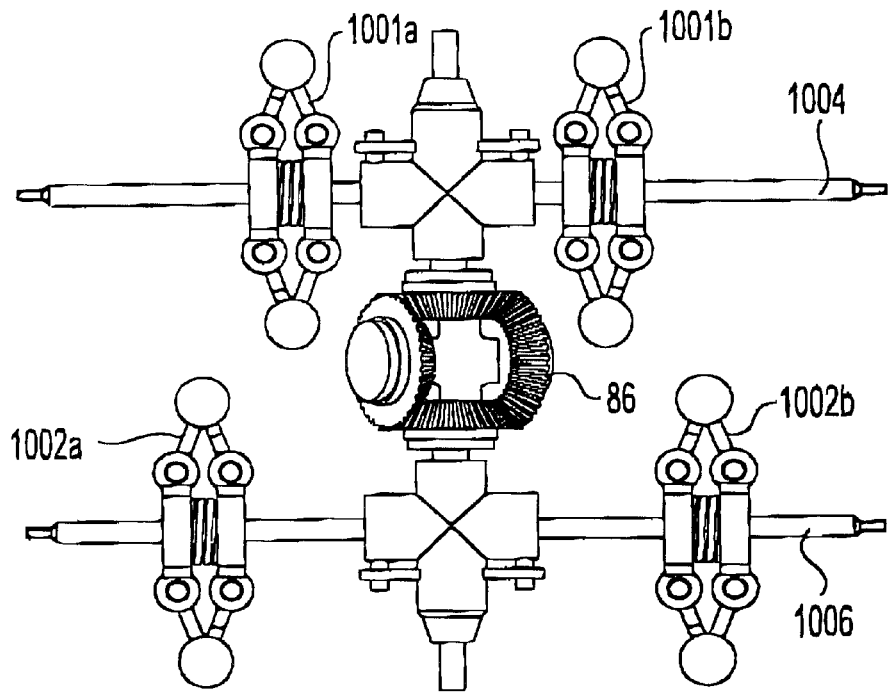
Figure 43C:
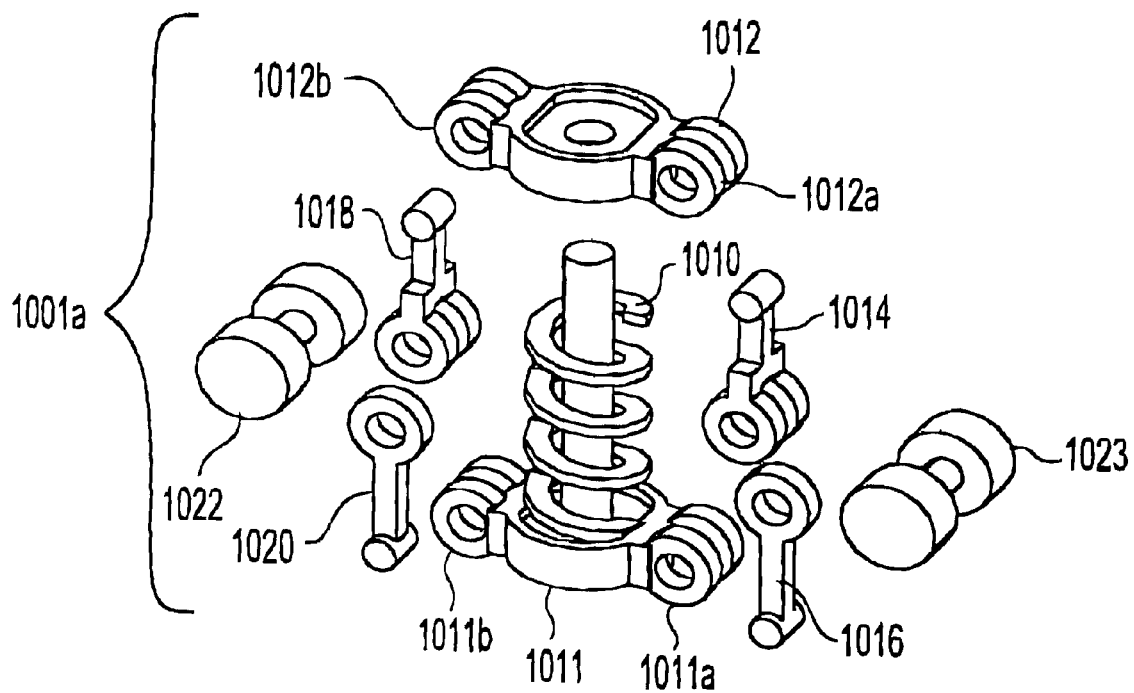

FIGS. 43A–43C disclose a tenth embodiment 1000 which features alternative flywheels 1001a–1001b and 1002a–1002b that automatically increase their rotational inertia as the rotational velocity increases through an expanding radii. FIG. 43A discloses axes 1004 and 1006 rotating inside track assemblies (not shown) of the first embodiment. Mounted on axes 1004 and 1006 are the alternative flywheels 10001a–1001b and 1002a–1002b in a contracted position. FIG. 43B shows the alternative flywheels 1001a–1001b and 1002a–1002b in the expanded position. FIG. 43C shows the components of the alternative flywheel 1001a. Surrounding axis 1004 is a spring 1010 which provides a compression force pushing flanges 1011 and 1012 apart. Connected to flange 1011 are pins 1016 and 1020 which connect to portions 1011a and 1011b of flange 1011. Similarly connected to flange 1012 are pins 1014 and 1018 which are connected to portions 1012a and 1012b of flange 1012. Connecting pins 1014 and 1016 is weighted button 1023 and connecting pins 1018 and 1020 is weighted button 1022. A starting configuration is shown in FIG. 43A with the flywheels 1001a–1001b and 1002a–1002b in their contracted position. As the speed of the spinning axis 1004 picks up, the flywheel 1001 a expands to the fully expanded positions as shown in FIG. 43B. As the buttons 1022 and 1023 spin faster, they exert a centrifugal force radially outward, which forces flanges 1011, 1012 together, thereby compressing the spring 1010. Using flywheel 1001a as an example, as the speed of the spinning axis 100 increases further, the flywheel 1001a expands to a maximum position and maximum rotational inertia. As the spinning axis 1004 decreases, the flywheel 1001 a will return to its contracted position as shown in FIG. 43A. The compression dynamics of the spring 1010 can be tailored to effect flywheel 1001 a with the desired dynamic rotational inertia. The tenth embodiment offers the operator an automatic mechanism for adjusting the rotational inertia of the rotors providing at least three benefits: 1) at startup the rotors' rotational inertia is minimized to facilitate startup, 2) at high operational speeds, the rotors' inertia is maximized to increase intensity of the exercise, and 3) the attributes of the compression spring can be tailored to produce the dynamic relationship between speed and inertia that is desired.

Figure 44A:
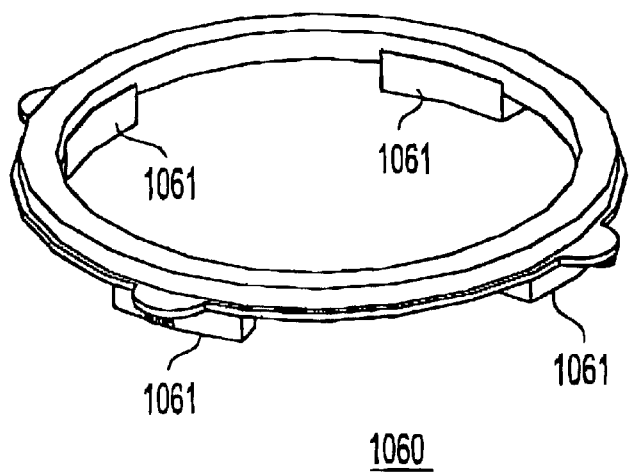
FIG. 44A is a perspective view of an eleventh embodiment of the precessional device illustrating a braking mechanism.
Figure 44B:
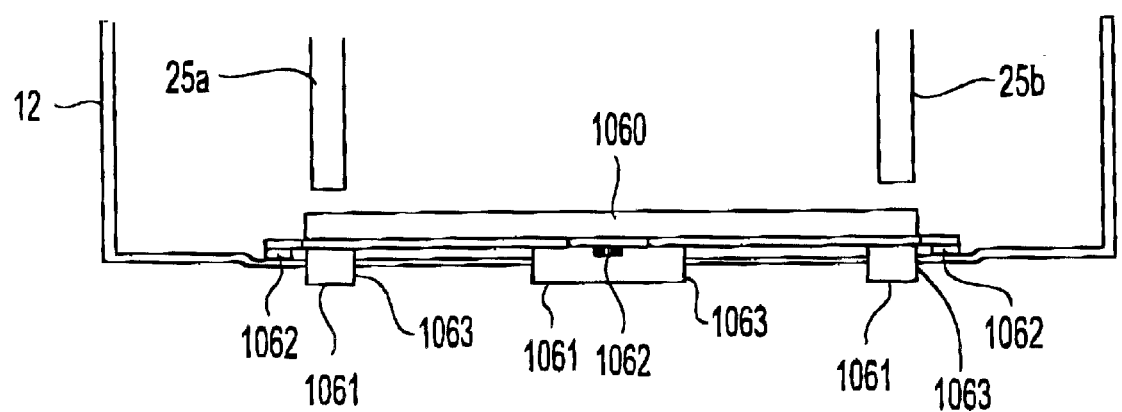
FIG. 44B is a fragmentary view of the eleventh embodiment of the precessional device illustrating in detail the braking mechanism.

FIGS. 44A–44B illustrate an eleventh embodiment which modifies the first embodiment by incorporating a braking mechanism 1060 that stops the rotation of the flywheels 25a and 25b when the user wishes to discontinue using the device. When the device is lifted off a surface, braking mechanism 1060 will rest on the floor of the lower housing 12. Extension springs 1062 will act on the braking mechanism 1060 to force prongs 1061 through housing holes 1063. When the device 8 is placed on the surface, the braking mechanism 1060 will be retracted back into the lower housing 12 and contact the flywheels 25a and 25b. The flywheels 25a and 25b will be stopped causing axles 22, transmission 86, and axle 23 to also stop.

Figure 45:
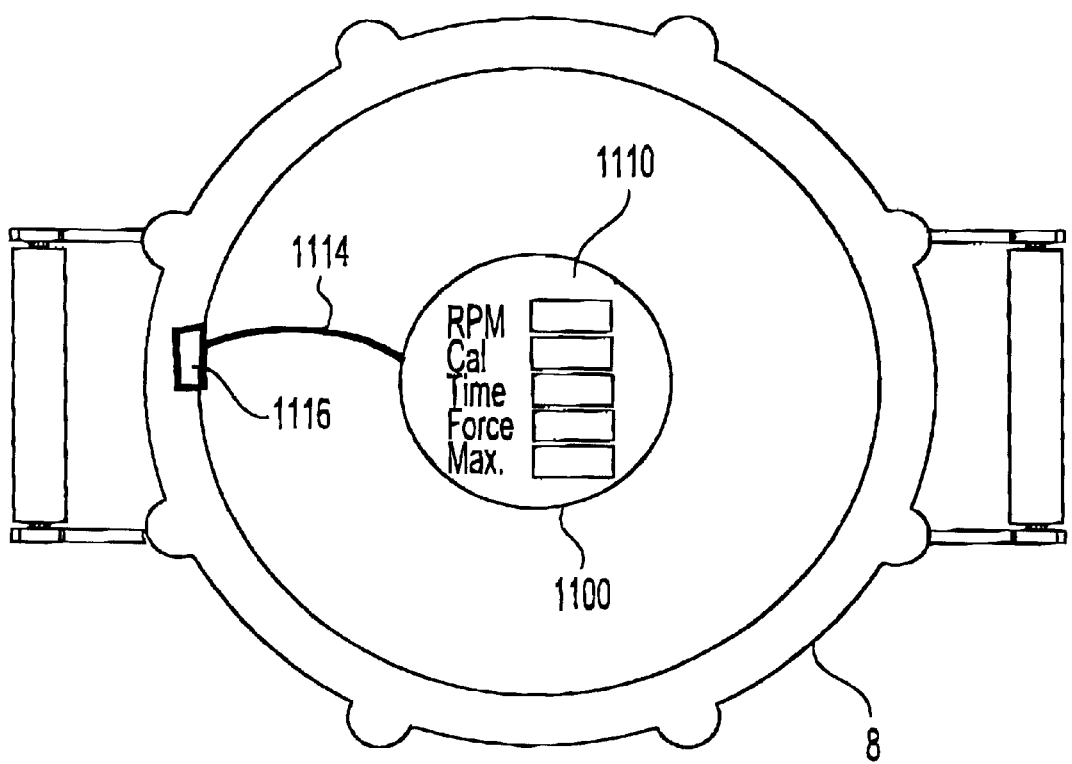
FIG. 45 is a twelfth embodiment of the precessional device featuring a monitoring device.

FIG. 45 illustrates a twelfth embodiment of the precessional device with monitoring equipment 1100. The monitoring equipment 1100 includes an LCD display 1110 powered by a battery (not shown). The monitoring equipment 1100 is electrically connected through wire 1114 to sensor 1116. Information displayed may include, for example, current rotations per minute (RPM), time, force and calories burned.

Figure 46:
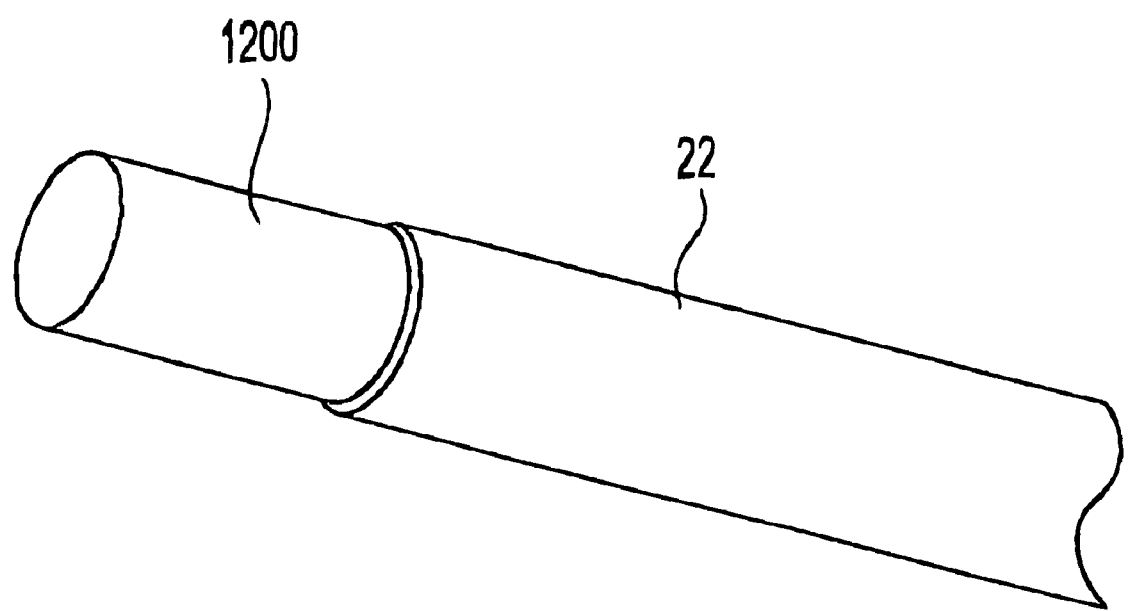
FIG. 46 discloses a thirteenth embodiment of the precessional device featuring a modified axle tip.

FIG. 46 discloses a thirteenth embodiment which features an alternative method of providing frictional contact between the axle tip 1200 of axis 22 and track race 17. The axle tip 1200 is coated with a material such as polyurethane, rubber or other synthetic or metallic material.

Figure 47A:
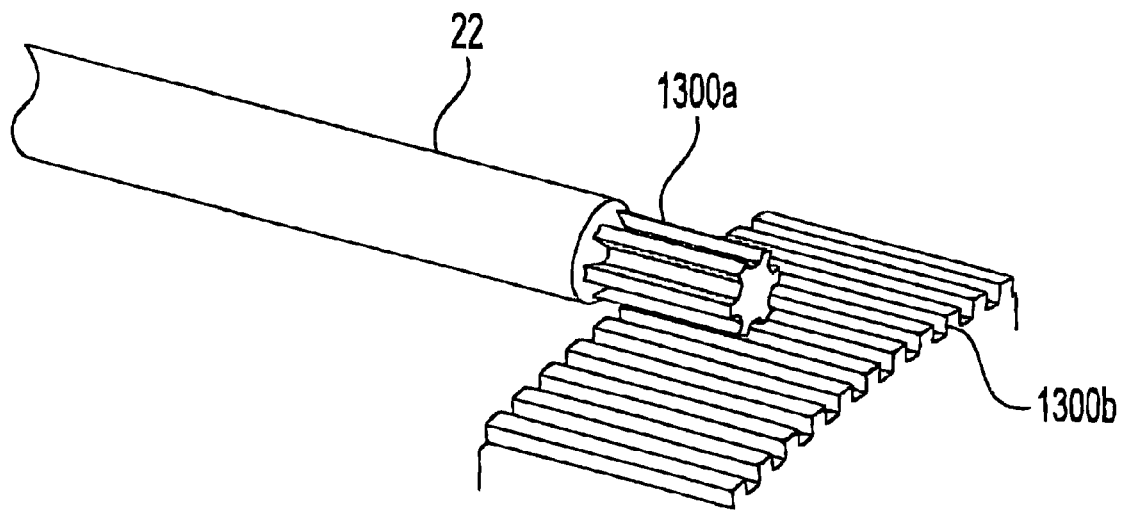
FIGS. 47A–47B disclose a fourteenth embodiment of the precessional device featuring an alternative modified axle tip.
Figure 47B:
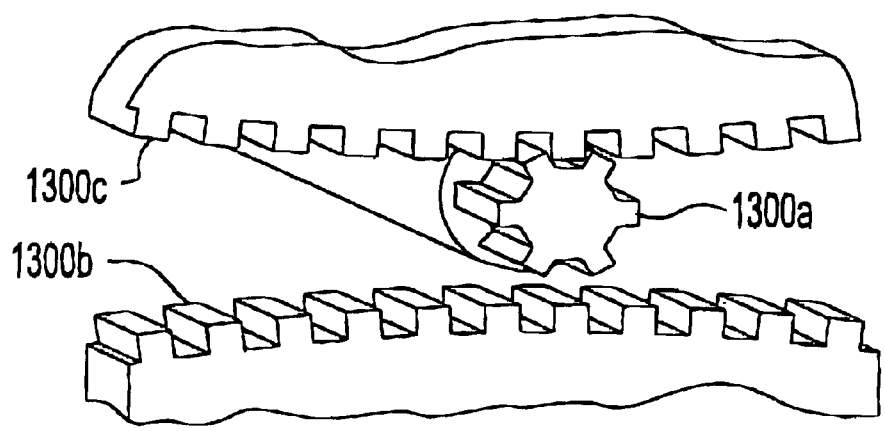

FIGS. 47A–47B disclose a fourteenth embodiment which features axle tip 1300a of axle 22 capped by a beveled gear and a track 1300b comprised of a beveled surface that allows for positive rolling contact between the axle tip 1300a and track 1300b without slippage. The axle tip will travel ideally between two tracks 1300b and 1300c.

Figure 48:
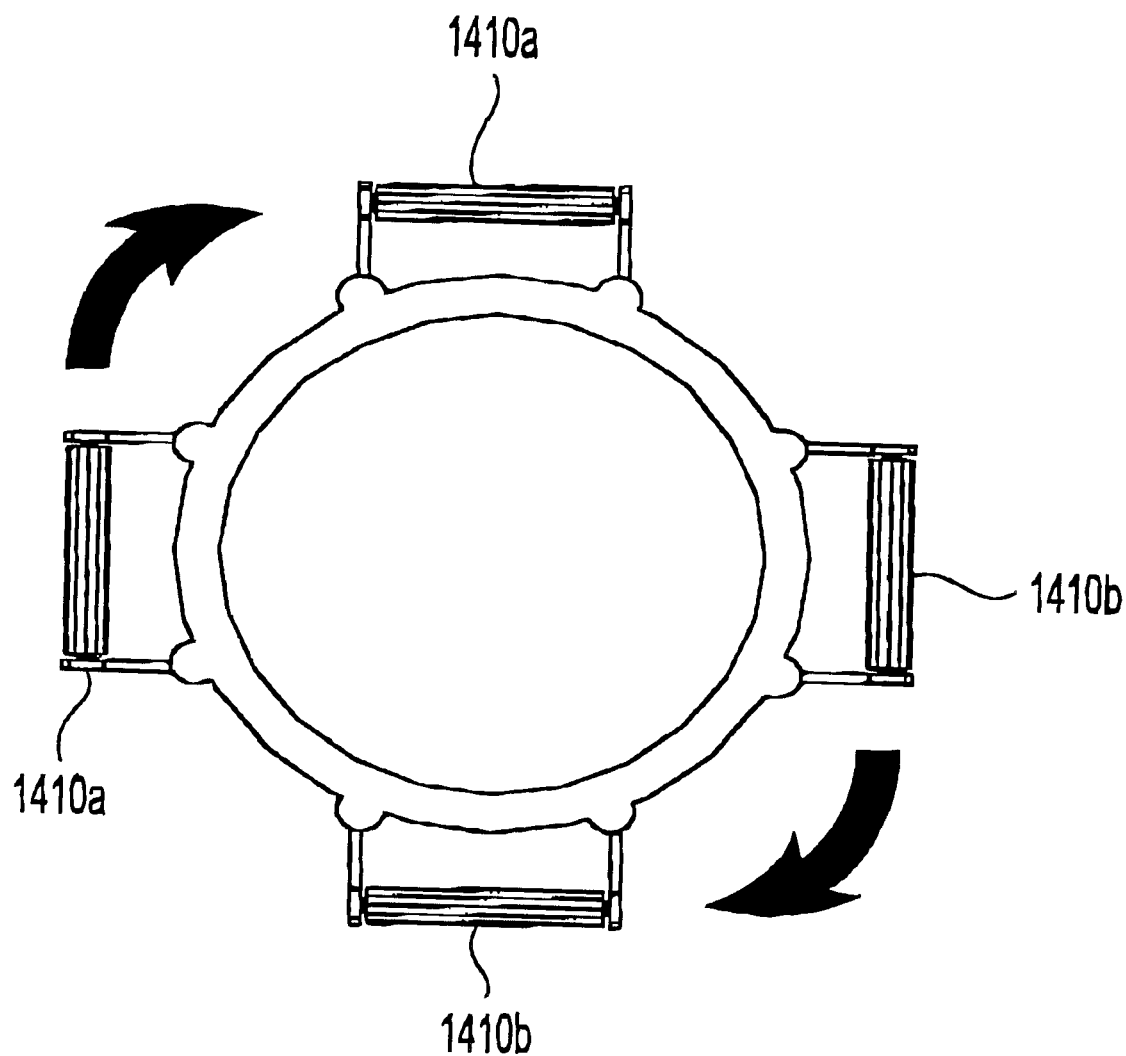
FIG. 48 illustrates a top plan view of a fifteenth embodiment of the precessional device with detachable handles.

FIG. 48 discloses a fifteenth embodiment 1400 which features handles 1410a and 1410b that are removable. The handles 1410a and 1410b may be removed to adjust for different grip positions with different angles and widths to work different muscle groups. Removable or adjustable handles offer the operator a greater range of choices for exercising. By adjusting the handles 90 degrees each as shown, the operator effectively adjusts the device from the first embodiment to the second embodiment or from the second embodiment to the first embodiment. No adjustment of any screws is necessary. Removable handles also facilitates storage and portability.

Figure 49A:
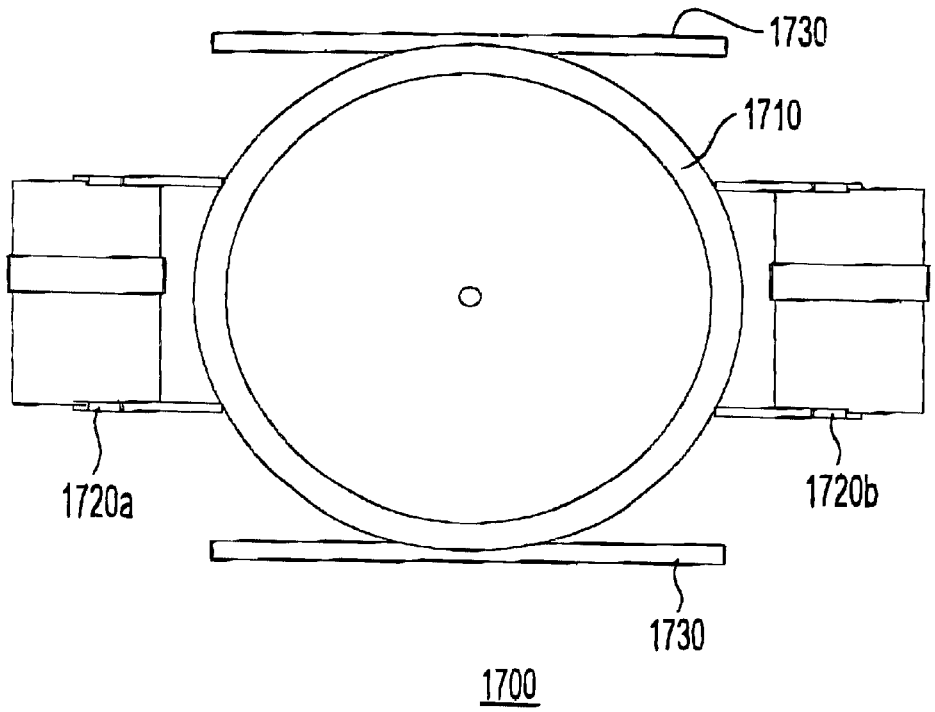
FIG. 49A illustrates a top plan view of a sixteenth embodiment of the precessional device mounted on a stand.
Figure 49B:
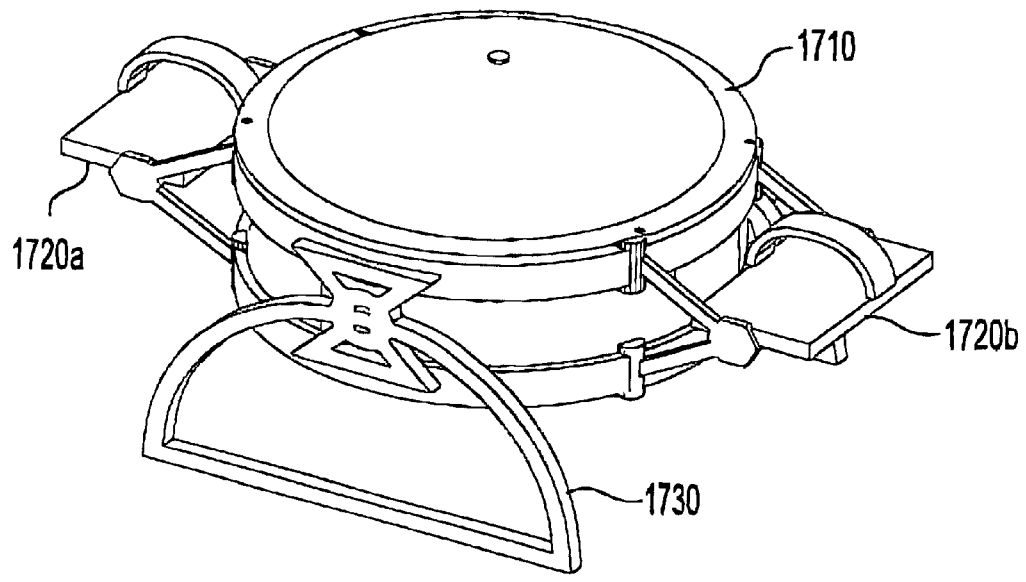
FIG. 49B illustrates a perspective view of the sixteenth embodiment of the precessional device mounted on a stand.

FIGS. 49A–49B disclose a sixteenth embodiment 1700 featuring pedal attachments 1720a and 1720b attached to housing 1710 containing the rotors (not shown). The housing 1710 is mounted on a stand 1730.

The precessional device embodiments herein disclosed are able to produce tremendous forces, limited only by the practical limits to the speed of the rotors, all in a small, lightweight package. This allows the precessional devices to be compact to facilitate storage, portability and use.

As precessional devices, they may be designed to be hand held. This allows the precessional device to be used in a variety of methods, and allows the operator to switch from one method to another quickly and easily.

As precessional devices, they allow the operator to have complete control over the speed, and resulting level of variable resistance, of the exercise.

As precessional devices, the scientific and somewhat complex nature of their operation is an engaging and entertaining activity to witness and master. This makes the exercise activity more enjoyable and effective.

As precessional devices, the intensity of the workout is directly linked to the highly visual and audible stimulus of the rotating and spinning rotors. This direct audio-visual feedback helps to monitor and psychologically reinforce the exercise.

As auto-precessional devices, the rotors' rotation and spin are linked through a simple contact between axle and track that reduces the cost and complexity of the device.

Further applications for the precessional device enclosed herein could include everything from automobile wiper blade motors to industrial brushing motors to the agitator motors found on many consumer and commercial washing machines.

The foregoing is to be understood as being in every respect illustrative and exemplary, but not restrictive, and the scope of the invention disclosed herein is not to be determined from the Detailed Description, but rather from the claims as interpreted according to the full breadth permitted by the law. It is to be understood that the embodiments shown and described herein are only illustrative of the principles of the present invention and that various modifications may be implemented by those skilled in the art without departing from the scope and spirit of the invention.

What is claimed is:

1. An apparatus comprising:
   a first rotor spinning about a first spin axis and rotating about a rotational axis inside a first track assembly; and
   a second rotor, connected to the first rotor with a transmission spinning about a second spin axis and rotating about the rotational axis inside a second track assembly;
   wherein neither of the spin axes are parallel to the rotational axis and wherein both of the track assemblies are substantially continuous about the rotational axis.

2. The apparatus of claim 1, wherein said first and second rotors rotate in opposite directions.

3. The apparatus of claim 1, wherein
   said first rotor produces precessional torques about first and second orthogonal axes; and
   said second rotor produces precessional torques about said first and second orthogonal axes.

4. The apparatus of claim 3, wherein said precessional torques substantially reinforce each other about the first orthogonal axis.

5. The apparatus of claim 4, wherein said precessional torques substantially cancel about the second orthogonal axis.

6. The apparatus of claim 1, wherein
   said first rotor produces precessional torques about first and second orthogonal axes;
   said second rotor produces precessional torques about said first and second orthogonal axes; and
   said precessional torques provide a variable torque about said first and second orthogonal axis.

7. The apparatus of claim 6, wherein said first and second orthogonal axes and said rotational axis are each orthogonal to the other two axes.

8. The apparatus of claim 1, further comprising:
   a hand crank to start the first and second rotors rotating.

9. The apparatus of claim 8, wherein said hand crank is connected to a plurality of gears which turn the first and second rotors.

10. The apparatus of claim 1, further comprising:
    an electric motor to start the first and second rotors rotating.

11. The apparatus of claim 1, further comprising:
    first and second flywheels mounted on said first rotor; and
    wherein said first and second flywheels include fins.

12. The apparatus of claim 1, further comprising:
    first and second flywheels mounted on said first rotor; and
    wherein said first and second flywheels include at least one removable weight.

13. The apparatus of claim 1, further comprising:
    first and second flywheels mounted on said first rotor; and
    wherein said first and second flywheels are expandable.

14. An apparatus comprising:
    a first rotor spinning about a first spin axis and rotating around a rotational axis;
    a second rotor spinning about a second spin axis and rotating around the rotational axis;
    first and second flywheels mounted on said first rotor;
    third and fourth flywheels mounted on said second rotor; and
    a braking mechanism which in a first position is separated from said third and fourth flywheels and in a second position is in contact with said third and fourth flywheels.

15. An apparatus comprising:
    a first rotor spinning about a first spin axis and rotating around a rotational axis;
    a second rotor spinning about a second spin axis and rotating around the rotational axis;
    a first track assembly which supports rotations of said first rotor;
    a sensor mounted on said first track assembly; and
    monitoring equipment which is electrically connected to said sensor.

16. An apparatus comprising:
a first rotor spinning about a first spin axis and rotating around a rotational axis;
a second rotor spinning about a second spin axis and rotating around the rotational axis;
a first track assembly which supports rotation of said first rotor; and
said first rotor further including first rotor axle tips which spin due to frictional contact with said first track assembly.

17. The apparatus of claim 16, wherein said first rotor axle tips are coated with material from a group consisting of polyurethane, rubber, or a metallic material.

18. The apparatus of claim 16, further comprising:
a first track assembly which supports rotation of said first rotor and includes a beveled surface; and
said first rotor further including first rotor axle tips which are capped by beveled gears and which travel inside said beveled surface of said first track assembly.

19. An apparatus comprising:
a first rotor spinning about a first spin axis and rotating around a rotational axis;
a second rotor spinning about a second spin axis and rotating around the rotational axis;
a plurality of housings; and
at least one handle attached to at least one of said housings said handle being adjustable;
wherein neither of the spin axes are parallel to the rotational axis and wherein both of the track assemblies are substantially continuous about the rotational axis.

20. An apparatus comprising:
a first rotor spinning about a first spin axis and rotating around a rotational axis;
a second rotor spinning about a second spin axis and rotating around the rotational axis; and
a plurality of handles that may be adjusted by 90 degrees.

21. An apparatus comprising:
a first rotor spinning about a first spin axis;
a second rotor spinning about a second spin axis;
said first rotor rotating about a rotational axis inside a first track assembly; and
said second rotor rotating about said rotational axis inside a second track assembly;
wherein neither of the spin axes are parallel to the rotational axis and wherein both of the track assemblies are substantially continuous about the rotational axis.

22. The apparatus of claim 21, wherein said first and second track assemblies are co-planar.

23. The apparatus of claim 21, wherein said first and second track assemblies are located adjacent to each other.

24. The apparatus of claim 21, further comprising:
a first circular gear mounted on said first track assembly; and
a second circular gear mounted on said second track assembly.

25. An apparatus comprising:
a first rotor spinning about a first spin axis, said first rotor including first and second flywheels, and said first rotor rotating about a rotational axis inside a first track assembly; and
a second rotor spinning about a second spin axis, said second rotor including third and fourth flywheels, and said second rotor rotating about a rotational axis inside a second track assembly;
wherein neither of the spin axes are parallel to the rotational axis and wherein both of the track assemblies are substantially continuous about the rotational axis.

26. The apparatus of claim 25, further comprising:
a transmission coupled to said first and second rotors.

27. The apparatus of claim 26, wherein said transmission includes at least one idler gear and at least one drive gear.

28. The apparatus of claim 25, further comprising at least one handle.

29. The apparatus of claim 25, wherein said first spin axis is canted with respect to the first axis.

30. The apparatus of claim 29, wherein said second spin axis is canted off of a second axis.

31. The apparatus of claim 25, wherein said first and second axes are orthogonal to a rotational axis.

32. The apparatus of claim 25, wherein the first and second flywheels are more closely spaced on the first rotor than the third and fourth flywheels on the second rotor.

33. The apparatus of claim 25, wherein the first and second rotors have the same moment of inertia.

34. An apparatus comprising:
a first rotor spinning on a first spin axis;
said first rotor including first and second flywheels;
said first rotor rotating inside a support structure;
a second rotor spinning on a second spin axis, said second rotor including third and fourth flywheels and said second rotor rotating inside said support structure;
a central column located on a rotational axis; and
wherein said first and second rotors rotate in opposite directions about said rotational axis.

35. An apparatus comprising:
a first rotor rotating about a rotational axis in a first track assembly and spinning on a first spin axis;
a second rotor rotating about said rotational axis in a second track assembly and spinning on a second spin axis; and
a transmission operatively connected to said first and second rotors;
wherein neither of the spin axes are parallel to the rotational axis and wherein both of the track assemblies are substantially continuous about the rotational axis.

36. The apparatus of claim 35, wherein said transmission transmits a torque to said first rotor.

37. The apparatus of claim 35, further comprising:
a first yoke supporting said first rotor; and
a second yoke supporting said second rotor.

38. The apparatus of claim 35, wherein
said transmission includes a plurality of gears connected to a central hub; and
said central hub is positioned by a plurality of wire braces.

39. The apparatus of claim 35, wherein
said first rotor includes a spin axle and at least one flywheel; and
wherein said spin axle is preloaded with a canting angle inside a yoke mount assembly.

40. The apparatus of claim 39, wherein
said yoke mount assembly includes a pair of screws; and
wherein said pair of screws cant the spin axle.

41. The apparatus of claim 35, wherein said first rotor includes at least one flywheel and said second rotor includes at least two flywheels.

42. A precessional exercise device comprising:
a first rotor spinning on a first spin axis and a second rotor spinning on a second spin axis;

said first rotor including first and second flywheels;

said second rotor including third and fourth flywheels;

said first and second rotors rotating inside a support structure;

wherein said support structure includes first and second circular tracks;

a central column aligned with a rotational axis; and wherein said first and second rotors rotate in opposite directions about said rotational axis.

43. An apparatus comprising:

a means for inputting a deflecting torque; and a means for substantially reinforcing precessional torques about a first axis on a first substantially continuous track assembly and substantially canceling precessional torques about a second axis on a second substantially continuous track assembly.

44. An apparatus comprising:

a first meads on a first substantially continuous track assembly for producing precessional torques about a first axis and a second axis;

a second means on a second substantially continuous track assembly for producing precessional torques about said first axis and said second axis; and wherein said precessional torques substantially add about said first axis and substantially cancel about said second axis.

45. An apparatus comprising:

a first means on a first substantially continuous track assembly for producing precessional torques about a first axis and a second axis;

a second means on a second substantially continuous track assembly for producing precessional torques about said first axis and a second axis; and wherein said precessional torques create a variable resistance about said first and second axis.

46. An apparatus comprising:

a first means for producing a plurality of precessional forces acting on a first track assembly;

a second means for producing a plurality of precessional forces acting on a second track assembly;

wherein said first and second track assemblies are connected to form a support structure;

a plurality of handles mounted to the support structure; and wherein said precessional forces created by said first and second means create a variable resistance at said plurality of handles.

47. A method of using a precessional device comprising a first rotor spinning on a first spin axis and a second rotor spinning on a second spin axis, the method comprising:

inputting a deflecting torque through a plurality of handles to said precessional device; and pulling and pushing against a variable torque produced by said precessional device along one axis.

48. A method comprising:

rotating a first rotor inside a first track assembly around a rotational axis in a first direction; and rotating a second rotor inside a track assembly around said rotational axis in a second direction;

wherein said first and second directions are opposite and wherein both of the track assemblies are substantially continuous about said rotational axis.

49. A method comprising:

rotating a first rotor around a first track assembly and about a rotational axis;

rotating a second rotor around a second track assembly attached to said first track assembly and about a rotational axis; and creating a variable resistance along one dimension;

wherein both of the track assemblies are substantially continuous about said rotational axis.

50. A method comprising:

rotating a first spin axle containing a plurality of flywheels around a first track assembly;

rotating a second spin axle containing a plurality of flywheels around a second track assembly in an opposite direction; and outputting a variable resistance along a first axis and substantially canceling forces acting along a second axis.

51. A method comprising:

inputting a first deflecting torque to a first rotor rotating in a first direction inside a first track assembly about a rotational axis and a second deflecting torque to a second rotor rotating in a second direction inside a second track assembly about said rotational axis; and grasping handles attached to a support structure and inputting a third deflecting torque against a variable resistance provided by the first and second rotors;

wherein both of the track assemblies are substantially continuous about said rotational axis.

52. The method of claim 51, wherein said third deflecting torque causing said first and second rotors to accelerate.

53. The method of claim 52, wherein said first and second rotors produce precessional torque that substantially reproduce said first and second deflecting torques.

* * * * *